(12) United States Patent
Ramachandran et al.

(10) Patent No.: US 10,142,164 B2
(45) Date of Patent: Nov. 27, 2018

(54) METHODS AND SYSTEMS FOR DYNAMIC PATH SELECTION AND DATA FLOW FORWARDING

(71) Applicant: CloudGenix, Inc., Santa Clara, CA (US)

(72) Inventors: Kumar Ramachandran, Fremont, CA (US); Venkataraman Anand, San Ramon, CA (US); Navneet Yadav, Cupertino, CA (US); Arivu Ramasamy, San Jose, CA (US); Aaron Edwards, Sunnyvale, CA (US); Gopal Reddy, Fremont, CA (US)

(73) Assignee: CLOUDGENIX, INC., Santa Clara, CA (US)

( * ) Notice: Subject to any disclaimer, the term of this patent is extended or adjusted under 35 U.S.C. 154(b) by 0 days.

(21) Appl. No.: 14/856,328

(22) Filed: Sep. 16, 2015

(65) Prior Publication Data
US 2016/0080251 A1     Mar. 17, 2016

Related U.S. Application Data

(60) Provisional application No. 62/051,293, filed on Sep. 16, 2014.

(51) Int. Cl.
*H04L 12/28*     (2006.01)
*H04L 12/24*     (2006.01)
(Continued)

(52) U.S. Cl.
CPC .... *H04L 41/0668* (2013.01); *G06F 17/30598* (2013.01); *G06F 17/30876* (2013.01);
(Continued)

(58) Field of Classification Search
CPC ..... H04L 41/0668; H04L 41/12; H04L 41/14; H04L 43/04; H04L 43/062; H04L 52/02;
(Continued)

(56) References Cited

U.S. PATENT DOCUMENTS 5,581,702 A    12/1996   McArdle et al.
6,982,969 B1    1/2006   Carneal et al.
(Continued)

FOREIGN PATENT DOCUMENTS

CN     107078921 A    8/2017
TW     201230729 A    7/2012
(Continued)

OTHER PUBLICATIONS

PCT/US2015/050408, "International Application Serial No. PCT/US2015/050408 International Search Report and Written Opinion dated Feb. 1, 2016", CloudGenix, Inc., 12 pages.
(Continued)

*Primary Examiner* — Abdelnabi O Musa
(74) *Attorney, Agent, or Firm* — GTC Law Group PC & Affiliates

(57) ABSTRACT

A method includes detecting a data flow and an associated originating interface on a network, determining a first link over which to forward the data flow, transmitting the data flow over the determined link, receiving a return data flow and moving a forward direction of the return data flow to a new path if the return data flow arrived via a link other than the first link, wherein all packets following a first packet on the flow are forwarded on the same path as the first packet.

18 Claims, 26 Drawing Sheets

(51) Int. Cl.
*H04L 29/06* (2006.01)
*G06F 17/30* (2006.01)
*H04L 12/46* (2006.01)
*H04L 12/703* (2013.01)
*H04L 12/911* (2013.01)
*H04L 12/26* (2006.01)
*H04L 29/14* (2006.01)
*H04L 29/12* (2006.01)
*H04W 84/04* (2009.01)
*H04L 12/707* (2013.01)

(52) U.S. Cl.
CPC ...... *H04L 12/4633* (2013.01); *H04L 12/4641* (2013.01); *H04L 43/0817* (2013.01); *H04L 45/28* (2013.01); *H04L 47/781* (2013.01); *H04L 47/825* (2013.01); *H04L 63/061* (2013.01); *H04L 69/40* (2013.01); *H04L 43/0811* (2013.01); *H04L 43/10* (2013.01); *H04L 45/22* (2013.01); *H04L 61/1511* (2013.01); *H04L 61/1523* (2013.01); *H04L 61/2503* (2013.01); *H04W 84/04* (2013.01)

(58) Field of Classification Search
CPC ....... H04L 45/125; H04L 45/38; G06F 17/18; G06F 17/30598; G06F 17/30876; H04W 84/04
See application file for complete search history.

(56) References Cited

U.S. PATENT DOCUMENTS

| | | |
|---|---|---|
| 7,139,928 B1 | 11/2006 | Bhattacharya et al. |
| 7,441,267 B1 | 10/2008 | Elliott |
| 7,729,353 B1 | 6/2010 | Podolsky et al. |
| 7,861,247 B1 | 12/2010 | Santos et al. |
| 8,024,478 B2 | 9/2011 | Patel |
| 8,331,360 B1 | 12/2012 | Ashwood-Smith et al. |
| 8,385,351 B1 | 2/2013 | Chen et al. |
| 8,392,575 B1 | 3/2013 | Marr et al. |
| 8,793,361 B1 | 7/2014 | Riddle |
| 9,141,769 B1 | 9/2015 | Hitchcock et al. |
| 9,686,127 B2 | 6/2017 | Ramachandran et al. |
| 9,742,626 B2 | 8/2017 | Kumar et al. |
| 9,860,181 B2 | 1/2018 | Duffield et al. |
| 9,871,691 B2 | 1/2018 | Venkataraman et al. |
| 9,906,402 B2 | 2/2018 | Ramachandran et al. |
| 9,923,808 B2 | 3/2018 | Kelley, Jr. |
| 9,960,958 B2 | 5/2018 | Ramachandran et al. |
| 2001/0026550 A1 | 10/2001 | Kobayashi |
| 2002/0099756 A1 | 7/2002 | Catthoor et al. |
| 2002/0156918 A1* | 10/2002 | Valdevit .............. H04L 49/25 709/238 |
| 2003/0005112 A1 | 1/2003 | Krautkremer et al. |
| 2003/0151619 A1 | 8/2003 | McBride et al. |
| 2003/0158930 A1 | 8/2003 | McBride |
| 2004/0136324 A1 | 7/2004 | Steinberg et al. |
| 2005/0044443 A1 | 2/2005 | Magnaghi et al. |
| 2005/0216418 A1 | 9/2005 | Davis et al. |
| 2005/0265356 A1 | 12/2005 | Kawarai et al. |
| 2006/0182033 A1 | 8/2006 | Chen et al. |
| 2006/0182034 A1* | 8/2006 | Klinker .............. H04L 12/2602 370/238 |
| 2006/0182119 A1* | 8/2006 | Li ......................... H04L 45/04 370/395.52 |
| 2006/0224428 A1 | 10/2006 | Schmidt et al. |
| 2006/0239188 A1 | 10/2006 | Weiss et al. |
| 2007/0058638 A1 | 3/2007 | Guichard et al. |
| 2007/0118631 A1 | 5/2007 | Devarakonda et al. |
| 2007/0130324 A1 | 6/2007 | Wang |
| 2008/0031271 A1 | 2/2008 | Maeda et al. |
| 2008/0080473 A1† | 4/2008 | Thubert |
| 2008/0082628 A1 | 4/2008 | Rowstron et al. |
| 2008/0305743 A1 | 12/2008 | Aithal et al. |
| 2009/0059814 A1 | 3/2009 | Nixon et al. |
| 2009/0100431 A1 | 4/2009 | Doyle et al. |
| 2009/0116402 A1 | 5/2009 | Yamasaki et al. |
| 2009/0163279 A1 | 6/2009 | Hermansen et al. |
| 2009/0254589 A1 | 10/2009 | Nair et al. |
| 2009/0285120 A1 | 11/2009 | Swan |
| 2010/0027427 A1 | 2/2010 | Kokje et al. |
| 2010/0094981 A1 | 4/2010 | Cordray et al. |
| 2010/0157841 A1 | 6/2010 | Puthenpura et al. |
| 2010/0188976 A1 | 7/2010 | Rahman et al. |
| 2011/0019538 A1 | 1/2011 | Ryoo et al. |
| 2011/0202641 A1 | 8/2011 | Kahn et al. |
| 2011/0255537 A1† | 10/2011 | Ramasamy |
| 2011/0317695 A1† | 12/2011 | Cai |
| 2011/0320622 A1 | 12/2011 | Cutler et al. |
| 2012/0106321 A1 | 5/2012 | Alon et al. |
| 2012/0158539 A1 | 6/2012 | Lawrence et al. |
| 2012/0182865 A1 | 7/2012 | Andersen et al. |
| 2012/0278485 A1 | 11/2012 | Qian et al. |
| 2012/0290869 A1 | 11/2012 | Heitz et al. |
| 2012/0311138 A1 | 12/2012 | Inamdar et al. |
| 2012/0317306 A1 | 12/2012 | Radinsky et al. |
| 2013/0003528 A1 | 1/2013 | Wu et al. |
| 2013/0003595 A1 | 1/2013 | Soomro |
| 2013/0019282 A1 | 1/2013 | Rice et al. |
| 2013/0021139 A1 | 1/2013 | Guo |
| 2013/0024566 A1 | 1/2013 | Cremin et al. |
| 2013/0046887 A1 | 2/2013 | Malloy et al. |
| 2013/0074091 A1 | 3/2013 | Xavier et al. |
| 2013/0077479 A1 | 3/2013 | Ryoo et al. |
| 2013/0086280 A1 | 4/2013 | James et al. |
| 2013/0124712 A1 | 5/2013 | Parker |
| 2013/0154822 A1 | 6/2013 | Kumar et al. |
| 2013/0232261 A1 | 9/2013 | Wright et al. |
| 2013/0301404 A1 | 11/2013 | Kano et al. |
| 2013/0318538 A1 | 11/2013 | Verma et al. |
| 2013/0322232 A1 | 12/2013 | Császár et al. |
| 2014/0010077 A1 | 1/2014 | Busch et al. |
| 2014/0016501 A1 | 1/2014 | Kamath et al. |
| 2014/0029438 A1 | 1/2014 | Jain et al. |
| 2014/0033212 A1 | 1/2014 | Balasubramaniam et al. |
| 2014/0040975 A1 | 2/2014 | Raleigh et al. |
| 2014/0046882 A1 | 2/2014 | Wood et al. |
| 2014/0052877 A1 | 2/2014 | Mao |
| 2014/0059216 A1 | 2/2014 | Jerrim et al. |
| 2014/0119177 A1 | 5/2014 | Delregno et al. |
| 2014/0137182 A1 | 5/2014 | Elzur |
| 2014/0169215 A1 | 6/2014 | Rajendran et al. |
| 2014/0173018 A1 | 6/2014 | Westphal et al. |
| 2014/0222858 A1 | 8/2014 | Leonard |
| 2014/0241366 A1 | 8/2014 | Smith |
| 2014/0280761 A1 | 9/2014 | Rothschild et al. |
| 2014/0303934 A1 | 10/2014 | Mylarappa et al. |
| 2014/0310046 A1 | 10/2014 | Shidfar |
| 2014/0313881 A1 | 10/2014 | Limaye et al. |
| 2014/0334406 A1 | 11/2014 | Chen et al. |
| 2014/0337497 A1 | 11/2014 | Wanser et al. |
| 2015/0036483 A1 | 2/2015 | Hassan |
| 2015/0071108 A1 | 3/2015 | Lumezanu et al. |
| 2015/0085657 A1* | 3/2015 | Hoehne .................. H04W 40/12 370/235 |
| 2015/0103672 A1* | 4/2015 | Stuart ..................... H04L 45/38 370/241 |
| 2015/0120909 A1 | 4/2015 | Karthikeyan |
| 2015/0172331 A1 | 6/2015 | Raman |
| 2015/0212909 A1 | 7/2015 | Sporel |
| 2015/0222612 A1 | 8/2015 | Norp et al. |
| 2016/0080195 A1 | 3/2016 | Ramachandran et al. |
| 2016/0080211 A1 | 3/2016 | Anand et al. |
| 2016/0080212 A1 | 3/2016 | Ramachandran et al. |
| 2016/0080221 A1 | 3/2016 | Ramachandran et al. |
| 2016/0080225 A1 | 3/2016 | Yadav et al. |
| 2016/0080230 A1 | 3/2016 | Anand et al. |
| 2016/0080250 A1 | 3/2016 | Ramachandran et al. |
| 2016/0080252 A1 | 3/2016 | Ramachandran et al. |
| 2016/0080268 A1 | 3/2016 | Anand et al. |
| 2016/0080280 A1 | 3/2016 | Ramachandran et al. |

(56) References Cited

U.S. PATENT DOCUMENTS

2016/0080285 A1    3/2016   Ramachandran et al.
2016/0080502 A1    3/2016   Yadav et al.
2016/0226723 A1    8/2016   Delattre et al.

FOREIGN PATENT DOCUMENTS

WO    2012069486 A1    5/2012
WO    2014037277 A1    3/2014
WO    2016044413 A1    3/2016

OTHER PUBLICATIONS

PCT/US2015/050408, "International Application Serial No. PCT/US2015/050408 International Preliminary Report on Patentability and Written Opinion dated Mar. 30, 2017", CloudGenix, Inc., 9 Pages.

Ramachandran, "Methods and Systems for Business Intent Driven Policy Based Network Traffic Characterization, Monitoring and Control", Sep. 13, 2017, 1 Page.

\* cited by examiner
† cited by third party

METHODS AND SYSTEMS FOR DYNAMIC PATH SELECTION AND DATA FLOW FORWARDING

CROSS REFERENCE TO RELATED APPLICATIONS

This application claims the benefit of U.S. provisional patent application Ser. No. 62/051,293 filed Sep. 16, 2014, which is hereby incorporated by reference in its entirety.

BACKGROUND

The enterprise information technology (IT) operating model has shifted from a model wherein an enterprise may own, maintain, and operate the IT infrastructure necessary for the enterprise, to a model wherein the enterprise may also work with third parties who may provide enterprise IT services to the enterprise. As a result, management of the enterprise IT operating model has become more complex, as enterprises may now use public cloud infrastructure, software-as-a-service (SaaS) infrastructure, and private or virtualized data center infrastructure 128, and the like. While the infrastructure may be changing, the variety of applications used within the enterprise is also increasing significantly, further complicating the management and maintenance of the infrastructure, and requiring greater bandwidth to support the performance that enterprise users 168 of these applications have come to expect. Therefore, what is needed are methods and systems for flexibly defined communication network controller-based control, operations, and management of networks using a multi-tenant controller 122. Given increasing complexity in connecting users 168, devices, and applications, a flexible approach to define, control and operate a network without worrying about the underlying virtual private network (VPN) protocols and configuration, routing protocols, link types, link availability and quality of service (QoS). Such methods and systems may automatically monitor and control the network, allowing transitioning from legacy networks for IT to a flexibly defined communication network controller based control, operations, and management of networks.

SUMMARY

In accordance with an exemplary and non-limiting embodiment, a method comprises determining a network requirement for at least one application, dynamically determining a link suitable for data transmission in accordance with a policy based at least in part on a current network condition to meet the network requirement and routing one or more application network data flows associated with the at least one application over the link.

In accordance with an exemplary and non-limiting embodiment, a method comprises determining a network requirement for at least one application, determining a link suitable to meet the network requirement based, at least in part, on at least one of a plurality of application identification details and an application traffic profile and routing one or more application network data flows associated with the at least one application over the link.

Any of the embodiments described above wherein the application is operating at a node.

Any of the embodiments described above wherein the application is operating at a branch.

Any of the embodiments described above wherein dynamically determining the link is performed by a configurable spoke device.

Any of the embodiments described above wherein the configurable spoke device maintains path configuration information.

Any of the embodiments described above wherein path configuration information is selected from the group consisting of bandwidth availability on a link, a latency profile and a traffic volume cap.

In accordance with an exemplary and non-limiting embodiment, a method comprises determining a signature for each of a plurality of applications based, at least in part, on at least one of a domain name, a URL, a Server Network Identity (SNI), source IP address, a destination IP address, a source port, a destination port, any sequence of bytes in one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata, transmitting each of the signatures to a branch device and transmitting a policy string defining a business policy to be applied to a data flow exhibiting the signature to the branch device.

In accordance with an exemplary and non-limiting embodiment, a method comprises receiving a signature for each of a plurality of applications based, at least in part, on at least one of a domain name, a URL, a Server Network Identity (SNI), source IP address, a destination IP address, a source port, a destination port, any sequence of bytes at one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata, receiving at least one policy string defining a business policy, analyzing at least one network data flow to detect the presence of the signature and applying the business policy to the at least one network data flow comprising the detected signature.

In accordance with an exemplary and non-limiting embodiment, a centrally controllable multi-tenant controller for controlling a plurality of assets across a plurality of distributed computing environments is configured to determine a signature for each of a plurality of applications based, at least in part, on at least one of a domain name, a URL, a Server Network Identity (SNI), source IP address, a destination IP address, a source port, a destination port, any sequence of bytes at one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata, transmit each of the signatures to a branch device and transmit a policy string defining a business policy to be applied to a data flow exhibiting the signature to the branch device.

In accordance with an exemplary and non-limiting embodiment, a networked branch device is configured to receive a signature for each of a plurality of applications based, at least in part, on at least one of a domain name, a URL, a Server Network Identity (SNI), source IP address, a destination IP address, a source port, a destination port, any sequence of bytes at one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata, receive at least one policy string defining a business policy, analyze at least one network data flow to detect the presence of the signature and apply the business policy to the at least one network data flow comprising the detected signature.

Any of the embodiments described above wherein the policy string comprises elements are selected from the group consisting of a user identity, a SERVICE, a path and a VXWAN.

In accordance with an exemplary and non-limiting embodiment, a method comprises checking at a predetermined interval a status of one or more network paths to a remotely located application, rating the relative status of each of the one or more network paths wherein the rating is based at least in part on at least one of network latency and an application level transaction latency and utilizing the rating to route an application data flow associated with the application.

In accordance with an exemplary and non-limiting embodiment, a networked branch device is configured to check at a predetermined interval a status of one or more network paths to a remotely located application, rate the relative status of each of the one or more network paths wherein the rating is based at least in part on at least one of network latency and an application level transaction latency and utilize the rating to route an application data flow associated with the application.

Any of the embodiments described above wherein the rating of the network paths is in the context of an operability of an application.

Any of the embodiments described above wherein the rating of the network paths is further based, at least in part, on a bandwidth of the path, a MOS score, a packet loss and jitter.

In accordance with an exemplary and non-limiting embodiment, a method comprises determining a delivery location of an application based, at least in part, upon at least one of manual information collection, triangulation based on source DNS queries and application probing, analyzing at least one network traffic flow associated with the application to extract data comprising at least one of a user location, a closest application delivery location and a source of user flow service, aggregating the extracted data to identify a plurality of sub-optimal use instances wherein the application was delivered from a sub-optimal location and reporting the sub-optimal use instances to a user of the application.

Any of the embodiments described above further comprising taking an action to at least partially mitigate the sub-optimal use instance.

Any of the embodiments described above wherein the user is an administrator.

In accordance with an exemplary and non-limiting embodiment, a centrally controllable multi-tenant controller for controlling a plurality of assets across a plurality of distributed computing environments is configured to determine a delivery location of an application based, at least in part, upon at least one of manual information collection, triangulation based on source DNS queries and application probing, analyze at least one network traffic flow associated with the application to extract data comprising at least one of a user location, a closest application delivery location and a source of user flow service, aggregate the extracted data to identify a plurality of sub-optimal use instances wherein the application was delivered from a sub-optimal location and report sub-optimal use instances to a user of the application.

Any of the embodiments described above further configured to take an action to at least partially mitigate the sub-optimal use instance.

Any of the embodiments described above wherein the user is an administrator.

In accordance with an exemplary and non-limiting embodiment, a method comprises determining a location of one or more service offering locations each hosting a plurality of applications each having an associated application definition, determining a location of a device configured to access at least one of the plurality of applications and transmitting to the device an application definition for each of the applications to which the device has access, wherein the application definition is based, at least in part, on the location of one or more service offering locations and the location of the device.

In accordance with an exemplary and non-limiting embodiment, a centrally controllable multi-tenant controller for controlling a plurality of assets across a plurality of distributed computing environments is configured to determine a location of one or more service offering locations each hosting a plurality of applications each having an associated application definition, determine a location of a device configured to access at least one of the plurality of applications and transmit to the device an application definition for each of the applications to which the device has access, wherein the application definition is based, at least in part, on the location of one or more service offering locations and the location of the device.

In accordance with an exemplary and non-limiting embodiment, a centrally controllable multi-tenant controller for controlling a plurality of assets across a plurality of distributed computing environments is configured to receive application data flow information from a spoke device within a network that is associated with an enterprise site and transmit a traffic profile to the enterprise site based at least in part on a current network data flow characteristic.

Any of the embodiments described above wherein a data transfer control over the network is at least one of application based and policy based.

Any of the embodiments described above further comprising applying time-based application domain classification and mapping to determining steps.

Any of the embodiments described above wherein the network comprises connectivity selected from the group consisting of hybrid, physical and logical.

Any of the embodiments described above wherein the application analysis is performed on a per session basis.

Any of the embodiments described above wherein at least one application comprises a data center application.

Any of the embodiments described above wherein the policy string format is standardized.

Any of the embodiments described above wherein routing is based, at least in part, on a dynamic and automated QoS definition.

Any of the embodiments described above wherein applications are selected from the group consisting of transactional applications and file transfer applications.

Any of the embodiments described above further comprising employing QoS standardized controls selected from the group consisting of shaping, policing, random early discard, tail drop, low latency queues, anomaly queues, fair queues and buffers.

Any of the embodiments described above further utilizing parameters to categorize data flows.

In accordance with an exemplary and non-limiting embodiment, a method comprises allocating an identifier to each of a plurality of policies each comprising a network-isolation identifier associated with a VXWAN directive and transmitting each of the plurality of policies to one or more devices in a network.

In accordance with an exemplary and non-limiting embodiment, a centrally controllable multi-tenant controller for controlling a plurality of assets across a plurality of distributed computing environments is configured to allocate an identifier to each of a plurality of policies each comprising a network-isolation identifier associated with a VXWAN directive and transmit each of the plurality of policies to one or more devices in a network.

In accordance with an exemplary and non-limiting embodiment, a method comprises receiving each of a plurality of policies at a networked device wherein each policy comprises a network-isolation identifier associated with a VXWAN directive and inserting the network-isolation identifier into one or more packets transmitted by the networked device.

In accordance with an exemplary and non-limiting embodiment, a networked branch device is configured to receive each of the plurality of policies wherein each policy comprises a network-isolation identifier associated with a VXWAN directive and insert the network-isolation identifier into one or more transmitted packets.

In accordance with an exemplary and non-limiting embodiment, a method comprises receiving from a first network tenant an indication of a partner network tenant with which to establish a IPSEC VPN tunnel, at least one of a site associated with the partner network tenant to which a IPSEC VPN TUNNEL is to be established, source prefixes at a tenant site from to which application traffic is allowed to travel over the IPSEC VPN TUNNEL and destination prefixes for application traffic that can travel over the IPSEC VPN TUNNEL, receiving an indication from the partner network tenant of agreement to establish the IPSEC VPN TUNNEL and instructing one or more devices of the first network and the partner network to establish an IPSEC data tunnel between themselves.

In accordance with an exemplary and non-limiting embodiment, a centrally controllable multi-tenant controller for controlling a plurality of assets across a plurality of distributed computing environments is configured to receive from a first network tenant an indication of a partner network tenant with which to establish a IPSEC VPN TUNNEL, at least one of a site associated with the partner network tenant to which a IPSEC VPN TUNNEL is to be established, source prefixes at a tenant site from to which application traffic is allowed to travel over the IPSEC VPN TUNNEL and destination prefixes for application traffic that can travel over the IPSEC VPN TUNNEL, receive an indication from the partner network tenant of agreement to establish the IPSEC VPN TUNNEL and instruct one or more devices of the first network and the partner network to establish an IPSEC data tunnel between themselves.

Any of the embodiments described above wherein the network comprises connectivity selected from the group consisting of hybrid, physical and logical.

Any of the embodiments described above wherein the application analysis is performed on a per session basis.

Any of the embodiments described above wherein the policy string format is standardized.

Any of the embodiments described above wherein encryption is employed.

In accordance with an exemplary and non-limiting embodiment, a method comprises detecting a data flow and an associated originating interface on a network, determining a first link over which to forward the data flow, transmitting the data flow over the determined link, receiving a return data flow and moving a forward direction of the return data flow to a new path if the return data flow arrived via a link other than the first link wherein all packets following a first packet on the flow are forwarded on the same path as the first packet.

Any of the embodiments described above further comprising storing the determined first link at an L4 level in a flow table.

Any of the embodiments described above wherein the data flow is detected via a SYN or a detected UDP session.

In accordance with an exemplary and non-limiting embodiment, a networked branch device is configured to detect a data flow and an associated originating interface on a network, determine a first link over which to forward the data flow, transmit the data flow over the determined link, receive a return data flow and move a forward direction of the return data flow to a new path if the return data flow arrived via a link other than the first link wherein all packets following a first packet on the flow are forwarded on the same path as the first packet.

Any of the embodiments described above further configured to store the determined first link at an L4 level in a flow table.

Any of the embodiments described above wherein the data flow is detected via a SYN or a detected UDP session.

Any of the embodiments described above further comprising applying time-based application domain classification and mapping to determining steps.

Any of the embodiments described above further comprising modeling application sessions and predicting bandwidth requirements.

Any of the embodiments described above wherein data flows are employed via SYN.

In accordance with an exemplary and non-limiting embodiment, a method comprises determining a plurality of network segments comprising a network, determining a manner in which the plurality of segments are connected, determining network segments and how segments are connected, at least in part, without a routing protocol, discovering a plurality of external network segments via a hub device associated with the network and utilizing the plurality of network segments comprising the network, the manner in which the plurality of segments are connected and the plurality of external network segments.

In accordance with an exemplary and non-limiting embodiment, a centrally controllable multi-tenant controller for controlling a plurality of assets across a plurality of distributed computing environments is configured to determine a plurality of network segments comprising a network, determine a manner in which the plurality of segments are connected, determine network segments and how segments are connected, at least in part, without a routing protocol, discover a plurality of external network segments via a hub device associated with the network and utilize the plurality of network segments and addresses comprising the network, the manner in which the plurality of segments are connected and the plurality of external network segments to establish at least one forwarding rule.

In accordance with an exemplary and non-limiting embodiment, a system comprises a multi-tenant controller configured to create a network description of a network and a HUB device forming a part of the network and configured to execute a routing protocol with at least one other device resulting in network information and to communicate the network information to the multi-tenant controller, wherein the multi-tenant controller is configured to merge the network information with the network description.

Any of the embodiments described above wherein the network topology identification, simulation and load testing is controlled by the multi-tenant controller.

Any of the embodiments described above further comprising detecting asymmetric network data traffic and associated network devices.

Any of the embodiments described above wherein the network comprises connectivity selected from the group consisting of hybrid, physical and logical.

Any of the embodiments described above wherein there are employed routing protocols selected from the group consisting of BGP, IS-IS, EIGRP and OSPF.

Any of the embodiments described above wherein routing is based, at least in part, on a network prefix type.

In accordance with an exemplary and non-limiting embodiment, a method comprises monitoring a plurality of network devices to collect network performance data comprising data flow records of each device on the network and to create a network topology database, accessing the network topology database comprising information on an entry and exit point of each device, the manner in which the devices are connected and a plurality of data flow records on a single data flow from multiple devices on the network and utilizing the network topology database to perform an asymmetric detection algorithm to identify one or more data flows that exited a device via a first path and returned to the device via a different second path.

Any of the embodiments described above wherein a controller is configured to receive information and detect asymmetry.

Any of the embodiments described above wherein detection is based, at least in part, on latency attributes.

Any of the embodiments described above wherein the application analysis is performed on a per session basis.

Any of the embodiments described above wherein asymmetry is selected from the group consisting of bandwidth asymmetry, media access asymmetry and loss rate asymmetry.

In accordance with an exemplary and non-limiting embodiment, a method comprises detecting at a device an application having an anchor domain, marking the application with a traffic source having an entry point domain that accessed the application and a time of detection and designating network flows from the traffic source within a predetermined time from the time of detection as belonging to the application.

In accordance with an exemplary and non-limiting embodiment, a networked branch device is configured to detect an application having an anchor domain, mark the application with a traffic source having an entry point domain that accessed the application and a time of detection and designate network flows from the traffic source within a predetermined time from the time of detection as belonging to the application.

Any of the embodiments described above further comprising modeling application sessions and predicting bandwidth requirements.

Any of the embodiments described above further comprising performing anomalous session identification, quarantine and restriction.

Any of the embodiments described above wherein the application analysis is performed on a per session basis.

In accordance with an exemplary and non-limiting embodiment, a method comprises receiving from a networked spoke device information describing network flows to and from an application, analyzing the information to characterize the application in at least one dimension selected from the group consisting of bi-directional bandwidth usage, network response times, application response times, a number of idle and active application sessions and a maximum number of concurrent application sessions and transmitting the dimensions to at least one networked spoke device as traffic profile information.

Any of the embodiments described above wherein the information describes L4 level network flows.

In accordance with an exemplary and non-limiting embodiment, a centrally controllable multi-tenant controller for controlling a plurality of assets across a plurality of distributed computing environments is configured to receive from a networked spoke device information describing network flows to and from an application, analyze the information to characterize the application in at least one dimension selected from the group consisting of bi-directional bandwidth usage, network response times, application response times, a number of idle and active application sessions and a maximum number of concurrent application sessions and transmit the dimensions to networked spoke devices as traffic profile information.

Any of the embodiments described above wherein the information describes L4 level network flows.

In accordance with an exemplary and non-limiting embodiment, a method comprises modeling a transactional application operating in a networked environment by a size of transactions and a frequency of transactions with a set distribution to produce one or more modeled parameters and analyzing the modeled parameters to predict a data flow size and frequency of one or more transactional application sessions.

Any of the embodiments described above wherein the set distribution is selected from the group consisting of normal, Weibull and Pareto.

In accordance with an exemplary and non-limiting embodiment, a method comprises modeling a bulk application operating in a networked environment by a size of transactions and a frequency of transactions with a set distribution and analyzing the modeled parameters to predict the frequency of one or more bulk application sessions.

Any of the embodiments described above wherein the set distribution is selected from the group consisting of normal, Weibull and Pareto.

In accordance with an exemplary and non-limiting embodiment, a method comprises modeling an application operating in a networked environment by a size of transactions and a frequency of transactions with a set distribution to produce one or more modeled parameters, detecting, based at least in part on the modeling, a hybrid application traffic characteristic, wherein the hybrid application traffic characteristic comprises a first data traffic type that is correlated with at least one data traffic characteristic of a transactional application and a second data traffic type that is correlated with at least one data traffic characteristic of a bulk application and analyzing the modeled parameters to predict a data flow size and frequency of one or more hybrid application sessions.

Any of the embodiments described above wherein the set distribution is selected from the group consisting of normal, Weibull and Pareto.

In accordance with an exemplary and non-limiting embodiment, a method comprises sending network usage data relating to an application usage session from a configurable device to a multi-tenant controller, wherein the network usage data comprises a first type of data flow associated with an application and a second type of data flow associated with the application, identifying a bandwidth requirement for each of the first and second types of data flows associated with the application based, at least in part, on historical data relating to the performance of the application and an associated data flow, storing within the multi-tenant controller the bandwidth requirement as an application bandwidth profile, sending the application bandwidth profile to at least one spoke device and using the application bandwidth profile to route data flows associated with the application.

Any of the embodiments described above wherein the application analysis is performed on a per session basis.

Any of the embodiments described above wherein routing is based, at least in part, on a dynamic and automated QoS definition.

Any of the embodiments described above wherein applications are selected from the group consisting of transactional applications and file transfer applications.

Any of the embodiments described above further comprising employing modeling and analytics selected from the group consisting of Pareto and Weibull.

Any of the embodiments described above further utilizing parameters to categorize data flows.

In accordance with an exemplary and non-limiting embodiment, a method comprises issuing a tuned request on a specified active link having an ingress shaper and an egress shaper to a server utilizing a link capacity to an extent in both a forward path and a return path, determining a link capacity for the active link, monitoring the active link and dropping any traffic traveling via the active link when a limit of at least one of the ingress shaper and the egress shaper is exceeded.

In accordance with an exemplary and non-limiting embodiment, a method comprises issuing a request on a specified active link having and ingress shaper and a egress shaper to a server utilizing a link capacity to an extent in both a forward path and a return path, determining a link capacity for the active link, monitoring the active link, determining a limit of the ingress shaper and the egress shaper based, at least in part, using bandwidth estimation logic and dropping any traffic traveling via the active link when the limit is exceeded.

In accordance with an exemplary and non-limiting embodiment, a method comprises receiving a plurality of business priority classes, detecting a network type associated with each of a plurality of application data flows in a network wherein the network data flow types are selected form the group consisting of real-time, bulk and transactional, creating a plurality of strict priority queues, fair queues and anomaly queues for each of the plurality of business priority classes and assigning real-time network data flows to real-time queues, transactional flows to fair queues and bulk flows to bulk fair queues.

In accordance with an exemplary and non-limiting embodiment, a method comprises monitoring a bandwidth of an application comprising an application session at a configured spoke device at a predetermined time interval and adjusting the bandwidth such that the bandwidth matches a requirement of the application session while meeting the requirements of one or more defined business priorities.

Any of the embodiments described above further employing a multi-tenant controller based mapping of a user or device identity to a network level identity.

Any of the embodiments described above wherein the application analysis is performed on a per session basis.

Any of the embodiments described above wherein routing is based, at least in part, on a dynamic and automated QoS definition.

Any of the embodiments described above further comprising employing modeling and analytics selected from the group consisting of Pareto and Weibull.

Any of the embodiments described above further comprising employing QoS standardized controls selected from the group consisting of shaping, policing, random early discard, tail drop, low latency queues, fair queues, anomaly queues and buffers.

Any of the embodiments described above further utilizing parameters to categorize data flows.

In accordance with an exemplary and non-limiting embodiment, a method comprises executing at a controller a horizontally scalable service Identity Definitions Manager (IDM) Service, mapping active directory (AD) domains to WAN network elements DNS ROLE and LDAP ROLE, instructing a plurality of network elements associated with a tenant to discover a plurality of AD domains and AD servers in an enterprise using the DNS ROLE, receiving from the plurality of network elements running DNS ROLE information indicative of changes to network attributes selected from the group consisting of AD domains, additions and subtractions of AD servers and changes in an IP address of AD servers, transmitting the received AD domains and AD servers to a tenant administrator and requesting credentials to communicate with added AD servers using LDAP, executing an algorithm to determine which element will contact specific AD instances to minimize lightweight directory access protocol (LDAP) traffic volume occurring on the WAN and to ensure AD instances can still be reached in case of failure of any one network element, monitoring in Active Directory servers changes in at least one identity (user or group) of a network user by using the LDAP ROLE on the network elements and updating a policy, based at least in part on the mapping of user identity in AD domains, at a multi-tenant controller, wherein the tracking of changing identity information is implemented as a horizontally scalable service the Identity Definitions Manager Service.

In accordance with an exemplary and non-limiting embodiment, a centrally controllable multi-tenant controller for controlling a plurality of assets across a plurality of distributed computing environments is configured to run at a controller a horizontally scalable service Identity Definitions Manager (IDM) Service, map active directory (AD) domains to WAN network elements DNS ROLE and LDAP ROLE, instruct a plurality of network elements associated with a tenant to discover a plurality of AD domains and AD servers in an enterprise using the DNS ROLE, receive from the plurality of network elements running DNS ROLE information indicative of changes to network attributes selected from the group consisting of AD domains, additions and subtractions of AD servers and changes in an IP address of AD servers, transmitting the received AD domains and AD servers to a tenant administrator and requesting credentials to communicate with added AD servers using LDAP; and execute an algorithm to determine which element will contact specific AD instances to minimize lightweight directory access protocol (LDAP) traffic volume occurring on the WAN and to ensure AD instances can still be reached in case of failure of any one network element, receive from the LDAP ROLE of network element changes in Active Directory servers in at least one identity (user or group) of a network and update a policy, based at least in part on the mapping of user identity in AD domains, at a multi-tenant controller, wherein the tracking of changing identity information is implemented as a horizontally scalable service the Identity Definitions Manager Service.

In accordance with an exemplary and non-limiting embodiment, a network element executing DNS ROLE and LDAP ROLE configured to obtain instructions from a central multi-tenant controller IDM server on which domains to discover AD servers in using DNS role, discover using DNS ROLE information indicative of changes to network attributes selected from the group consisting of AD domains, additions and subtractions of AD servers and changes in an IP address of AD servers, and transmitting this information to the multi-tenant controller IDM service, receive from the multi-tenant controller IDM service the credentials to communicate with discovered AD servers using LDAP and monitor in Active Directory servers changes in at least one identity (user or group) of a network user by using the LDAP ROLE on the network elements and transmitting these changes to the multi-tenant controller IDM service.

In accordance with an exemplary and non-limiting embodiment, a method comprises executing at a controller a horizontally scalable service IP to Site Mapping (ISM) Service, instructing a plurality of network elements associated with a tenant to discover a plurality of AD domains and AD servers in an enterprise, receiving from the plurality of network elements information indicative of changes to network attributes selected from the group consisting of AD domains, additions and subtractions of AD servers and changes in an IP address of AD servers, transmitting the received AD domains and AD servers to a tenant administrator and requesting credentials to communicate with added AD servers using WMI, executing an algorithm to determine which element will contact specific AD instances in order to contain WMI communication over LAN and minimize WMI communication over WAN, monitoring, using the WMI role on the network elements, the AD servers security login events comprising an IP address, a user AD ID and a user name, converting the login events to IP-to-user events and transmitting these to the ISM service in the controller, using the ISM service to map these IP-to-user events to the right spoke site, sending the events with enriched information comprising one or more group IDs for the user to the element in the spoke site and using the enriched IP to user event at the spoke site to enforce policy based on user and group IDs and to enrich flow and application statistics with user and group information.

In accordance with an exemplary and non-limiting embodiment, a centrally controllable multi-tenant controller for controlling a plurality of assets across a plurality of distributed computing environments wherein the controller is configured to execute at a controller a horizontally scalable service IP to Site Mapping (ISM) Service, instruct a plurality of network elements associated with a tenant to discover a plurality of AD domains and AD servers in an enterprise, transmit the received AD domains and AD servers to a tenant administrator and requesting credentials to communicate with added AD servers using WMI, transmit the credentials to the network elements running WMI ROLE, execute an algorithm to determine which element will contact specific AD instances in order to contain WMI communication over LAN and minimize WMI communication over WAN, receive from the elements a plurality of AD server login events which contain user IP address, user AD ID and user name, convert these login events to IP-to-user events and transmitting these to the ISM service in the controller using the ISM service to map these IP-to-user events to the right spoke site, send these events with enriched information comprising a group ID for the user to the element in the spoke site and use the enriched IP to user event at the spoke site to enforce policy based on user and group IDs and to enrich flow and application statistics with user and group information.

In accordance with an exemplary and non-limiting embodiment, a method comprises obtaining instructions from a central multi-tenant controller's IDM service to discover a plurality of AD domains and AD servers in an enterprise using DNS ROLE, transmitting information to a multi-tenant controller IDM indicative of changes to network attributes selected from the group consisting of AD domains, additions and subtractions of AD servers and changes in an IP address of AD servers, receiving credentials from the multi-tenant controller to communicate with added AD servers using WMI, monitoring, using the WMI role, the AD servers security login events comprising an IP address, a user AD ID and a user name and converting the login events to IP-to-user events and transmitting the login events to an ISM service in a controller.

In accordance with an exemplary and non-limiting embodiment, a method comprises receiving enriched IP to user event at a spoke site from a multi-tenant controller's IP to Site Mapping Service to enforce policy based, at least in part, on a user and a group ID and enriching flow statistics and application statistic with user and group information.

Any of the embodiments described above further utilizing a network identity type.

In accordance with an exemplary and non-limiting embodiment, a method comprises receiving information describing an addition of a first site comprising at least one application to an existing network wherein the information is selected from the group consisting of type of site, planned connectivity to the site and planned policies for the site; and estimating an impact on the operation of the at least one application and associated network traffic using statistical analysis of monitored data collected from a second site similar to the first site.

In accordance with an exemplary and non-limiting embodiment, a method comprises receiving information describing a change to a policy for an existing network wherein the information is selected from the group consisting of the policy to be changed and the network sites to which the policy is to apply and estimating an impact on the operation of the at least one application and associated network traffic using statistical analysis of monitored data collected from a second site similar to the first site.

In accordance with an exemplary and non-limiting embodiment, a method comprises receiving information describing a new network link to be added to an existing network site wherein the information is selected from the group consisting of the site and the network link to be added and estimating an impact on the operation of the at least one application and associated network traffic using statistical analysis of monitored data collected from a second site similar to the first site.

Any of the embodiments described above wherein the application analysis is performed on a per session basis.

Any of the embodiments described above wherein a branch type is selected from the group consisting of retail store bank, POS device, and distributed computing site.

Any of the embodiments described above wherein at least one application comprises a data center application.

Any of the embodiments described above wherein applications are selected from the group consisting of transactional applications and file transfer applications.

Any of the embodiments described above further comprising performing modeling and analytics selected from the group consisting of Pareto and Weibull.

Any of the embodiments described above wherein a network type is selected from the group consisting of wired and wireless.

Any of the embodiments described above further utilizing parameters to categorize data flows.

In accordance with an exemplary and non-limiting embodiment, a method comprises receiving at a branch device an assigned first hub device and an assigned second hub device associated with a data center, establishing a VPN data tunnel to the assigned first and second hub devices, designating the first hub device as a primary device and designating the second hub device as a secondary device and switching traffic destined for the primary device to the secondary device based, at least in part, on a cost of a link.

In accordance with an exemplary and non-limiting embodiment, a method comprises receiving at a branch device an assigned first hub device and an assigned second hub device associated with a data center, establishing a VPN data tunnel to the assigned first and second hub devices, designating the first hub device as a primary device, designating the second hub device as a secondary device, switching traffic destined for the primary device to the secondary device if a failure of the VPN data tunnel to the primary device is detected and switching traffic to the primary device and the secondary device in a revertive mode and non-revertive mode.

A networked branch device configured to receive at a branch device an assigned first hub device and an assigned second hub device associated with a data center, establish a VPN data tunnel to the assigned first and second hub devices, designate the first hub device as a primary device, designate the second hub device as a secondary device and switch traffic destined for the primary device to the secondary device if a failure of the VPN data tunnel to the primary device is detected.

Any of the embodiments described above further comprising switching traffic destined for the primary device to the secondary device based, at least in part, on a cost of a link.

Any of the embodiments described above wherein the first hub device and second hub device are assigned via an algorithm based, at least in part, on:
- data transfer statistics information collected from the branch device used as an input to estimate traffic load.
- internet link bandwidth estimation performed at the branch device used as input to estimate traffic load.
- the current known capacity limits of each hub device.
- the current allocated branch devices to each hub device in a cluster and the sum of their estimated load on the hub device.
- the current allocated branch devices to each hub device in a cluster and the actual load on the hub device.
- availability of total capacity of a hub cluster.
- network reachability of the new branch device to the all the elements of the hub cluster.
- ability to use all branch circuits when communicating with hub device.
- ability to use lower cost circuits when communicating with hub device.

Any of the embodiments described above wherein configurable devices comprise spoke devices.

Any of the embodiments described above wherein a data center type is selected from the group consisting of private cloud, scientific communities and co-location centers.

In accordance with an exemplary and non-limiting embodiment, a method comprises deploying in series a plurality of configurable devices configured to communicate with one another via a protocol for exchanging state information wherein at least one of the plurality of configurable devices is in an active state and at least one of the plurality of devices is in a standby state, detecting, by the at least one of the plurality of configurable devices in a standby state, a failure of a configurable device in an active state via a protocol and switching the at least one configurable device in a standby state to an active state.

In accordance with an exemplary and non-limiting embodiment, a system comprises a plurality of configurable devices deployed in series and configured to communicate with one another via a protocol for exchanging state information wherein at least one of the plurality of configurable devices is in an active state and at least one of the plurality of devices is in a standby state wherein the at least one of the plurality of configurable devices in a standby state is adapted to detect a failure of a configurable device in an active state via a protocol and in response thereto switch the at least one configurable device in a standby state to an active state.

In accordance with an exemplary and non-limiting embodiment, a method comprises deploying in series a plurality of configurable devices configured to communicate with one another via a protocol for exchanging state information wherein at least one of the plurality of configurable devices is self-selected to be in an active state and at least one of the plurality of devices is in a standby state, detecting, by the at least one of the plurality of configurable devices in a standby state, a failure of a configurable device in an active state via a protocol and switching the at least one configurable device in a standby state to an active state.

Any of the embodiments described above wherein connectivity is physical

Any of the embodiments described above wherein branch components are selected from the group consisting of switches and routers.

Any of the embodiments described above wherein configurable devices comprise spoke devices.

Any of the embodiments described above wherein switch types are selected from the group consisting of managed switch, unmanaged switch and stackable switch.

In accordance with an exemplary and non-limiting embodiment, a method comprises generating at a multi-tenant controller a common shared secret for establishing a link between a first site and a second site, transmitting the shared secret to each of the first site and the second site over a secured channel, assigning a wall clock based start and end validity period for the shared secret, sending the shared secret with a future validity to allow secure link communication to continue if one or more elements in both sites cannot communicate with the multi-tenant controller and using a separate shared secret per link per VXWAN In accordance with an exemplary and non-limiting embodiment, a method comprises receiving at a first channel end point a shared secret, generating a plurality of nonce values, exchanging the nonce values with a second channel end point, generating a plurality of session keys and refreshing the plurality of session keys at a predetermined time interval using the shared secret.

In accordance with an exemplary and non-limiting embodiment, a system comprises a first site, a second site in communication with the first site via a network and a multi-tenant controller configured to generate a common shared secret for establishing a link between the first site and the second site and to transmit the shared secret to each of the first site and the second site over a secured channel wherein the multi-tenant controller is configured to assign a wall clock based start and end validity period for the shared secret.

Any of the embodiments described above wherein shared secret generation is performed by software, hardware and/or a software and hardware hybrid.

BRIEF DESCRIPTION OF THE DRAWINGS

A further understanding of the nature and advantages of the present technology may be realized by reference to the figures, which are described herein.

DETAILED DESCRIPTION

Figure 1A:
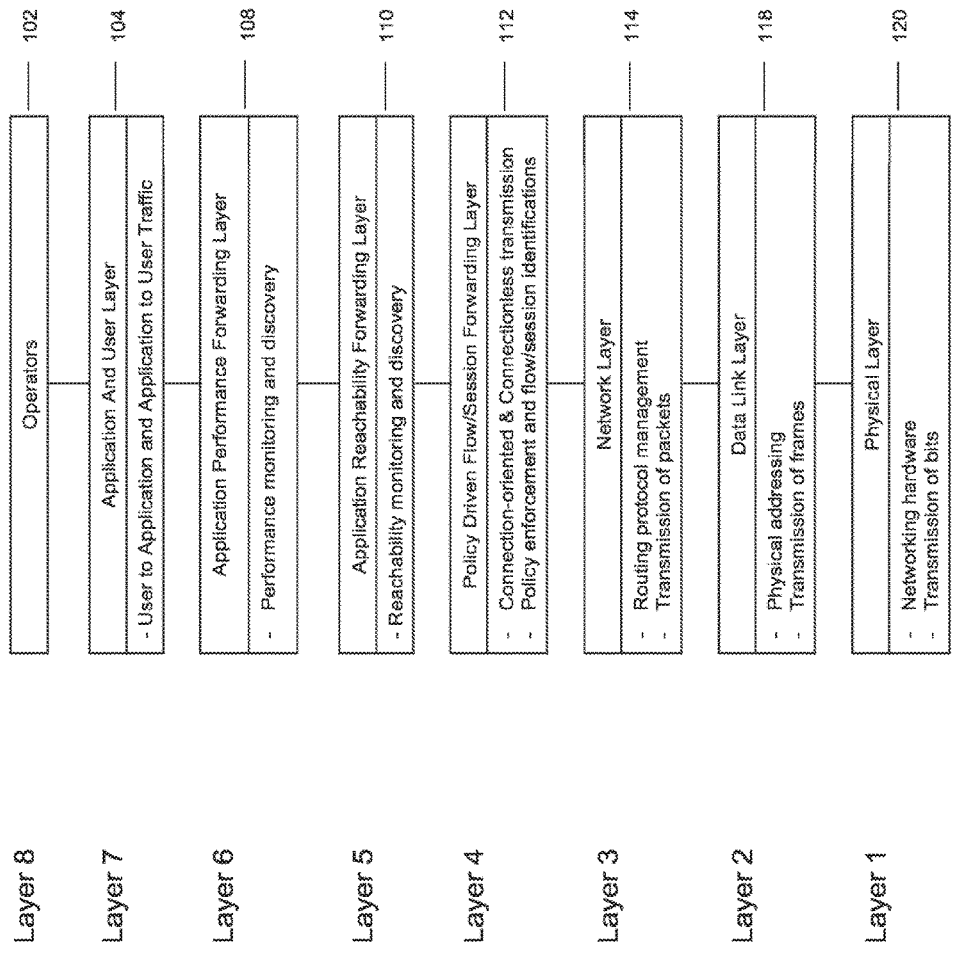
FIG. 1A provides a simplified schema of the layers within a data network architecture.

Referring to FIG. 1A, data networks, such as those used by large corporate enterprises and services providers, are modeled as eight network layers to describe the methods and systems of the present invention described herein. Within this framework, Layer 1 is the physical layer 120 consisting of basic networking hardware and data transmission infrastructure. Networking hardware may be deployed within a network across a plurality of physical sites, including but not limited to a data center 128, such as a distributed cloud computing network, and branch 152 locations that are connected to the data center 128. Data center 128 type as used herein includes, but is not limited to, a private cloud (e.g., Amazon or Google), a scientific community (e.g., a national laboratory), co-location centers, in-house data centers, or some other type of data center. Data centers 128 may be classified as Tier I, Tier II, Tier III and Tier IV.

Branches 152 may connect to data center 128 through physical or logical connectivity 150. Physical connectivity 148 may include, but is not limited to, a T1 link, such as that from a branch 152 to multiprotocol label switching (MPLS 144), or connectivity through a cable, or connectivity through DSL, or connectivity through wireless and cellular networks. Logical connectivity 150 may include, but is not limited to, a private wide area network (WAN) or a virtual private network (VPN). Connectivity may also be a hybrid, for example, a physical connectivity 148, through a T1 link, to the Internet 142 that includes elements of logical constructs. In an example, hardware, such as a multi-tenant controller 122 that controls switches, routers 162, hub devices, spoke devices, configurable devices 124, or some other hardware type may be deployed within a data center 128. A multi-tenant controller 122 as the term is used herein may refer to a multi-tenant, single-tenant, and/or plurality of associated single-tenant or multi-tenant controllers. A spoke device as the term is used herein may include, but is not limited to a branch device, each of which may be a configurable device 124, as described herein. A hub device as the term is used herein may refer to a hub device that is routed, in-path, distributed and load balanced, and/or distributed, load-balanced and routed. Switch as used herein includes, but is not limited to, a managed switch (e.g., a smart switch or enterprise-managed switch), an unmanaged switch, a stackable switch, or some other switch type.

Device as the term is used herein may include, but is not limited to, a hardware device, software device, physical device, virtual device or logical device.

Branches 152 may route data, data packets and other information to and from a data center 128 through, for example the Internet 142 or MPLS 144. Branches 152 may also route data, data packets and other information to and from Applications 148, Ad Networks 134 and Content Delivery Networks 138 through, for example the Internet 142 or MPLS 144. The Internet 142 may include a private cloud and be less expensive, but also less secure, than MPLS 144. MPLS 144 may include a private WAN. Examples of branch 152 types include, but are not limited to, a retail store, a bank store front, a data input point, such as a point-of-sale device, remote offices of an enterprise, and distributed computing sites.

Layer 2 of a data network is referred to as the data link layer 118. This layer includes the functional elements that enable the transfer of data, such as data units consisting of frames, from one network entity to a second network entity. Physical addressing of network elements also resides within Layer 2. The Media Access Control (MAC) sub layer controls how a computer on the network gains access to the data and permission to transmit it and the Logical Link Control (LLC) layer controls frame synchronization, flow control and error checking.

Layer 3 of a data network is referred to as the network layer 114. It is at this layer that functionality such as packet forwarding occurs, as well as elements of routing protocol management. Forwarding at this layer is packet-based as opposed to based on, for example data flows defined by occurring within an application session, as described herein. Routing protocols may include, but are not limited to, static routes, Border Gateway Protocol (BGP), Intermediate System-to-Intermediate System Protocol (IS-IS), Enhanced Interior Gateway Routing Protocol (EIGRP), and Open Shortest Path First (OSPF). Routing protocols provide a mapping of reachable network endpoints (IP Addresses) and the available network interfaces and paths available to reach them.

Layer 4 of a data network is referred to as the policy driven flow and session forwarding layer 112. Logical addressing, multiplexing, data flow control, packet fragmentation and reassembly may occur at this layer. Data forwarding and path selection at this layer may be based on Policy. A Policy specifies the treatment that should be offered to the application flow or application session, including choice of network paths. Policies thus provide a filtered set of network paths from Layer 3 available to an application or user at a network device.

Data forwarding and path selection at this layer may be based upon an application session. As used herein, a "session" refers to one or more flows identified as belonging to a client 512 accessing a specific application. As used herein, "client device" refers to a laptop computer, desktop computer, tablet computer, phone, smart phone, server, PDA, smart watch, wearable device, or some other type of client device capable of computing and/or interacting with a data network, as described herein. As used herein, a "flow" refers to a stream of packets (bidirectional) associated with a single session. As used herein, "packets" refer to the basic unit of data transfer in a network. As used herein, "session-flow" refers to any flow belonging to an identified session. Current solutions at this layer may be limited because they define applications by, for example, IP addresses or port numbers. Port numbers are not workable in cloud environments. For example, an application like Microsoft Exchange (Outlook email) may be served out of a port 135. When an email is delivered as a service from a cloud-computing environment, such as Gmail, Yahoo and the like, the client device 164 used may primarily connect over HTTPS (port 443). It is likely that many cloud-based applications are delivered through the same HTTPS port 443. Thus, the port information alone is not sufficient to define the application. The concept of an "application session," and the ability to define and identify an application session has utility because existing solutions are imprecise in determining the data flows that are associated with a given application. Existing solutions typically measure performance on those flows, which includes jitter, bandwidth (BW) and other metrics. "Flow" and "data flow" as used herein may include, but are not limited to a connection, TCP connection, transaction, application transaction, 3-way handshake, connections per second or CPS, session, application session, bi-directional exchange, bi-directional flow, unidirectional flow (e.g., in UDP based data exchanges), mixed flows, channels, netflow, concurrent flows, or some other type of data flow. A flow may consist of multiple packets, and a session may consist of multiple flows. Various parameters may be used to categorize data flows including, but not limited to, transactional, transactional real time and the like.

According to the methods and systems of the present invention described herein, a flow may be detected as belonging to an application, but also as belonging to an application session. An application session may collate different flows originating from same source and mark them as belonging to a session. Some of these flows may appear to be a completely different application, when in fact they are really not. Performance measurements may be cohesively used on all the flows belonging to a session, thus improving actual application performance and control. For example, some applications may not be impacted by packet loss. In another example, round-trip latency might not be relevant to applications that require multiple round trips for proper application performance. Latency issues may include, but are not limited to, geographical diversity of Internet connectivity, network traffic volume, the distance between a client 512 and a server, and packet loss. For example, packet loss may be caused by natural "lossiness" of the link/connectivity or due to network volume that causes congestion and thus increases packet loss. In an embodiment, an application session may be defined as a time frame, for example data derived from Time 1 to Time 2. In another embodiment, an application session may be defined as the time occurring between a user 168 logging in to use an application, and logging out to discontinue use of the application. In another example, an application session may be defined as data derived from activities that are considered related applications or sites, such as websites. For example, the Office365 application may include data flows to an Office365 portal, an Office365 Sharepoint, Lync or some other related service or site.

Layer 5 of a data network is referred to as the application reachability forwarding layer 110. Application-based forwarding may occur at this layer, and may be based on "reachability." Reachability refers to a point of differentiation within forwarding where the issue is not "can I reach a particular IP address through a specific path/connectivity," but instead "can I reach an application and can I do so in a manner that is consistent with a policy regarding the application." Enterprises may use multiple connectivity choices. For example, an enterprise may use MPLS 144 plus a Comcast Internet connection (i.e., a hybrid connectivity) for data routing. Layer 5 thus provides a filtered set of network paths from Layer 4 available to an application based on reachability.

Layer 6 of a data network is referred to as the application performance forwarding layer 108. Application based forwarding may be based on performance. A user's 168 Internet point of presence (POP) might be geographically diverse. This can create a latency problem (slower performance). A configured device and controller may monitor applications of interest to user 168 and adjusts selectable paths and forwards traffic based on application performance. Controller as the term is used herein refers to a multi-tenant controller. Forwarding decisions taken may be carried out consistent with a policy, with connectivity permissions, or some other rule or criterion. Layer 6 thus provides a filtered set of network paths from Layer 5 available to an application based on applications performance on one or more network paths.

Layer 7 of a data network is referred to as the application and user layer 104. This is where applications and users operating over the network resides. The traffic from user to application and from application to user enters at this layer and based on the final filtered set of network paths for that application and user, an appropriate path is chosen for forwarding.

Layer 8 of a data network is referred to as the operator layer 102. This is where the network operators reside, such as an IT administrator that is responsible for setting user-based policies, generating reports, or some other administrative function.

Figure 1B:
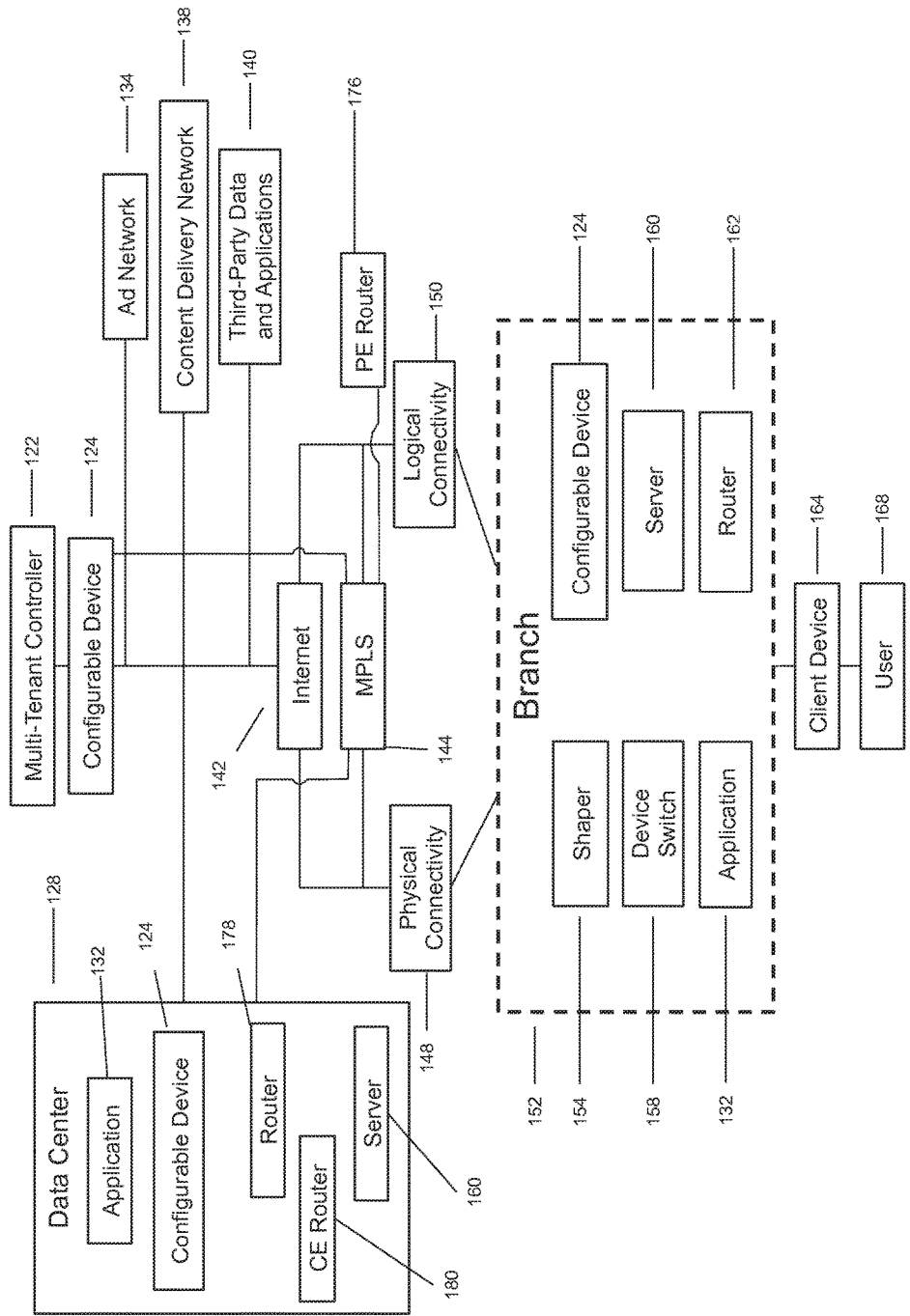
FIG. 1B illustrates a simplified embodiment of an architecture employing a multi-tenant controller is association with a plurality of network facilities and devices.

In accordance with exemplary and non-limiting embodiments, and referring to FIG. 1B, a multi-tenant controller 122 may be associated with a configured device within a data network. The multi-tenant controller 122 and the configured device may have physical or logical connectivity 150 with a plurality of facilities, including but not limited to, a data center 128 or a plurality of data centers 128, an ad network 134, a content delivery network 138, and third party data and applications 140. Data centers 128 within the network in this simplified example, and with which the multi-tenant controller 122 may communicate, may have hub devices, additional configured devices and/or applications 132, with which the multi-tenant controller 122, and/or configured device associated with the multi-tenant controller 122, may communicate. Ad networks 134, content delivery networks 138, and third party data and applications 140 may provide data into the network, such as pairing an advertisement with a web content delivery to a client device 164, the data of which may be recognized, tracked and recorded by the multi-tenant controller 122, and/or the configured device that is associated with the multi-tenant controller 122. Data within the network may derive from a branch 152 of the network, such as a physical office or store of an enterprise. A branch 152 may have network facilities, including but not limited to, a shaper 154, a device switch 158, an application 132, a configured device, a server 160, a router 162, or some other network facility or device. The branch 152 may communicate with other facilities within the network, such as the data center 128 or the multi-tenant controller 122, through the Internet 142 or MPLS 144, using physical or logical connectivity 150. A user 168 of the network may interact with a client device 164 to access the network, for example, a user 168 may use a computing tablet, such as an iPad, to interact with a bank branch 152 in order to transfer money from one bank account to another. As described herein, a multi-tenant controller 122, including in conjunction with a configured device, may monitor the network activity, record and store such activity for the purpose of optimizing the flow of traffic over the network so that it is consistent with a policy, such as a policy indicating that a certain type of data flow (e.g., "sensitive banking data") be given preferential routing relative to less important data (e.g., "Internet banner advertisements"), or some other type of policy.

In traditional networks, applications used in enterprises have different levels of need from a wide area network (WAN). Available WAN solutions forward traffic primarily based on reachability information and at best do so utilizing data indicative of link level conditions such as packet error rates and packet loss rates.

Legacy networks, especially WANs, connect locations or sites. These sites may be remote offices or branches 152 and data centers 128. Typically, applications reside in these data centers 128 and users 168 access these applications through the network. If a specific application needs differential treatment either for quality of service (QoS) or routing (e.g., want to send certain application traffic through a certain location), the only way to achieve this was to manually translate that application to a network identity, typically an IP address or IP address range, and then manipulate routers 162 and routing protocols to achieve the intent (differential treatment).

The complexity surrounding such manipulation and achievement of the business intent can be enormous, and mostly involves a "change and pray" approach. Policy based security/firewalls and policy based routing has been in place for a while. Firewalls mostly use policies to allow/deny traffic, and, in some cases, allowed traffic to be given forwarding/path constraints. Typically, router devices 162 use "routemaps" which allow certain packets matched by IP address and packet lengths to be classified and treated according to some policy specifications. These policy specifications allow for choice of the next-hop destination for each packet. Therefore there is a need for methods and systems for determining the location-based distribution of applications and related definitions, path characterizations and the dynamic characterization of applications for determining optimal, policy-based path selection of application traffic flows across the available network assets.

In accordance with exemplary and non-limiting embodiments, there is provided a method by which the WAN may adjust to yield to the needs of applications in order to provide an optimal or near optimal experience to the users 168. The production of such an experience begins with the routing of application flows on the most suitable link present at a branch office 152, meeting the needs of an application. Once an application flow is placed on an appropriate link, sufficient network resources may be guaranteed in accordance to a policy specification for the application flow.

Figure 1C:
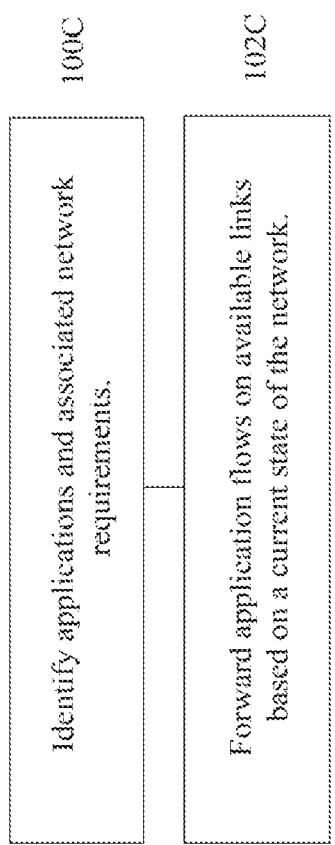
FIG. 1C illustrates a simplified embodiment for forwarding application data flows in accordance with a detected network status.

With reference to FIG. 1C, there is illustrated a method according to an exemplary and non-limiting embodiment. First, at step 100C applications are identified as are the network requirements of the applications. Then, at step 102C application flows are forwarded appropriately on the various available links, based on the current state of the network 528. These forwarding decisions constantly evolve based on the dynamic state of the network 528.

In accordance with exemplary and non-limiting embodiments, configurable spoke devices perform the traffic forwarding decisions, and are provided the necessary pieces of information: a) application identification details and b) application traffic profiles.

Each configurable device 124 also maintains the path characterization information. Path characterization may include information on bandwidth availability on a link, latency profiles, traffic volume caps on a link and the like. The configurable device 124 may then choose a link meeting all the constraints that is most optimal or most nearly optimal for an application at that time instant.

In accordance with exemplary embodiments, application intelligence and unique path characterization details are utilized to choose the most suitable link. The multi-tenant controller 122 effectively "understands" what an application is, beyond its IP address, and configurable devices 124 at a branch 152 may parse and detect if a specific flow represents a specific application or not.

As a result, a simple policy model may be implemented by which one can specify a business intent directly and the multi-tenant controller 122 and device together make it happen in the network. Such an expression of business intent may be, for example: "For Application Salesforce, give it Gold priority, send it through Atlanta DC".

Figure 1D:
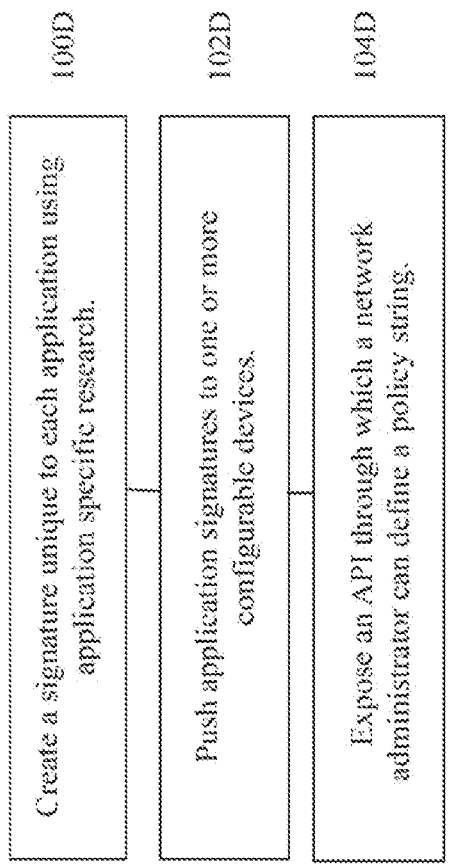
FIG. 1D illustrates a simplified embodiment for utilizing application signatures in association with policy strings.

With reference to FIG. 1D, there is illustrated a method according to an exemplary and non-limiting embodiment. At step 100D, application specific research yields a signature unique to every application. In embodiments, an application signature may include a combination of one or more of the following: (a) Domain name(s), (b) URLs, (c) a Server Network Identity (SNI), (d) a source and/or destination IP address, (e) a source and/or destination port and (f) any sequence of bytes at static positions in encrypted or unencrypted flow transactions, (g) any sequence of bytes following a matching previous sequence of bytes in encrypted or unencrypted flow transactions, (h) size/transmission/frequency patters of encrypted flow transactions (i) order and pattern of flow establishment and data relative to other flows seen.

In accordance with an exemplary and non-limiting embodiment, a method comprises determining a signature for each of a plurality of applications based, at least in part, on at least one of a domain name, a URL, a Server Network Identity (SNI), source IP address, a destination IP address, a source port, a destination port, including any sequence of bytes at static or dynamic positions in encrypted or unencrypted flow transactions, any sequence of bytes following a matching previous sequence of bytes in encrypted or unencrypted flow transactions, size, transmission, frequency patters of encrypted flow transactions, order and pattern of flow establishment and data relative to other flows seen and HTTP metadata, transmitting each of the signatures to a branch device 152 and transmitting a policy string 202 defining a business policy to be applied to a data flow exhibiting the signature to the branch device 152.

In accordance with an exemplary and non-limiting embodiment, a method comprises receiving a signature for each of a plurality of applications based, at least in part, on at least one of a domain name, a URL, a Server Network Identity (SNI), source IP address, a destination IP address, a source port, a destination port, including any sequence of bytes at static or dynamic positions in encrypted or unencrypted flow transactions, any sequence of bytes following a matching previous sequence of bytes in encrypted or unencrypted flow transactions, size, transmission, frequency patters of encrypted flow transactions, order and pattern of flow establishment and data relative to other flows seen and HTTP metadata, receiving at least one policy string 202 defining a business policy, analyzing at least one network data flow to detect the presence of the signature and applying the business policy to the at least one network data flow comprising the detected signature.

In accordance with an exemplary and non-limiting embodiment, a centrally controllable multi-tenant controller 122 for controlling a plurality of assets across a plurality of distributed computing environments is configured to determine a signature for each of a plurality of applications based, at least in part, on at least one of a domain name, a URL, a Server Network Identity (SNI), source IP address, a destination IP address, a source port, a destination port, including any sequence of bytes at static or dynamic positions in encrypted or unencrypted flow transactions, any sequence of bytes following a matching previous sequence of bytes in encrypted or unencrypted flow transactions, size, transmission, frequency patters of encrypted flow transactions, order and pattern of flow establishment and data relative to other flows seen and HTTP metadata, transmit each of the signatures to a branch device 152 and transmit a policy string 202 defining a business policy to be applied to a data flow exhibiting the signature to the branch device 152.

In accordance with an exemplary and non-limiting embodiment, a networked branch device 152 is configured to receive a signature for each of a plurality of applications based, at least in part, on at least one of a domain name, a URL, a Server Network Identity (SNI), source IP address, a destination IP address, a source port, a destination port, including any sequence of bytes at static or dynamic positions in encrypted or unencrypted flow transactions, any sequence of bytes following a matching previous sequence of bytes in encrypted or unencrypted flow transactions, size, transmission, frequency patters of encrypted flow transactions, order and pattern of flow establishment and data relative to other flows seen and HTTP metadata, receive at least one policy string 202 defining a business policy, analyze at least one network data flow to detect the presence of the signature and apply the business policy to the at least one network data flow comprising the detected signature.

In accordance with various embodiments, these application signatures are generated and published to the multi-tenant controller 122. In practice, the customer may use whatever method he/she is naturally inclined to utilize. In some embodiments, customers may specify the signature in domain name/urls as applications are increasingly becoming web oriented.

Next, at step 102D, the multi-tenant controller 122 may push the application signatures to configurable branch devices 124. Every configurable device 124 has the capability to parse every flow that goes through the configurable device 124 and detect the presence of the application signature as the flow starts.

Once matched, additional functions can be applied to the flow. Finally, at step 104D, the multi-tenant controller 122 exposes an API through which the network admin/user can define a POLICY STRING 202 to express the Business Intent as follows:

<APP>, <IDENTITY>-<PRIORITY>, <SERVICE>, <VXWAN>, <PATH>

Where,

APP—Application name/id, provided by provider of configured devices or custom defined by network admin/user IDENTITY—User name/id or Device id, optional PRIORITY—Business Priority for the <APP, IDENTITY> combination SERVICE—Service(s) that should be provided for the <APP, IDENTITY> combination, optional VXWAN—Virtual WAN isolation identifier for the <APP, IDENTITY> combination, optional. Examples include, but are not limited, to a network isolation identifier.

PATH—Path constraints for the <APP, IDENTITY> combination, optional

As used herein, "policy string" 202 defines, generally, who can connect to what application with what kind of priority. "Business Priority" refers to the abstraction of quality of service (QoS) into categories. In exemplary embodiments, a standardized policy string 202 format may be utilized. In accordance with an exemplary and non-limiting embodiment, a centrally controllable multi-tenant controller 122 for controlling a plurality of assets across a plurality of distributed computing environments may be configured to allocate a network-isolation identifier to each of a plurality of policies that contains the same VXWAN directive and transmit each of the plurality of policies with that network-isolation identifier to one or more devices in a network. A network-isolation identifier as used herein includes, but is not limited to, a virtual network identifier (VNI), segment identifier, and/or network identifier. A network-isolation identifier may be or may include numeric data, alphabetic data, and/or alphanumeric data. A policy identifier may include a network-isolation identifier.

With the capabilities described above, every branch configurable device 124 may look for the application signature associated with an application, and when detected, enforces the Policy as follows:

| | |
|---|---|
| PRIORITY | Enforces priority queues, similar to classic QoS, within the device and specific to the interface on which the flow is exiting and entering the device. The enforcement happens in a bidirectional manner affecting the download and upload directions, thus causing the flow and thus the application to operate within the bounds of the PRIORITY intent. |
| SERVICE | Forwards the flow, and thus the application, to a specific service. A SERVICE, which is defined separately, could be reached from the device through normal L3 forwarding, or through an L3 tunnel, or be defined as a recipient of the copy of the flow. In the latter case, the configured device makes a copy of every packet of the flow in both directions, and sends it to the service, wherever it may exist in the network. The other two services are expected to be in the path of the flow and thus the flow is forwarded towards that Service through normal L4->L3 forwarding. |
| VXWAN | As the flow is forwarded, the configured device can optionally add a "VXWAN" label/encapsulation, which is a Virtual WAN Identifier. This VXWAN 204, similar to VXLAN in the data center 128, has applications beyond just encapsulation. |
| PATH | Path directive, if present, constrains the paths the flow for the APP and/or IDENTITY specified in the policy, is allowed to take as the flow exits the configured device. |

VXWAN 204 allows customers to create several small, isolated overlay tunnels over the same physical underlay. Each tunnel may be encrypted with a different set of keys, such that even if keys of one of the tunnels is compromised, others are not exposed. From a customer's perspective, VXWAN 204 allows customers to create isolated network segments end to end (with VLANs in the branch 152 and DCs, and VXWAN 204 in the WAN). This helps in setting operational boundaries between the various teams in the enterprise, securing the various parts of network infrastructure independently, and meet various regulatory compliance requirements, such as PCI.

Advantages associated with these embodiments include a policy string 202 used for business intent and not for just choosing the next hop or security treatment. Further, currently implemented solutions lack the concept of VXWAN 204. In addition, while certain security products have used APP and IDENTITY for the purposes of local security enforcement and have separately provided a way to direct traffic on specific interfaces, the described method goes beyond this such that the APP and IDENTITY are used to specify the network treatment of the flow across the entire WAN.

From a routing perspective, a server 160 or a next hop may be reachable even though an application is not available on the path. For example, an HTTP proxy sitting on a path may be having performance issues and may be blocking connections. From a routing perspective, this blocking will not be seen as a failure and packets will continue to be forwarded to the proxy. It is further possible that the latency on a path is so high that an application is effectively unusable while operation of the application on a different path would be fine. In embodiments, an application may also reside in the Internet, such as possibly with an Ad Network 134, Content Delivery Network 138, or Third Party Data Applications 140.

In accordance with exemplary and non-limiting embodiments, application level probing ensures that an application is reachable and usable by a user 168 at all times. Configurable spoke devices perform "app probing", where the configurable spoke device 124 periodically checks for the health of the applications on all of the paths. The configurable device 124 may then rate the links from best path to worst path, and provide this information to the multi-tenant controller 122.

Upon receiving the information, the multi-tenant controller 122 may use the information to route application flows. Rating of the links may be as simple as ordering by the lowest network latency, or may be as sophisticated as considering application level transaction latencies.

In accordance with exemplary embodiments, active probing and rating the network paths may be performed in the context of each application (e.g., box.com) or sub-application (e.g., office365-lync, office365-sharepoint) for SaaS services. In the case of enterprise applications, active probing may be performed on the specific servers 160 of an application, as there can be many application delivery end points in an enterprise. For example, for Server Message Block (SMB) (file share) applications, there may be many servers 160 that serve an application with different content.

As described herein, active probing differs from generic probing such as is typically practiced. When employing generic probing, a typical ping to a known server may get through (establishing L3 connectivity) even when a connection to the server 160 may not be established. By establishing a session with the server 160 via active probing, present embodiments establish application level connectivity.

In accordance with various embodiments, there may be performed a server level check, in the context of applications. For example, some applications like SMB have a service end point per server 160, unlike a SAAS service where there can be many servers 160 backing a single HTTP service. The applications in the former category are internal enterprise applications. For this category of applications, one may monitor at a server level. In some scenarios it is even possible that a single server may host multiple services, like SMB and HTTP. In that case, the same server will be probed for each service end point. In other words, the probing is done actual service delivery endpoint to make sure that the application is accessible.

In some scenarios, the location from which an application is served is less than optimal. This is often the case with SAAS apps where applications may be delivered from multiple locations, e.g., western United States, eastern United States, the European Union, Latin America, etc. In such cases, it is often best to send such application flows initiated by a user 168 at a branch 152 to the closest possible app delivery location. In practice, this may not happen due to, for example, (1) the location of DNS servers and query points, (2) sub-optimal policies and (3) the unavailability of information related to application delivery locations.

Figure 1E:
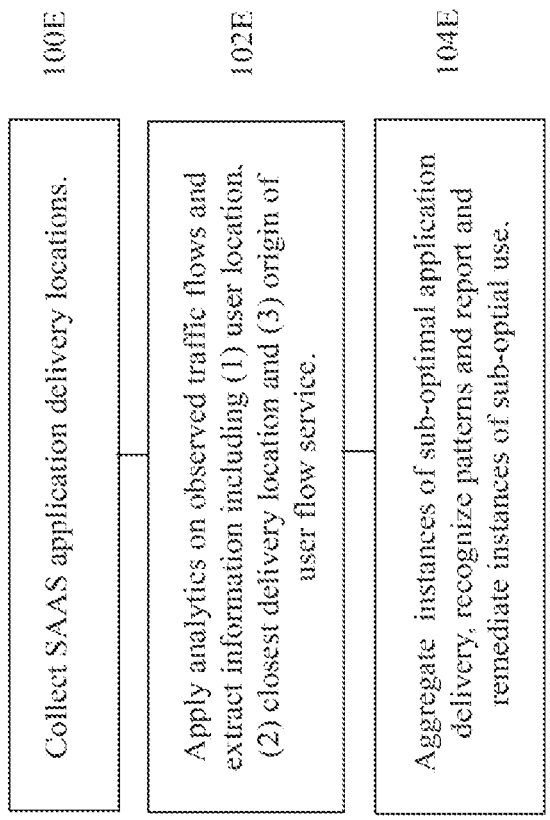
FIG. 1E illustrates a simplified embodiment for analyzing data traffic flows to detect sub-optimal network performance.

With reference to FIG. 1E, there is illustrated a method according to an exemplary and non-limiting embodiment. First, at step 100E, according to exemplary embodiments, SAAS application delivery locations may be identified via (1) manual information collection and feeding the system, (2) triangulation based on sourcing DNS queries from various locations across the globe and (3) information collected through app-probing as described above.

After collecting such information, at step 102E, the system may apply analytics by a component of the multi-tenant controller 122 on all observed traffic flows and extract the following three pieces of information: (1) where is the user 168 located (based on site information), (2) where is the closest application delivery location (using the above set of data) and (3) where was the user flow serviced from.

Then, at step 104E, the system may then (1) aggregate instances where the application was delivered from a sub-optimal location (based on originating geographic location), (2) recognize patterns and (3) if there is significant and consistent sub-optimal use, reports such use to a user, such as the administrator, of the multi-tenant controller 122.

In an exemplary and non-limiting embodiment, the methods and systems described herein may be applied to address and remediate instances of sub-optimal use.

As a result, there is provided (1) automatic application service delivery location learning, (2) a geo-IP based approach to determine the actual application delivery location and (3) identification and reporting of sub-optimal selection of service delivery location.

In accordance with exemplary embodiments, the definition of applications may be performed on a per-site basis based, at least in part, on geography. In such instances, application detection profiles may be defined by system operators/administrators and/or customers. These profiles may then be propagated from the multi-tenant controller 122 to configurable devices 124 so that the configurable devices 124 can detect applications.

SAAS applications 604 typically have service/application offering locations distributed around the globe. When a user 168 accesses an application, they are directed to the closest service offering location. Because different service offering locations have different HTTP domain names, application definitions need to include the domain names.

In accordance with exemplary embodiments, instead of uniformly distributing an application definition with all of the domain names to all of the configurable devices 124, the application definition may be customized based on the location of the configurable device 124 to which it is distributed.

For example, one may send the application definition "eu.xforce.com" to a device in Europe, and "na.xforce.com" to a device in North America. Definitions sent to configurable devices 124 are customized based, at least in part, on the location of the configurable device 124.

In accordance with exemplary and non-limiting embodiments, each configurable spoke device 124 may collect and report statistics from the site where located to the multi-tenant controller 122. The multi-tenant controller 122 may then send back a traffic profile to the configurable device 124 applicable to the site. For new sites, for which a traffic profile may not exist, the system may choose the most common traffic profile for distribution and then customize it for the site soon after. In some embodiments, measurements of throughput from a server 160 to an end point may be normalized by subtracting out the server 160 contribution and normalizing the time in flight based on the size of a transaction. Thus, there is provided a method for the dynamic and on-going characterization of applications on a per site basis and adjusting the behavior of the network in response thereto. In accordance with exemplary embodiments, the methods described herein may be applied to transactional applications including, but not limited to, chat programs, VoIP, video conferencing and screen sharing programs.

In accordance with various exemplary embodiments, methods and systems for network traffic characterization described above may utilize physical connectivity 148, logical connectivity 150 or hybrid connectivity as described elsewhere herein. Furthermore, such methods and systems may be applied to application sessions as described above. Such methods and systems as described herein may be utilized by and for all manner of data center 128 applications as described herein.

In accordance with various exemplary embodiments, methods and systems for network traffic characterization described above may utilize dynamic automated QoS definition as described herein. Exemplary embodiments may utilize file transfer applications and QoS standardized controls as described herein. Other exemplary embodiments may utilize parameters for categorizing data flows as described herein.

The following are illustrative clauses demonstrating non-limiting embodiments of the inventions described herein:

A method comprising:
  determining a network requirement for at least one application;
  dynamically determining a link suitable for data transmission in accordance with a policy based at least in part on a current network condition to meet the network requirement; and
  routing one or more application network data flows associated with the at least one application over the link.

A method comprising:
  determining a network requirement for at least one application;
  determining a link suitable to meet the network requirement based, at least in part, on at least one of a plurality of application identification details and an application traffic profile; and
  routing one or more application network data flows associated with the at least one application over the link.

Any of the clauses above wherein the application is operating at a node.

Any of the clauses above wherein the application is operating at a branch.

Any of the clauses above wherein dynamically determining the link is performed by a configurable spoke device.

Any of the clauses above wherein the configurable spoke device maintains path configuration information.

Any of the clauses above wherein path configuration information is selected from the group consisting of bandwidth availability on a link, a latency profile and a traffic volume cap.

A method comprising:
  determining a signature for each of a plurality of applications based, at least in part, on at least one of a domain name, a URL, a Server Network Identity (SNI), source IP address, a destination IP address, a source port, a destination port, any sequence of bytes in one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata;

transmitting each of the signatures to a branch device; and transmitting a policy string defining a business policy to be applied to a data flow exhibiting the signature to the branch device.

A method comprising:

receiving a signature for each of a plurality of applications based, at least in part, on at least one of a domain name, a URL, a Server Network Identity (SNI), source IP address, a destination IP address, a source port, a destination port, any sequence of bytes at one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata;

receiving at least one policy string defining a business policy;

analyzing at least one network data flow to detect the presence of the signature; and applying the business policy to the at least one network data flow comprising the detected signature.

A centrally controllable multi-tenant controller for controlling a plurality of assets across a plurality of distributed computing environments wherein the controller is configured to:

determine a signature for each of a plurality of applications based, at least in part, on at least one of a domain name, a URL, a Server Network Identity (SNI), source IP address, a destination IP address, a source port, a destination port, any sequence of bytes at one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata;

transmit each of the signatures to a branch device; and transmit a policy string defining a business policy to be applied to a data flow exhibiting the signature to the branch device.

A networked branch device configured to:

receive a signature for each of a plurality of applications based, at least in part, on at least one of a domain name, a URL, a Server Network Identity (SNI), source IP address, a destination IP address, a source port, a destination port, any sequence of bytes at one of a static position and a dynamic position in encrypted or unencrypted flow transactions, any sequence of bytes following a matching previous sequence of bytes in encrypted or unencrypted flow transactions, at least one of a size, a transmission and a frequency pattern of encrypted flow transactions, an order and a pattern of flow establishment and data relative to other flows seen and HTTP metadata;

receive at least one policy string defining a business policy;

analyze at least one network data flow to detect the presence of the signature; and apply the business policy to the at least one network data flow comprising the detected signature.

Any of the clauses above wherein the policy string comprises elements selected from the group consisting of a user identity, a SERVICE, a path and a VXWAN.

A method comprising:

checking at a predetermined interval a status of one or more network paths to a remotely located application;

rating the relative status of each of the one or more network paths wherein the rating is based at least in part on at least one of network latency and an application level transaction latency; and utilizing the rating to route an application data flow associated with the application.

A networked branch device configured to:

check at a predetermined interval a status of one or more network paths to a remotely located application;

rate the relative status of each of the one or more network paths wherein the rating is based at least in part on at least one of network latency and an application level transaction latency; and utilize the rating to route an application data flow associated with the application.

Any of the clauses above wherein the rating of the network paths is in the context of an operability of an application.

Any of the clauses above wherein the rating of the network paths is further based, at least in part, on a bandwidth of the path, a MOS score, a packet loss and jitter.

A method comprising:

determining a delivery location of an application based, at least in part, upon at least one of manual information collection, triangulation based on source DNS queries and application probing;

analyzing at least one network traffic flow associated with the application to extract data comprising at least one of a user location, a closest application delivery location and a source of user flow service;

aggregating the extracted data to identify a plurality of sub-optimal use instances wherein the application was delivered from a sub-optimal location; and reporting the sub-optimal use instances to a user of the application.

Any of the clauses above further comprising taking an action to at least partially mitigate the sub-optimal use instance.

Any of the clauses above wherein the user is an administrator.

A centrally controllable multi-tenant controller for controlling a plurality of assets across a plurality of distributed computing environments wherein the controller is configured to:

determine a delivery location of an application based, at least in part, upon at least one of manual information collection, triangulation based on source DNS queries and application probing;

analyze at least one network traffic flow associated with the application to extract data comprising at least one of a user location, a closest application delivery location and a source of user flow service;

aggregate the extracted data to identify a plurality of sub-optimal use instances wherein the application was delivered from a sub-optimal location; and report sub-optimal use instances to a user of the application.

Any of the clauses above configured to take an action to at least partially mitigate the sub-optimal use instance.

Any of the clauses above wherein the user is an administrator.

A method comprising:
determining a location of one or more service offering locations each hosting a plurality of applications each having an associated application definition;
determining a location of a device configured to access at least one of the plurality of applications; and
transmitting to the device an application definition for each of the applications to which the device has access, wherein the application definition is based, at least in part, on the location of one or more service offering locations and the location of the device.

A centrally controllable multi-tenant controller for controlling a plurality of assets across a plurality of distributed computing environments wherein the controller is configured to:
determine a location of one or more service offering locations each hosting a plurality of applications each having an associated application definition;
determine a location of a device configured to access at least one of the plurality of applications; and
transmit to the device an application definition for each of the applications to which the device has access, wherein the application definition is based, at least in part, on the location of one or more service offering locations and the location of the device.

A centrally controllable multi-tenant controller for controlling a plurality of assets across a plurality of distributed computing environments wherein the controller is configured to:
receive application data flow information from a spoke device within a network that is associated with an enterprise site; and
transmit a traffic profile to the enterprise site based at least in part on a current network data flow characteristic.

Any of the clauses above wherein a data transfer control over the network is at least one of application based and policy based.

Any of the clauses above further comprising applying time-based application domain classification and mapping to determining steps.

Any of the clauses above wherein the network comprises connectivity selected from the group consisting of hybrid, physical and logical.

Any of the clauses above wherein the application analysis is performed on a per session basis.

Any of the clauses above wherein at least one application comprises a data center application.

Any of the clauses above wherein the policy string format is standardized.

Any of the clauses above wherein routing is based, at least in part, on a dynamic and automated QoS definition.

Any of the clauses above wherein applications are selected from the group consisting of transactional applications and file transfer applications.

Any of the clauses above further comprising employing QoS standardized controls selected from the group consisting of shaping, policing, random early discard, tail drop, low latency queues, anomaly queues, fair queues and buffers.

Any of the clauses above further utilizing parameters to categorize data flows.

In traditional networking, adequately partitioning network traffic can be problematic. Partitioning may be done based at least in part on, but not limited to, routing uniqueness, security criteria, or network isolation. Using existing techniques, partitioning is typically implemented by virtual local area networks (VLANs) and virtual routing and forwarding (VRFs). VLANs and VRFs may be linked manually, where the manual linkage is at the branches 152 and data centers 128. This manual linkage may provide network isolation across a wide area network (WAN), but there exists a need for controlling data flows in a policy-based manner that is application-specific and/or identity specific, where the implementation of the policy, and related data flow rules, is embodied in a device that is centrally controlled by a multi-tenant controller 122. The multi-tenant controller 122 may be further used to establish extranet IPSEC VPN tunnels between separate enterprises (and associated networks).

According to the methods and systems of the present invention described herein, a software defined enterprise WAN (SDEwan) may be used to create a network that is embodied in an application network driven model. A business intent of the model may be expressed through a policy string 202. A policy string 202 may allow a specific application or identity to be specified that provides control over data flows occurring over the network. Control may be per-application, per-identity, a combination of application and identity, or based on some other parameter. In an embodiment, as part of a policy string 202, a virtual extensible WAN (VXWAN) 204 may be specified that causes a device to encapsulate a specific set of flows identified by that policy in a unique VXWAN 204. A VXWAN 204 may comprise a network-isolation identifier or label that may be put on the wire as data/packets belonging to the flows captured by the policy are forwarded between devices. A VXWAN 204 may comprise an optional unique encryption afforded only to packets belonging to the flows captured by the policy. A VXWAN 204 may comprise a way to insert a VXWAN network-isolation identifier at an entry point in the network and remove the network-isolation identifier at the exit in the network for the flow in a specific direction. A VXWAN 204 may be bidirectional in that the same VXWAN network-isolation identifier can be used for both directions of the traffic. A VXWAN network-isolation identifier name space may be global and allocated and managed by a multi-tenant controller 122, as defined herein.

In embodiments, a network administrator may specify a policy for an application or identity, or application-identity combination. This may include a VXWAN directive and may also include the type of path to take, including but not limited to the Internet 142, a private WAN, a wireless route, and, for example, whether to use encryption or not. Encryption as used herein includes, but is not limited to, standard encryption methods, differentiated encryption methods, advanced encryption standard, OpenPGP, CipherSaber, or Triple Data Encryption Algorithm. A policy may also specify a priority level to be given to an identity, application or identity-application combination. For example, a policy may provide that all PCI applications, irrespective of the VLAN on which they arrive, on the LAN side, should be placed on a PCI VXWAN. In another example, a policy may provide that all traffic from voice VLAN be placed on a voice VXWAN. Examples of identities include, but are not limited to a user group, executive user group, specific individual (e.g., Tim Jones the CEO), specific enterprise department (e.g., Finance), or some other identity.

Figure 2:
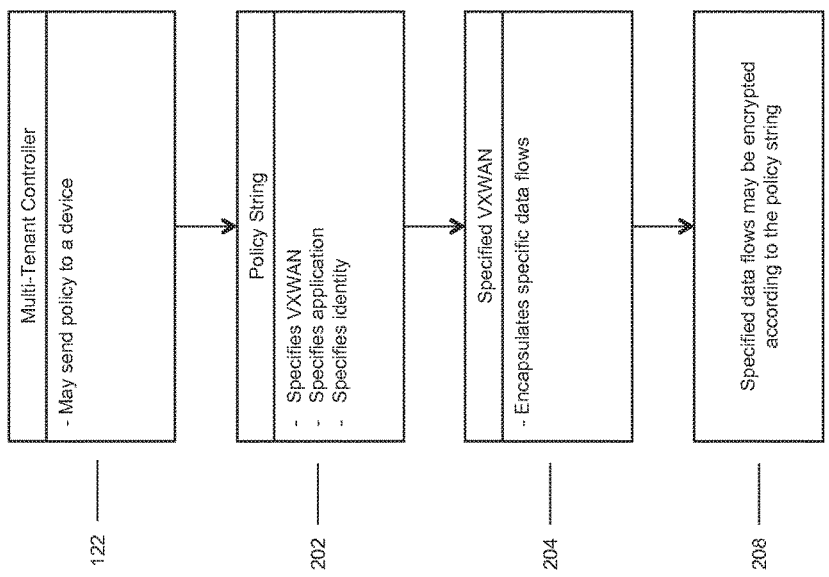
FIG. 2 Illustrates a sample embodiment of using a multi-tenant controller to provide a policy, such as a network performance policy, in association with a VXWAN to encapsulate and encrypt specified data flows according to a policy.

According to the methods and systems of the present invention described herein, and referring to FIG. 2, a multi-tenant controller 122 may be provided and used to implement a policy, policy string 202, or some other rule-based operation governing data flows over a network. A multi-tenant controller 122 may allocate a numeric network-isolation identifier or label from a namespace it manages for a tenant. The controller may send policies to devices in the network, and such policies may have VXWAN 204 specified and include any network-isolation identifiers allocated by the multi-tenant controller 122. As a device identifies the application and identity of data flows entering and exiting the device, it may apply the policies it received from the multi-tenant controller 122. If a VXWAN network-isolation identifier is present for a policy, the data path software on the device may insert the label on the wire as the packets of the flow exit the device. If the VXWAN 204 is an encrypted VXWAN, then a policy-specific encryption may be applied before the packets of the flow exit the device. At the other end of the data flow, the receiving device may de-cap, for example, the sending device may place the VXWAN header on the packet with the VXWAN network-isolation identifier. The receiving device may remove the VXWAN header, remove the VXWAN network-isolation identifier from the header, and pass the packet to either a specific virtual routing and forwarding (VRF) on the core router 178, or to a global VRF on the core router 178. Examples of policy strings 202 include, but are not limited to, examples provided in the following table:

two sites. This may further restrict the enterprises to allow traffic only between those source and destination prefixes that were specified by the administrators of the two tenants. In embodiments, the most restrictive subset of the allowed prefixes may be used on both sides. Examples of prefixes include, but are not limited to, 10.1.1.0/20 and 192.168.2.1/24.

In accordance with various exemplary embodiments, methods and systems for application and policy based network data transfer control described above may utilize physical connectivity 148, logical connectivity 150 or hybrid connectivity as described elsewhere herein. Furthermore, such methods and systems may be applied to application sessions as described above and may employ a standardized policy string 202 format and encryption.

The following are illustrative clauses demonstrating non-limiting embodiments of the inventions described herein:

A method comprising:
  allocating an identifier to each of a plurality of policies each comprising a network-isolation identifier associated with a VXWAN directive; and
  transmitting each of the plurality of policies to one or more devices in a network.

A centrally controllable multi-tenant controller for controlling a plurality of assets across a plurality of distributed computing environments wherein the controller is configured to:
  allocate an identifier to each of a plurality of policies each comprising a network-isolation identifier associated with a VXWAN directive; and

| Network Context | App | User | Paths Allowed | Business Priority | VXWAN (possibly, including, without limitation, a network-isolation identifier) |
|---|---|---|---|---|---|
| Guest WiFi | Any | Any | direct internet 142 | P4 | None |
| Any | PCI applications | Any | Vpn, private wan | P1 | PCI |
| Voice VLAN | Any | Any | Vpn, privatewan | P1 | voice |
| Any | Any | CEO | Vpn, privatewan | P1 | CEO |

In embodiments, a multi-tenant controller 122 may be used to establish Extranet IPSEC VPN tunnels between two separate enterprises, sites or networks. The multi-tenant controller 122 may be used to indicate with which other tenant and to which site of the other tenant they want IPSEC VPN tunnels established. The multi-tenant controller 122 may also specify which prefixes in each of a plurality of sites can communicate with each other. In an example, the IT administrator of a tenant may indicate to the multi-tenant controller 122 the partner tenant to which they want to establish a VPN, to which site of the partner they want the VPN to occur, their own site which should participate in the VPN, the source prefixes or specific IPs in their site from which application traffic is allowed to go over the IPSEC VPN tunnels, and the destination prefixes or specific IPs for the application traffic which can go over the IPSEC VPN tunnels. Once the IT administrator of the partner tenant agrees to the request to allow creation of IPSEC VPN tunnels between the enterprises, the multi-tenant controller 122 may instruct the devices on each of the sites of the two enterprises to establish an IPSEC data tunnel between the transmit each of the plurality of policies to one or more devices in a network.

A method comprising:
  receiving each of a plurality of policies at a networked device wherein each policy
  comprises a network-isolation identifier associated with a VXWAN directive; and
  inserting the network-isolation identifier into one or more packets transmitted by the networked device.

A networked branch device configured to:
  receive each of the plurality of policies wherein each policy comprises a network-isolation identifier associated with a VXWAN directive; and
  insert the network-isolation identifier into one or more transmitted packets.

A method comprising:
  receiving from a first network tenant an indication of a partner network tenant with which to establish a IPSEC VPN tunnel, at least one of a site associated with the partner network tenant to which a IPSEC VPN TUNNEL is to be established, source prefixes at a tenant site from to which application traffic is allowed to travel over the IPSEC VPN TUNNEL and destination prefixes for application traffic that can travel over the IPSEC VPN TUNNEL;

receiving an indication from the partner network tenant of agreement to establish the IPSEC VPN TUNNEL; and instructing one or more devices of the first network and the partner network to establish an IPSEC data tunnel between themselves.

A centrally controllable multi-tenant controller for controlling a plurality of assets across a plurality of distributed computing environments wherein the controller is configured to:

receive from a first network tenant an indication of a partner network tenant with which to establish a IPSEC VPN TUNNEL, at least one of a site associated with the partner network tenant to which a IPSEC VPN TUNNEL is to be established, source prefixes at a tenant site from to which application traffic is allowed to travel over the IPSEC VPN TUNNEL and destination prefixes for application traffic that can travel over the IPSEC VPN TUNNEL;

receive an indication from the partner network tenant of agreement to establish the IPSEC VPN TUNNEL; and instruct one or more devices of the first network and the partner network to establish an IPSEC data tunnel between themselves.

Any of the clauses above wherein the network comprises connectivity selected from the group consisting of hybrid, physical and logical.

Any of the clauses above wherein the application analysis is performed on a per session basis.

Any of the clauses above wherein the policy string format is standardized.

Any of the clauses above wherein encryption is employed.

In traditional networks, devices make next-hop routing decisions for data at the packet level. Routing protocols are used to exchange routing information between devices. However, local networks often times need to be manually configured via network statements or redistribution for each routing protocol so that prefixes can be advertised to other routing peers.

In accordance with various exemplary and non-limiting embodiments, there is provided a method for reducing and/or eliminating asymmetric session flows using a flow table to determine a forwarding path based, at least in part, on the direction of incoming traffic in order to eliminate to eliminate asymmetric flows (each direction of flows taking two different paths) and/or packet looping. As described below, flow tables may be maintained at the configurable device 124.

Network failures may cause transient or semi-permanent asymmetry after an application flow has started. In the present instance, "asymmetry" refers to the different paths traffic takes in the forward and reverse direction as it is sent and received. In some instances, network asymmetry can adversely impact the performance of feedback-based transport protocols such as Transmission Control Protocol (TCP). Even if the network path in the direction of session flow is uncongested, congestion in the opposite direction can disrupt the flow of feedback leading to poor performance. Furthermore, troubleshooting the underlying causes of congestion may pose a problem as one may need to consult the routing tables at each device to see which path is taken by each direction of session flow traffic.

Analysis of asymmetry at the "TCP flow" level may cause significant performance issues and visibility challenges for security devices like firewalls. Devices need to see all the traffic on the network to function properly, but when asymmetry occurs not all the traffic passes through the device due to rerouting. As a result, firewalls, for example, may only "see" one side of the traffic.

Figure 3A:
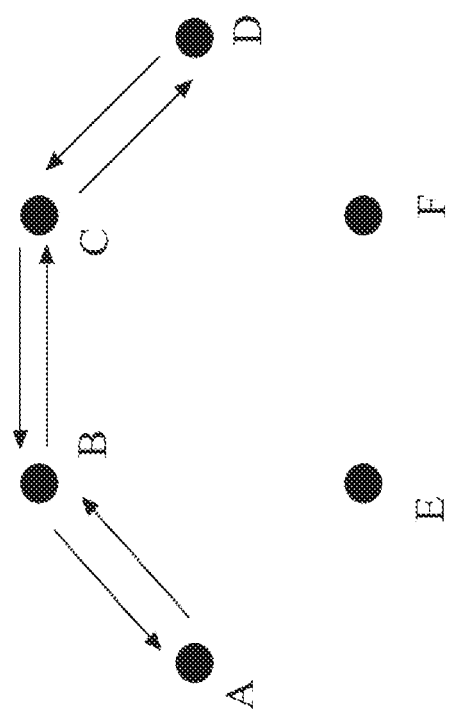
FIGS. 3A and 3B depict network data flows between configured devices where certain linkages between network devices are unavailable.

With reference to FIG. 3A, there is illustrated an example of network flow between two configured devices labeled as "A" and "D" as the session flows amongst various nodes "B", "C", "E" and "F". As illustrated, network flow proceeds from A→B→C→D where A and D are configured devices.

Figure 3B:
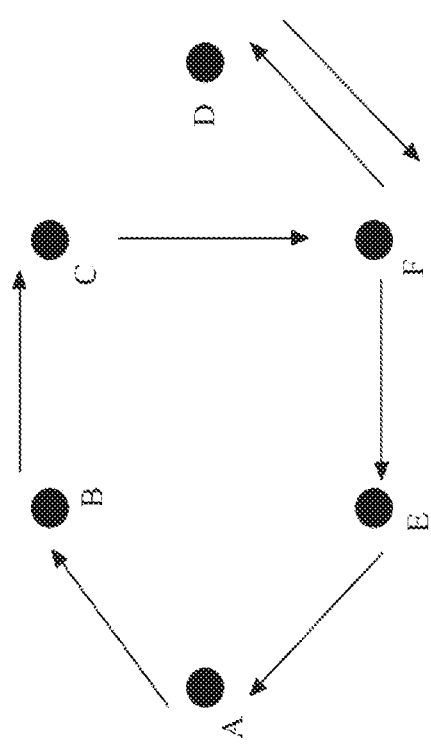
Figure 4:
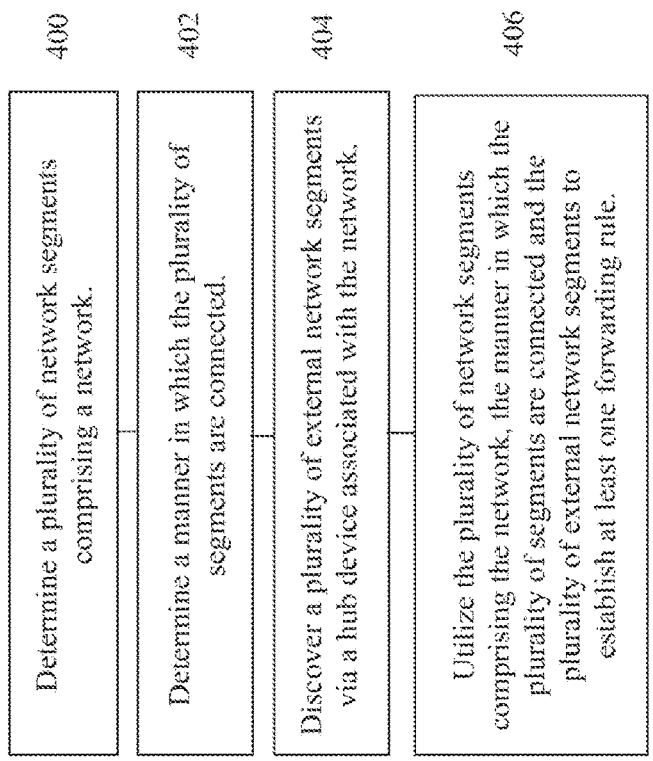
FIG. 4 illustrates a sample embodiment for determining network segments for the purpose of establishing a data forwarding rule or policy.

With reference to FIG. 3B, there is illustrated an example wherein the network link between nodes C and D is broken. In such an instance, the flow may take an alternate path from C→F→D. Consequently, the reverse direction flow from node D to node A may instead take path D→F→E→A. In this scenario, at node A, the configurable device 124 observes that the flow was sent to node D through node B but came back from node D via node E. In response, the configurable device 124 at node A may automatically make a path switch decision and commence to send the flow in both directions through node E on its way to node D thus preserving/enforcing symmetry. Note that it is possible for a transition period to exist where the packets on a flow may be received on both paths. In that case the packets on the old path are still received and forwarded to the client, while the new packets in both directions take the new path. Also, a hold down period is employed after switching paths before another path switching decision is taken. This helps in avoiding flaps due to packets in transit and stale packets.

In accordance with exemplary and non-limiting embodiments, configurable devices 124 maintain flow-based tables. Flow-based tables are similar to routing tables and forwarding information base (FIB) tables used by legacy routers 162 to forward packets. As used herein, "flow-based tables" are tables that allow configurable devices 124 to determine which interface a flow was forwarded on in one direction.

As a result, the configurable device 124 can detect an anomaly arising when a detected reverse path is not the same. Received packets may be identified as being associated with a given flow based on the five tuples of a packet, specifically, (1) protocol, (2) source IP address, (3) source port, (4) destination IP address, and (5) destination port. Every packet may be identified using the above parameters as belonging to a flow.

The configurable device 124 may next proceed to make decisions for the detected anomalous flow to move the forward direction of the flow to a new path, thus preventing any further asymmetry for the flow. An anomalous flow, for example that arises from an application session, may be detected, mapped, monitored and stored at a configurable device, as described herein, and/or associated with an identity, such as a user identity or group identity. An anomalous flow, for example that arises from an application session, may be detected, mapped, monitored and stored at a multi-tenant controller, as described herein, and/or associated with an identity, such as a user identity or group identity.

Note that configurable devices 124 maintaining flow-based tables and detecting asymmetry is separate from the manner in which the multi-tenant controller 122 detects asymmetry. Multi-tenant controller 122 based asymmetry operates on a larger time scale and can detect network level asymmetry rather than interface (configurable device) level asymmetry. Network level asymmetry may happen when, for example, prefixes assigned to a site are "moved" to a new site and traffic flows take inefficient and sometimes asymmetric paths.

In accordance with exemplary embodiments, sites may be assigned predetermined prefixes, and each configurable device 124 may choose a set of paths to forward a given packet based on the destination IP address on the packet and based on the prefixes that have been assigned to a site.

One factor giving rise to asymmetry in such instances is that the prefixes assigned to a site may be incorrect, or were correct at the time of assignment, but became incorrect due to some changes made in the physical underlay network. When this happens, the device may choose a wrong set of paths, resulting in asymmetry.

By observing flows end-end, the multi-tenant controller 122 may assess which flows take these inefficient paths, if they are due to prefix issues and if sufficient evidence and strength or duration of evidence exists to alert the IT administrator. In an exemplary embodiment, an IT administrator may configure the multi-tenant controller 122 to take automatic action. The multi-tenant controller 122 may then reconfigure the prefixes to reflect the new site it is believed to belong to.

In embodiments, configurable devices 124 at nodes make forwarding decisions at the L4-TCP/UDP flow-level. As a result, each flow that crisscrosses a network including configurable devices 124 enters and exits configurable devices 124 that forward a specified flow on a specified path in both forward and reverse directions. As a result, flow symmetry is preserved.

In exemplary embodiments, L4 flow-based tables may be implemented. Each flow entering a node may be detected when a synchronize packet (SYN) (for TCP flows) or when a new UDP session (previously unknown server-client user datagram protocol (UDP) transaction) is seen. Upon a successful decision to forward a flow on a specific interface on a network path, the originating configurable device 124 remembers its decision at the flow level.

Where the traffic belonging to the flow goes through hub device within the enterprise network irrespective of the traffic's eventual destination, the hub device similarly remembers the interface the traffic arrived in its flow table before forwarding to the traffic to its destination server 160.

When the return flow traffic from server 160 arrives at the configurable device 124, instead of blindly choosing the next hop for a packet as a typical router 178 would do, the hub device may look up the flow in its flow table and forward the flow and all of its packets on the same interface that it originally received the flow from.

With the above, the return traffic to the configurable device 124 should arrive on the same network the forward traffic was sent and thus on the same interface the forward traffic was sent. The configurable device 124 may look up the flow in its flow table and forward the flow and all of its packets on the same interface that it originally received the flow from the Client. As a result, symmetry is preserved.

Where the traffic belonging to the flow was sent directly to other destinations, including but not limited to, Ad Networks 134, Content Delivery Network 138 and Third-Party Data And Applications 140, or a network path that is beyond the access of a configurable device, the traffic may not flow through the configurable device 124. In such cases, the return traffic to the configurable device 124 should arrive on the same network the forward traffic was sent and thus on the same interface the forward traffic was sent as long as there are no network issues in the external network. The configurable device 124 may look up the flow in its flow table and forward the flow and all of its packets on the same interface that it originally received the flow from the Client. As a result, symmetry is preserved.

The following are illustrative clauses demonstrating non-limiting embodiments of the inventions described herein:

A method comprising:
  detecting a data flow and an associated originating interface on a network;
  determining a first link over which to forward the data flow;
  transmitting the data flow over the determined link;
  receiving a return data flow; and
  moving a forward direction of the return data flow to a new path if the return data flow arrived via a link other than the first link;
  wherein all packets following a first packet on the flow are forwarded on the same path as the first packet.

Any of the clauses above further comprising storing the determined first link at an L4 level in a flow table.

Any of the clauses above wherein the data flow is detected via a SYN or a detected UDP session.

A networked branch device configured to:
  detect a data flow and an associated originating interface on a network;
  determine a first link over which to forward the data flow;
  transmit the data flow over the determined link;
  receive a return data flow; and
  move a forward direction of the return data flow to a new path if the return data flow arrived via a link other than the first link;
  wherein all packets following a first packet on the flow are forwarded on the same path as the first packet.

Any of the clauses above further configured to store the determined first link at an L4 level in a flow table.

Any of the clauses above wherein the data flow is detected via a SYN or a detected UDP session.

Any of the clauses above further comprising applying time-based application domain classification and mapping to determining steps.

Any of the clauses above further comprising modeling application sessions and predicting bandwidth requirements.

Any of the clauses above wherein data flows are employed via SYN.

Typical Enterprise wide area networks (WANs) are implemented via routing protocols. Existing software designed networking (SDN) techniques are commonly employed in data centers 128 (non-WAN) to pull "network intelligence" to a central controller leaving simple forwarding instructions on data path devices. Typically, one cannot employ SDN techniques to a WAN environment because WAN does not allow for safe network behavior and scale.

Specifically, unlike with SDN controller based solutions where there is high capacity and resilient connectivity between controller and devices, WAN is notoriously non-resilient and bandwidth availability is problematic. As a result, (a) having controllers deliver fine grained but "simple" instructions to devices all the time is not practical and (b) devices have to work even in the absence of connectivity between controller and themselves, sometimes for an extended period of time.

Typical routing protocols exchange and use three different types of information: (1) network segments and addresses, (2) information indicative of how the network segments are connected and (3) which external network segments are not controlled by the routing instance. Using such information, typical router devices 162 set up packet forwarding tables 812 to allow packets to move from an incoming interface to an outgoing interface in the direction of its destination.

In accordance with exemplary and non-limiting embodiments, a multi-tenant controller 122 may be utilized to algorithmically determine and establish a loop-free data forwarding model that may include the creation and management of forwarding tables 812. As described more fully below, this algorithm may account for network failures and adjust the loop-free data forwarding model to account for asset loss within the network.

As described herein, a centrally configured multi-tenant controller 122 may be both the creator and the source of (1) network segments and addresses and (2) information indicative of how the network segments are connected. The central multi-tenant controller 122 may then discover what external network segments are not controlled by the routing instance via a DC or configurable device 124.

For example, a DC/configurable device 124 may run routing protocols like Border Gateway Protocol (BGP) to peer with other routing devices/entities in the DC. These other routing entities may provide information about the rest of the network and how they are connected or how to reach network addresses and segments. The DC/configurable device 124 may export this data to the multi-tenant controller 122 periodically if there is a change, which the multi-tenant controller 122 may save in a network DB. The same network DB may also store the network description that the multi-tenant controller 122 created using configurable devices 124 and instances. Merging the two, the multi-tenant controller has a view of the entire network without running a routing protocol itself.

The multi-tenant controller 122 may directly set up forwarding tables 812 on configured devices so that traffic is forwarded on to the correct interface.

The result is a loop-free forwarding model wherein various rules are enforced. For example, one rule may require that spokes are never transit points. As a result, traffic cannot be forwarded between configured VPNs or between Private WAN and configured VPNs.

In a traditional network, any available interface or circuit is a candidate to forward traffic on to a destination if routing tables allow. This requires that (a) there are no misconfigurations and (b) during network changes, there exist no alternate paths that might accidentally cause a loop. Traditional networking attempts to prevent such a situation by configuring "route redistribution rules" and other carefully selected manual constraints that prevent random interfaces or exit points, such as spokes, from being used to forward traffic. In accordance with the embodiments described herein, branch devices 152 may be restricted from allowing traffic to transit through them thus eliminating one aspect of loop causes.

A second rule may require that the following transits are allowed at a configurable device 124: (1) Spoke←→Hub←→Spoke and (2) Spoke←→Hub←→DC/DC Transit/PrivateWAN.

Once a branch/spoke is prevented from forwarding traffic between network segments as described above, rules are established for DC/configurable device 124. Since DC is indeed a transit point for traffic, there is a need to allow transit traffic. In this manner, traffic may be forwarded between (a) system controlled network segments and (b) system controlled and non-system controlled network segments.

A third rule may require that hub to hub transit is not permitted. While a HUB device needs to allow transit traffic as described above, allowing direct transit of traffic between two DC/configurable device 124 may also result in loops. This problem may be addressed by using classic routing protocols such as, for example, BGP, between the DC/configurable device 124. However, it may also be addressed by preventing direct forwarding between DC/configurable device 124 and instead requiring an external non-system controlled network or non-system controlled network segment between the DC/configurable device 124.

Lastly, a fourth rule may require that each hub has at most one path for any given IP prefix at all times. This rule operates to ensure that traffic destined to a prefix takes a pre-calculated path and not one of many equally available paths.

As a result, the multi-tenant controller 122 automatically creates and manages forwarding tables 812 in medium to very large networks in a scalable and reliable manner.

In accordance with various exemplary embodiments, configurable device 124 connectivity may exhibit physical connectivity 148, logical connectivity 150 or hybrid connectivity as described elsewhere herein.

In accordance with various exemplary embodiments, algorithmic determinations and the establish of a loop-free data forwarding model described above may take into consideration latency issues as well as various forms of asymmetry and various possible failure conditions described herein.

The following are illustrative clauses demonstrating non-limiting embodiments of the inventions described herein:
A method comprising:
  determining a plurality of network segments comprising a network;
  determining a manner in which the plurality of segments are connected;
  determining network segments and how segments are connected, at least in part, without a routing protocol;
  discovering a plurality of external network segments via a hub device associated with the network;
  utilizing the plurality of network segments comprising the network, the manner in which the plurality of segments are connected and the plurality of external network segments.
A centrally controllable multi-tenant controller for controlling a plurality of assets across a plurality of distributed computing environments wherein the controller is configured to:
  determine a plurality of network segments comprising a network;
  determine a manner in which the plurality of segments are connected;
  determining network segments and how segments are connected, at least in part, without a routing protocol;
  discover a plurality of external network segments via a hub device associated with the network;
  utilize the plurality of network segments and addresses comprising the network, the manner in which the plurality of segments are connected and the plurality of external network segments to establish at least one forwarding rule.
A system comprising:
  a multi-tenant controller configured to create a network description of a network; and
  a HUB device forming a part of the network and configured to execute a routing protocol with at least one other device resulting in network information and to communicate the network information to the multi-tenant controller, wherein the multi-tenant controller is configured to merge the network information with the network description.

Any of the clauses above wherein the network topology identification, simulation and load testing is controlled by the multi-tenant controller.

Any of the clauses above further comprising detecting asymmetric network data traffic and associated network devices.

Any of the clauses above wherein the network comprises connectivity selected from the group consisting of hybrid, physical and logical.

Any of the clauses above wherein there are employed routing protocols selected from the group consisting of BGP, IS-IS, EIGRP and OSPF.

Any of the clauses above wherein routing is based, at least in part, on a network prefix type.

Asymmetry in network data flows can cause performance issues and impact users 168 that access those applications. Asymmetry may also cause flow-aware functions, like firewalls, to fail since they might be able to detect only one direction of the flow. In legacy network operations, when performance issues arise, network and IT administrators must troubleshoot the issue. If the issue is caused by asymmetry, the administrator typically must evaluate the network, device-by-device, to identify the specific devices that might have been in the path of the affected data flows, and inspect the routing and forwarding tables 812 and then rectify the likely routing configuration that might have caused the asymmetry. This manual process is slow and may disrupt network usage while being performed. What is needed are methods and systems for monitoring application and network data flows, such as may be collected by a multi-tenant controller 122, and using such data to automatically identify asymmetric flows and identify network devices through which the asymmetric data flows likely traversed.

According to the methods and systems of the present invention described herein, a multi-tenant controller 122 may maintain a network topology at least in the form of a network topology database in which the entry and exit points for each device in a network are maintained, and periodically running an algorithm using this network data to determine asymmetric data flows and the devices associated with such asymmetric data flows. Asymmetry as the term is used herein includes, but is not limited to, bandwidth asymmetry, media access asymmetry, path asymmetry, and loss-rate asymmetry (e.g., the structure of a network topology may create greater packet loss in data flows traveling one direction relative to an alternate or reverse direction).

Figure 5:
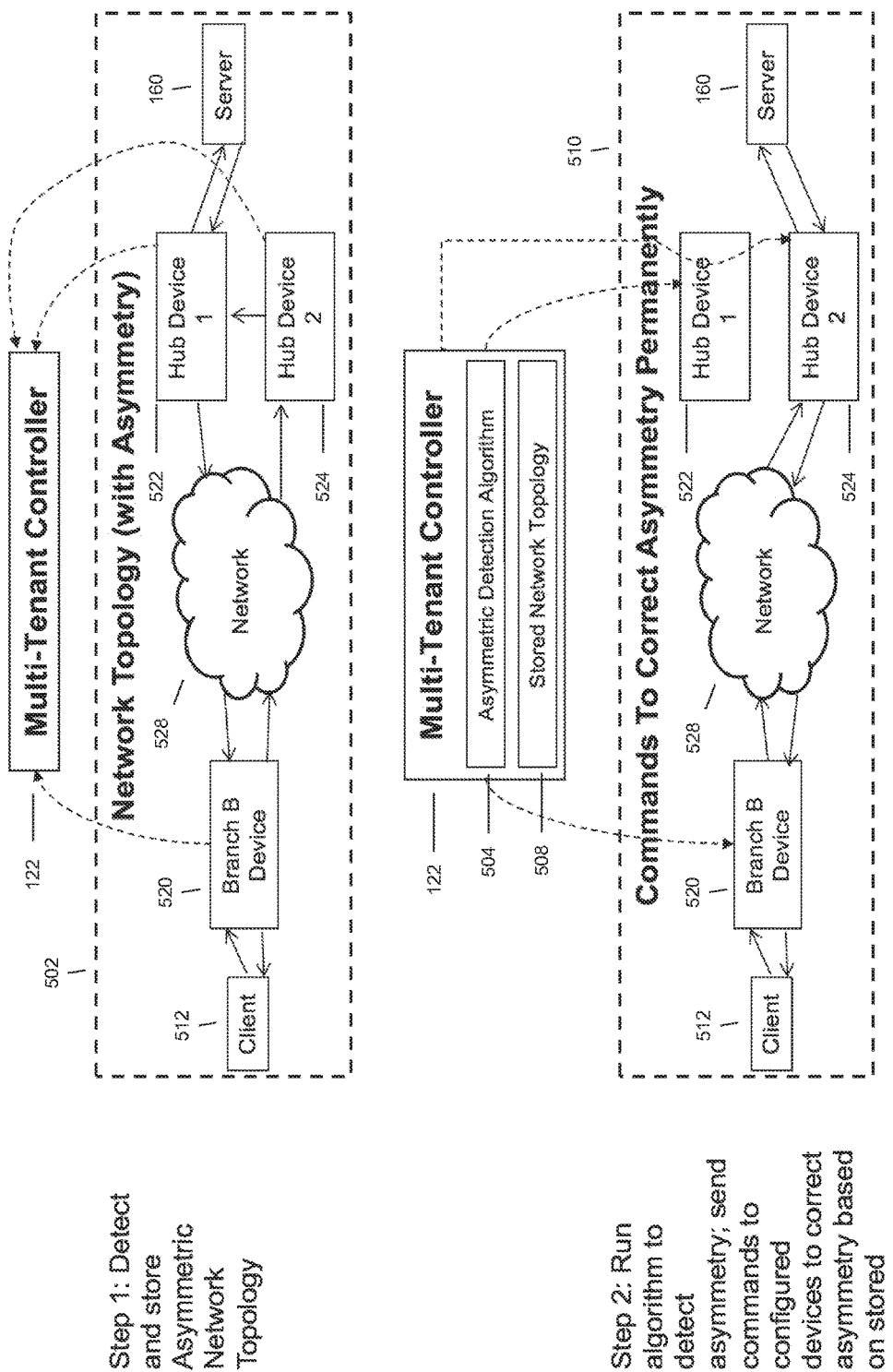
FIG. 5 illustrates simplified examples of asymmetry in data flows over a network and the use of a multi-tenant controller for detecting and correcting such asymmetric data flows.

In embodiments, a configured device may collect monitoring data, such as information relating to data flows transmitting through a device. Such data flow records may carry important information relating to the entry and exit points on a device. As shown in FIG. 5, millions of these data flow records may be exported from devices throughout the network to the multi-tenant controller 122. The multi-tenant controller 122 may store information, including, but not limited to, a network topology database that includes information on the entry and exit points of data flows occurring on each network device and how the data flows are interconnected, and data flow records on a single data flow from multiple devices in the network.

In embodiments, the multi-tenant controller 122 may use the stored network topology 508 and related data flow information to periodically run an "asymmetric detection" algorithm 504 that in essence identifies the existence of a plurality of data flows that exited a device through one path and return data flows that re-entered the device on a different path (i.e., asymmetry). In a simplified example as shown in FIG. 5, a Branch B 520 may be associated with a spoke device. A Data Center 1 128 may have a Hub Device 1 522, and a Data Center 2 128 may have a Hub Device 2 524. Continuing the example, a connection that is initiated from Branch B 520, intended for a server 160 sitting in Data Center 1, may end up taking a path to Data Center 2, and from Data Center 2 go to Data Center 1 (e.g., due to legacy routing reasons, or due to misconfiguration of IP prefixes available at the two data centers 128), and the return traffic may then go directly from Data Center 1 to Branch B 520. Branch B 520, upon receiving the traffic from Data Center 1, may immediately correct so the forward direction of traffic is sent directly to Data Center 1. This correction may be made on demand, and outside of the multi-tenant controller 122. The change may be reported, for example by a spoke device, to the multi-tenant controller 122. The multi-tenant controller 122 may identify asymmetric flows, and see which data center devices participated in the transmission of the flow (which in this example are Hub Device 1 522 and Hub Device 2 524), and deduce that the flow is incorrectly going to Hub Device 2 524, and reports this. The multi-tenant controller 122 may identify the IP address ranges on which this asymmetry is happening, aggregate them and report to them to a user, such as an IT administrator, so that the IP prefix configuration may be corrected on the sites. To prevent false positives, the algorithm may use additional weighting factors including other devices and different applications and their data flows, before declaring existence of asymmetry in the network. The multi-tenant controller 122 may read data flow tables in order to allow the multi-tenant controller 122 to determine how the data traffic egresses (e.g., data deriving from a branch 152). The asymmetry may be detected, and the multi-tenant controller 122 may then notify configured devices, as shown in FIG. 5, and the configured devices may take forwarding actions to ameliorate the data flow asymmetry.

In accordance with exemplary embodiments, such methods and systems for application session modeling and prediction of bandwidth requirements described herein may be applied to application sessions as described above and may address various forms of asymmetry described herein.

The following are illustrative clauses demonstrating non-limiting embodiments of the inventions described herein:

A method comprising:
  monitoring a plurality of network devices to collect network performance data comprising data flow records of each device on the network and to create a network topology database;
  accessing the network topology database comprising information on an entry and exit point of each device, the manner in which the devices are connected and a plurality of data flow records on a single data flow from multiple devices on the network; and
  utilizing the network topology database to perform an asymmetric detection algorithm to identify one or more data flows that exited a device via a first path and returned to the device via a different second path.

Any of the clauses above wherein a controller is configured to receive information and detect asymmetry.

Any of the clauses above wherein detection is based, at least in part, on latency attributes.

Any of the clauses above wherein the application analysis is performed on a per session basis.

Any of the clauses above wherein asymmetry is selected from the group consisting of bandwidth asymmetry, media access asymmetry and loss rate asymmetry.

Traditionally, applications and application data have been defined using the domain name of an application. However, this is less than satisfactory, because there can be many domain name variants used as an entry point to an application, and not knowing all variants may interfere with correctly identifying applications. For example, a software-as-a-service (SaaS) application webpage may embed widgets that invoke HTTP application programmer interface (API) calls to multiple domain names, such as that done by content delivery network 138 (CDN) provider domains, including but not limited to Akamai, Microsoft Azure, and Amazon CloudFront. These widgets may generate additional traffic that should ideally also be associated with the SaaS application 604 that embedded them.

Context can also impact which data flows are considered part of an application. For example, an email application that is opened within a web browser may have windows that are creating data flows by accessing the mail servers, but there might also be data flows that are created by ad servers sending content to the email application. It is a more representative depiction to include such ad traffic flows within what is considered part of the application that is the email application since a policy that is intended to govern traffic from the email application will underestimate the data flow volume if such other flows like ad traffic are not included. Therefore, there is a need for methods and systems that enable the use of time-based cohesiveness as a determinant of application-based data classification, and time-clustered data flows to identify domains that are associated with an application, including an anchor domain that is a high-traffic, or frequently used, entry point for usage of an application.

According to the methods and systems of the present invention described herein, a multi-tenant controller 122 may receive data from configurable devices 124 indicating which domains are associated with an anchor domain, and assign these domains to a SaaS application 604 so that a fuller set of entry points to the SaaS application 604 are known and stored by the multi-tenant controller 122. This may have advantages in measuring, monitoring and routing the true data flows associated with a SaaS application 604, whereas traditional techniques may underestimate the traffic associated with a SaaS application 604 by not recognizing the full set of domains that are actually generating traffic in association with an application. Domain types may include, but are not limited to, top-level domains 608 (e.g., ".com"), geographic domains (e.g., country domains), and infrastructure domains (e.g., ".arpa").

Figure 6:
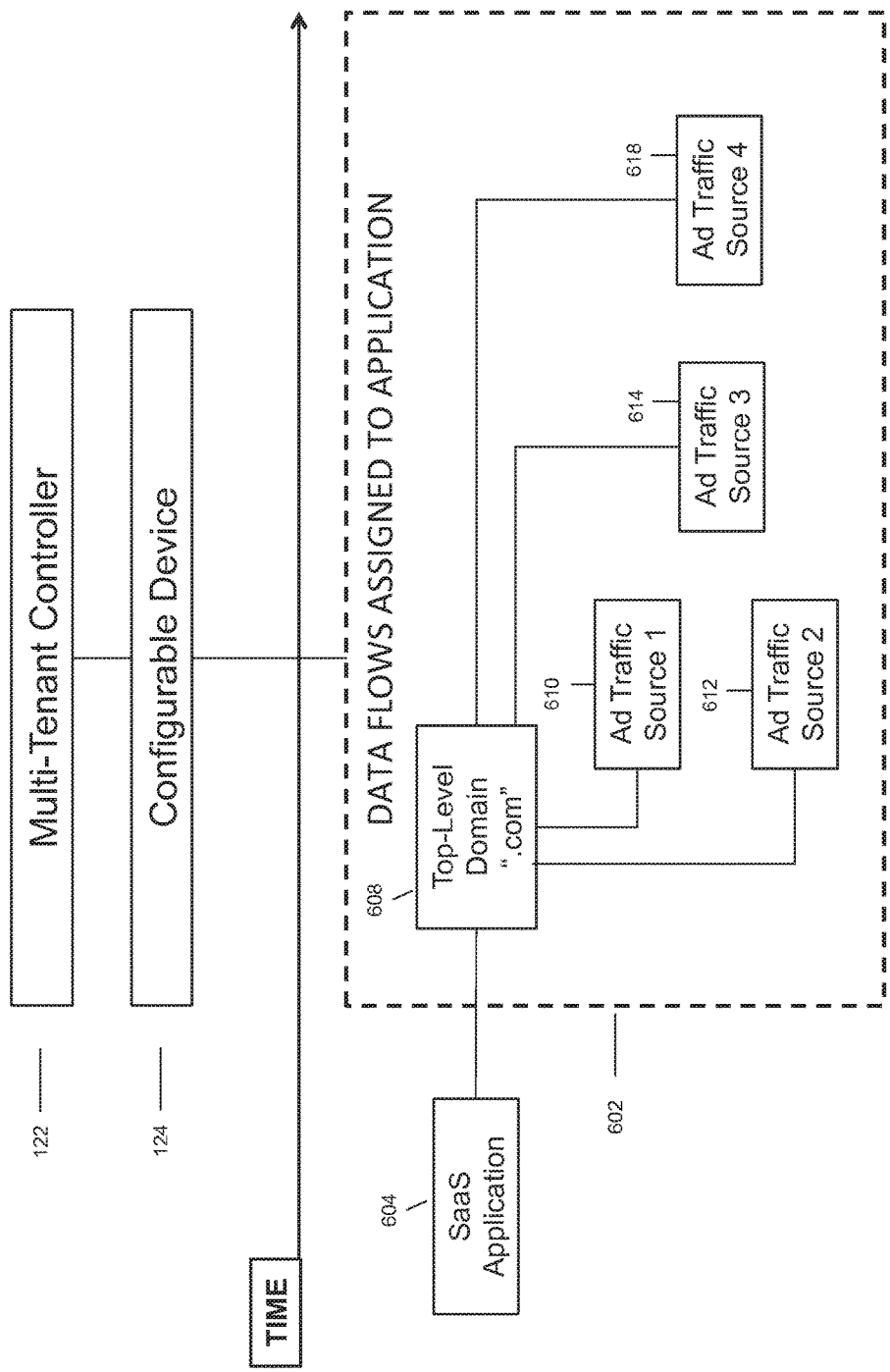
FIG. 6 illustrates a simplified embodiment of establishing an anchor domain based at least in part on a plurality of data flows.

Anchor domains as the term is used herein typically refer to entry point domains for SaaS applications 604. Anchor domains may be thought of as the top-level domain 608 and may be used to find sub-domains that are associated with SaaS applications 604. For example, domains accessed following accessing an anchor domain may be correlated with the anchor domain. In an example, Office365 may have an entry point domain but have many related domain names (e.g., server1.office365.com). In another example, an email application like Yahoo mail may use multiple mail servers and also have frames that are serving ads to the browser from other servers 160. The multi-tenant controller 122 may store these anchor domain-domain associations and a time-distance approach may be used to discover the domains that are associated with the anchor domain. In an example, and referring to FIG. 6, the domains that are accessed with in a configurable time period after the same client 512 accesses an anchor domain may be correlated with the anchor domain. The correlation technique may identify some domains that are not closely related to the anchor domain (e.g. domains accessed from a different tab in the browser window) and associate these with the anchor domain. The domains identified to be associated with the anchor domain may be sent to the multi-tenant controller 122, and at the multi-tenant controller 122, further processing may be performed to eliminate the false positives and distill them to a corrected set of domains. A configurable device 124 within the network may detect an application's anchor domain and mark the source of the data and the time of detection. Following this time of detection, ongoing data flows from the same traffic source may be marked as belonging to the application that is associated with the anchor domain. The multi-tenant controller 122 may continue to receive data regarding the traffic source from the configurable devices 124 and classify the data flows, for example, into one of the following i) Applications B and C that might belong to Application A, ii) Unknown Applications without a known definition that might qualify as belonging to A, or iii) Applications D and E that might not qualify as belonging to A. The time-based cohesiveness of the data flows may be used to cluster traffic and data flows that appear to have a common underlying SaaS or other application. This time-based cohesiveness may allow ancillary data traffic to be detected and associated with the application, such as ad traffic that is presented within or in conjunction (e.g., interstitial ads) with an application.

In accordance with exemplary embodiments, such methods and systems for time-based application domain classification and mapping may be applied to application sessions as described above.

The following are illustrative clauses demonstrating non-limiting embodiments of the inventions described herein:

A method comprising:
detecting at a device an application having an anchor domain;
marking the application with a traffic source having an entry point domain that accessed the application and a time of detection; and
designating network flows from the traffic source within a predetermined time from the time of detection as belonging to the application.

A networked branch device configured to:
detect an application having an anchor domain;
mark the application with a traffic source having an entry point domain that accessed the application and a time of detection; and
designate network flows from the traffic source within a predetermined time from the time of detection as belonging to the application.

Any of the clauses above further comprising modeling application sessions and predicting bandwidth requirements.

Any of the clauses above further comprising performing anomalous session identification, quarantine and restriction.

Any of the clauses above wherein the application analysis is performed on a per session basis.

Planning for enterprise bandwidth requirements based on application usage, and developing associated policies for the handling of data flows associated with applications, can be difficult and inaccurate based at least in part on the fact that the same application, within the same enterprise, might be utilized in very different ways by the user groups within the enterprise. For example, the same application may have different operational modes that create different data flow types. As a simple example, User Group 1 might use Application Z to download summary financial reports, while User Group 2 might use Application Z to create these reports. In this simplified example, User Group 2 is a heavier user of Application Z in terms of time used, but also in terms of the nature and volume of the data flows that are associated with Application Z. If such differences are not discovered and used as part of creating application profiles, then such profiles can miscalculate the network resources needed to run an application. When aggregated across applications, the problem may be compounded and can lead to enterprise bandwidth estimates that are unreliable for predicting actual future network bandwidth requirements. In another example, personnel in a Sales and Marketing Dept. may have a different usage profile for the same application than when the application is used by personnel from the Engineering Dept. Therefore there is a need for a process of identifying usage differences the may assist in planning for bandwidth capacity needs and making informed policy decisions, and modeling application session(s) to determine network bandwidth, where application sessions include transactional and bulk applications and those of mixed use, and using data mining and other statistical techniques to predict network requirements and potential points of limited capacity that could adversely impact data flows, or other network weaknesses. Such a solution may identify anomalies in the usage patterns and apply necessary checks, select appropriate WAN paths, and allocate appropriate bandwidth capacity (based on what an application requires).

According to the methods and systems of the present invention described herein, statistical and data mining techniques may be applied for dynamic and on-going characterization of application usage, by session, for performance and predictive planning purposes may improve network performance. Big data-type analytic techniques may be used to characterize flows that are associated with application usage. Configured spoke devices may collect and send to the multi-tenant controller 122 such flow data. Analysis of this data may improve an administrator's ability to summarize the resource needs of applications along at least the following dimensions:

Bandwidth usage in both directions
Network response times
Application response times
Number of active and idle application sessions
Maximum number of concurrent application sessions The results of analyzing the flow data may be reported to users, such as IT administrators of the network and provided to spoke devices in the form of traffic profile summaries. The spoke devices may in turn use the traffic profiles to monitor bandwidth usage and application performance. Data sent to a spoke device may include, but is not limited to i) ingress and egress bandwidths determined based on analytics performed at the controller, and ii) application response times. A spoke device may use this information to determine which one of the various available paths for an application is best suited to the application. Modeling and other analytic techniques, as described herein, may also be used to characterize data beyond flow data that are associated with application usage. Parameters used in modeling may include, but are not limited to application response time, ingress/egress bandwidth, server response time, transaction start and end times, size of transactions, or some other parameter.

Applications may broadly be classified into three categories: Transactional applications, bulk applications, and media applications. Transactional applications may be described by the size of the transactions processed by an application, and the frequency of transactions, which can be modeled and characterized. Data mining techniques like centrality and classification may also be applied in combination to fine-tune the model. The resulting models may be better able to predict the size and frequency of transactions for a typical application session, as well as the frequency of application sessions. Bulk applications by nature consume any amount of bandwidth offered to them for bulk data transfer and are often file transfer applications. These applications may also be modeled, but only to predict the frequency of these application sessions. Applications that fall into both transactional and bulk categories may be modeled to identify the transactional periods versus bulk periods of usage, and the frequency of transactional and bulk transactions. Media applications are unique in their own perspectives. These applications have the following types of characteristics: a) sensitive to latency and jitter, b) may be unidirectional, 3) when bi-directional, will appear to be two unidirectional flows with different properties. These applications are further characterized by the type of codec negotiated and used on a unidirectional basis. Some example codecs used include, H.264, Mp4 for video, and G.711 and G.729 for audio. These codecs dictate how much bandwidth is needed in each direction, and what the latency and jitter requirements are.

In embodiments, the modeling and analytic methods used to characterize an application session and the corresponding network and bandwidth requirements may also be used to monitor a network in real time for bandwidth requirements at the sub-channel level (transactional and bulk application types) and identify and predict trends in bandwidth requirements. Because traffic flow characteristics associated with an application are not static, and a single data flow's characteristics may change over the course of a session, accurate measurement and predictions of application bandwidth needs may require real time monitoring, such as that performed by a configurable device 124, as described herein, to detect usage and bandwidth changes. For example, within a data flow for a single session of an application's usage, different behaviors may be monitored. For example, application behaviors moving from a transactional-type data flow to a bulk-type. Further, different human users 168 may cause an application session to have a different bandwidth profile. Application versioning may also impact bandwidth (i.e., recent upgrade may offer new features utilizing bandwidth differently than prior versions). Monitored data is sent from configurable devices 124 to multi-tenant controller 122 for processing.

In order to develop an accurate application profile, a longer time window of an application session may better allow a multi-tenant controller 122 to detect the plurality of characteristics present that have an impact on bandwidth and network resource requirements. Within a single application session there may be a plurality of traffic types detected, such as: Transactional (e.g., human-to-human chat session over the internet 142), real-time, bi-directional (e.g., a VoIP call (low bandwidth); video call, like Skype (high bandwidth)), and/or bulk transfers (e.g., large file sharing applications). Traffic may be directed over transmission control protocol (TCP) or user diagram protocol (UDP) data flows. Bandwidth needs may be determined for an application and/or sub-application as a historical trend, using statistical models. Baseline application transaction times may be computed in the context of each site, each application as a historical trend using statistical models. Packet loss, jitter, and MOS scores may also be computed for media applications as a historical trend using statistical models.

Based on application type detection, a multi-tenant controller 122 may analyze application session data that it receives from configurable device 124 at the branch 152 level to determine what amount of bandwidth is necessary for proper application performance. Application performance scores may be used to record and adjust the bandwidth profile for an application, where the profile states performance and bandwidth criteria needed (i.e., a rule) for the type(s) of data flows detected during application sessions. In an example, application traffic quality metric (ATQM) is one type of a performance score, and it is a measure of the times taken for completing application transactions. To measure the ATQM, according to the methods and systems described herein, a configured device may track the requests and responses between client 512 and server 160 (for transactional applications) and determine the time taken, from a user's 168 perspective, for the full transaction to complete.

For transactional data flows, the peak-sustained bandwidth needed during the period of the transaction based on each direction may be determined. This determination may be based on historical monitoring measures. The bandwidth may then be recorded in a traffic profile. For transactional applications, the size of the transactions and frequency of the transactions may be modeled with various distributions like, normal, Weibull or a long tailed distribution, such as Pareto. Such distributions may be characterized using parameters, such as the average/peak bandwidth over short time intervals (e.g., few 100 s of msec to a couple of seconds), the frequency of transactions, and spatial and temporal localities identified, and/or data mining techniques like centrality and classification may also be applied in combination to fine-tune the model. Such models may be used to predict the size and frequency of the transactions for one application session and thereby the combination of 'n' number of sessions. In an example, at the start of a transaction, it may be determined that there is a need for 3 MB per second based on the codecs being used. By peering into the session handshake, the configurable device 124 may be able to determine, based on the network traffic for example, which codec is used and at what quality being negotiated. The configurable device 124 may use this information to place data traffic on the appropriate data path, for example, to avoid the placement of a bulk download on a high speed "lane." Because malware is often performing data flows that are inappropriate for the data lane on which they occur, such identification may assist security implementations and analyses of suspect data flow.

Frequently in data networks, a single bulk data flow for an individual application can potentially consume all available bandwidth, but in practice due to TCP behavior of client 512 and server 160, socket buffers at either end and the bandwidth delay product (BDP) of the flow, there is a maximal bandwidth that can be less than the total link capacity. The monitoring information received by a multi-tenant controller 122 can be used to determine the range of minimum, average, and maximum bandwidth seen for an application flow based on data flow type, and can compute and add to the traffic profile for the application. The multi-tenant controller 122 may recognize that a transactional flow has become a bulk flow and vice versa based at least in part on the traffic classification profile, and applications may be classified into categories based at least on the profiles developed. This may assist with appropriately categorizing applications with a plurality of functional capacities. For example, a single application may enable chat and video conferencing, the first is transactional low bandwidth and the second transactional, real time and high bandwidth. The user type may in part determine which aspect of the application is more likely to be used, the time of day, or some other factor. Users 168 of the applications can also be classified and incorporated into the application profiles (tellers v. loan officers, etc.). Once the spoke devices in a network have available to them the application profiles from the multi-tenant controller 122, they can better adapt to altering data traffic treatment and link capacity usage.

In accordance with exemplary embodiments, such methods and systems for application session modeling and prediction of bandwidth requirements described herein may be applied to application sessions as described above. Further, such methods and systems may utilize dynamic automated QoS definitions as described herein.

In accordance with exemplary embodiments, the methods described herein may be applied to applications as described herein. Exemplary embodiments may utilize file transfer applications as described herein. The methods and systems described herein may employ modeling and analytics as described herein. Other exemplary embodiments may utilize parameters for categorizing data flows as described herein.

The following are illustrative clauses demonstrating non-limiting embodiments of the inventions described herein:

A method comprising:
  receiving from a networked spoke device information describing network flows to and from an application;
  analyzing the information to characterize the application in at least one dimension selected from the group consisting of bi-directional bandwidth usage, network response times, application response times, a number of idle and active application sessions and a maximum number of concurrent application sessions; and
  transmitting the dimensions to at least one networked spoke device as traffic profile information.

Any of the clauses above wherein the information describes L4 level network flows.

A centrally controllable multi-tenant controller for controlling a plurality of assets across a plurality of distributed computing environments wherein the controller is configured to:
  receive from a networked spoke device information describing network flows to and from an application;
  analyze the information to characterize the application in at least one dimension selected from the group consisting of bi-directional bandwidth usage, network response times, application response times, a number of idle and active application sessions and a maximum number of concurrent application sessions; and
  transmit the dimensions to networked spoke devices as traffic profile information.

Any of the clauses above wherein the information describes L4 level network flows.

A method comprising:
  modeling a transactional application operating in a networked environment by a size of transactions and a frequency of transactions with a set distribution to produce one or more modeled parameters; and
  analyzing the modeled parameters to predict a data flow size and frequency of one or more transactional application sessions.

Any of the clauses above wherein the set distribution is selected from the group consisting of normal, weibull and pareto.

A method comprising:
  modeling a bulk application operating in a networked environment by a size of transactions and a frequency of transactions with a set distribution; and analyzing the modeled parameters to predict the frequency of one or more bulk application sessions.

Any of the clauses above wherein the set distribution is selected from the group consisting of normal, weibull and pareto.

A method comprising:
modeling an application operating in a networked environment by a size of transactions and a frequency of transactions with a set distribution to produce one or more modeled parameters;
detecting, based at least in part on the modeling, a hybrid application traffic characteristic, wherein the hybrid application traffic characteristic comprises a first data traffic type that is correlated with at least one data traffic characteristic of a transactional application and a second data traffic type that is correlated with at least one data traffic characteristic of a bulk application; and
analyzing the modeled parameters to predict a data flow size and frequency of one or more hybrid application sessions.

Any of the clauses above wherein the set distribution is selected from the group consisting of normal, Weibull and Pareto.

A method comprising:
sending network usage data relating to an application usage session from a configurable device to a multi-tenant controller, wherein the network usage data comprises a first type of data flow associated with an application and a second type of data flow associated with the application;
identifying a bandwidth requirement for each of the first and second types of data flows associated with the application based, at least in part, on historical data relating to the performance of the application and an associated data flow;
storing within the multi-tenant controller the bandwidth requirement as an application bandwidth profile;
sending the application bandwidth profile to at least one spoke device; and
using the application bandwidth profile to route data flows associated with the application.

Any of the clauses above wherein the application analysis is performed on a per session basis.

Any of the clauses above wherein routing is based, at least in part, on a dynamic and automated QoS definition.

Any of the clauses above wherein applications are selected from the group consisting of transactional applications and file transfer applications.

Any of the clauses above further comprising employing modeling and analytics selected from the group consisting of Pareto and Weibull.

Any of the clauses above further utilizing parameters to categorize data flows.

In traditional networks, the attribute indicating the amount of bandwidth that is available is often specified manually and is often incorrect and/or out of date. This may negatively impact factors, such as, routing, traffic engineering, and quality of service (QoS) controls. What is needed are mechanisms that utilize link bandwidth detection for active and idle links that can be automated and updated in real time. Traditional networks often use QoS standardized controls at an individual interface level to manage network performance, and to determine such characteristics as prioritization of traffic flows. QoS standardized controls include, but are not limited to, shaping, policing, random early discard (RED), weighted RED, tail drop, low latency queues, fair queues 818, and buffers attached to a plurality of queue types. These controls may be used to classify traffic and provide, for example, a weight-based allocation of bandwidth according to traffic classification. In some embodiments, QoS may be defined in a dynamic and automated manner by the system that does not require use input and operates to adjust QoS to network conditions and requirements. However, enterprise needs are most often expressed in terms of business priorities that may differ from network priorities, and when in conflict, the traditional controls may give greater preference to a network priority over a business priority. For example, a real-time time application may have lower business priority than a bulk application, however current technologies will still often give preference to the real-time application over the bulk application.

Traditional networks may also not allow or facilitate dynamically changing the number of queues, buffers, schedulers and shapers 154, which are fixed. Thus, if new applications need to be added and they need a higher number of lower latency queues it will not be possible to serve those applications and achieve the needed performance. What is needed are methods and systems for using business priorities that are expressed as network policies that give preference to, and enforce, business priorities over network priorities, and that may scale by dynamically increasing or reducing QoS resources (e.g., queues, buffers, shapers 154, and schedulers) to ensure that business priority needs are meet with changes in policies.

In traditional networks, hybrid applications having transactional and bulk functionalities and related data flows have varying levels of bandwidth requirements that traditional networks are often poor at recognizing and adjusting to accommodate for optimal application performance. What is needed are methods and systems for identifying the current functional capacity of an application (e.g., in a transactional or bulk mode of operation), and adjusting the network bandwidth available to the application based at least in part on the current mode of operation of the application, and in accordance with a business policy. Further, anomalous traffic detection is needed in order to characterize what is a typical application session's bandwidth requirement for a given application and restrict usage of the bandwidth that is allocated to the application to what is a level appropriate to allow the application to properly function. Constraining the bandwidth may be advantageous, for example, in preventing denial of service (DoS) attacks during which bandwidth needs will exceed the permitted bandwidth threshold specified by a policy.

Traditionally link capacity has been determined using a test-response measurement and/or active-traffic based estimation. Test-response may be performed when links are idle and typically happens at the "beginning" of a site's operation. Specific requests may be sent to servers 160 hosted by an enterprise or a third party, and the available bandwidth measured. Active-traffic based estimation refers to a method by which the system estimates available bandwidth while there is active traffic going through the links. However, when active traffic is flowing through the links, test-response measurement can be disruptive and could yield wrong results. Active-traffic based estimation relies on three key behaviors of TCP connections between a client 512 and server 160: 1) if there is congestion anywhere on the path of the TCP connection, there will be packet loss, 2) a client 512 that initiates a relatively long-lived TCP connection that has more than just a few packets exchanged in each direction, will attempt to continually increasing the rate at which it transmits data. The server 160, if it sends lot of data, will do the same. For a very long-lived connection, the client 512 and/or server 160 may use the entire link's capacity should network conditions allow. And, 3) after performing behavior 2, above, if network utilization has reached its limit, TCP connections will correctly settle on their share of the link before performing behavior 2 again.

Figure 7:
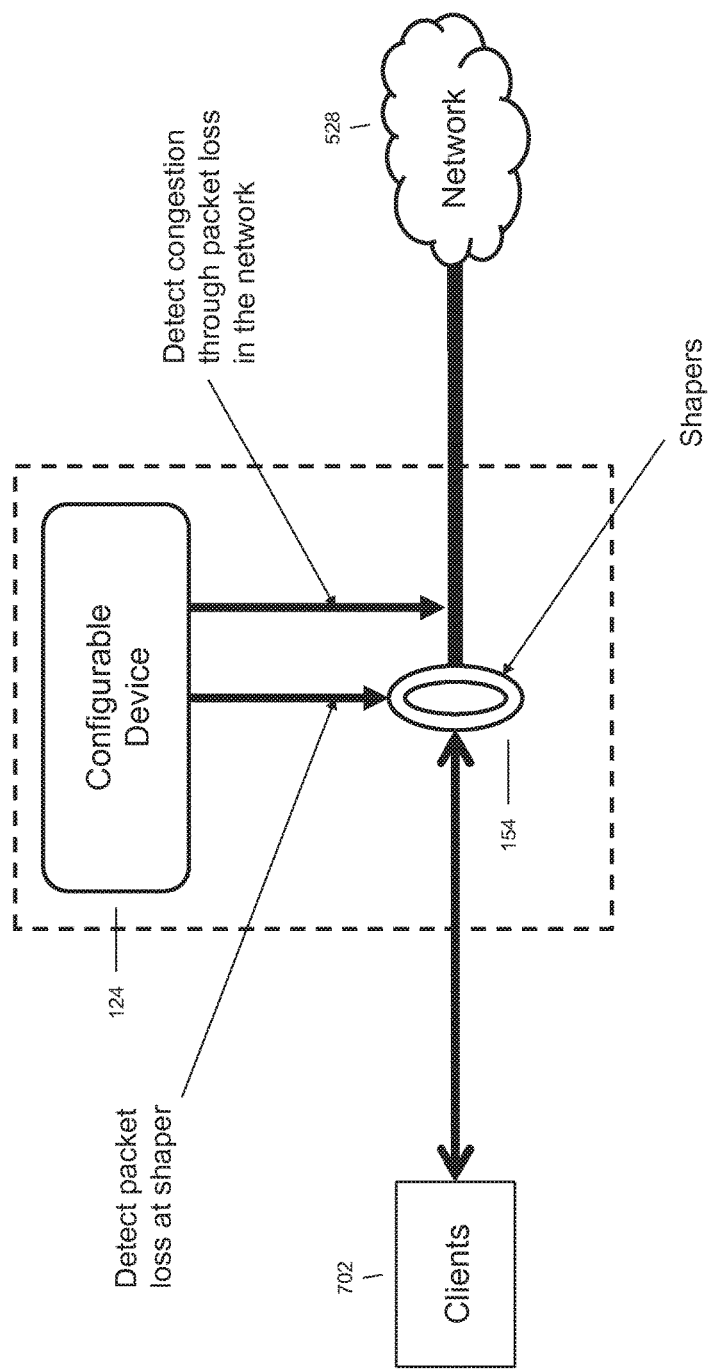
FIG. 7 depicts a sample embodiment showing the usage of a shaper to control data congestion and data flows in association with a configurable device.
Figure 8A:
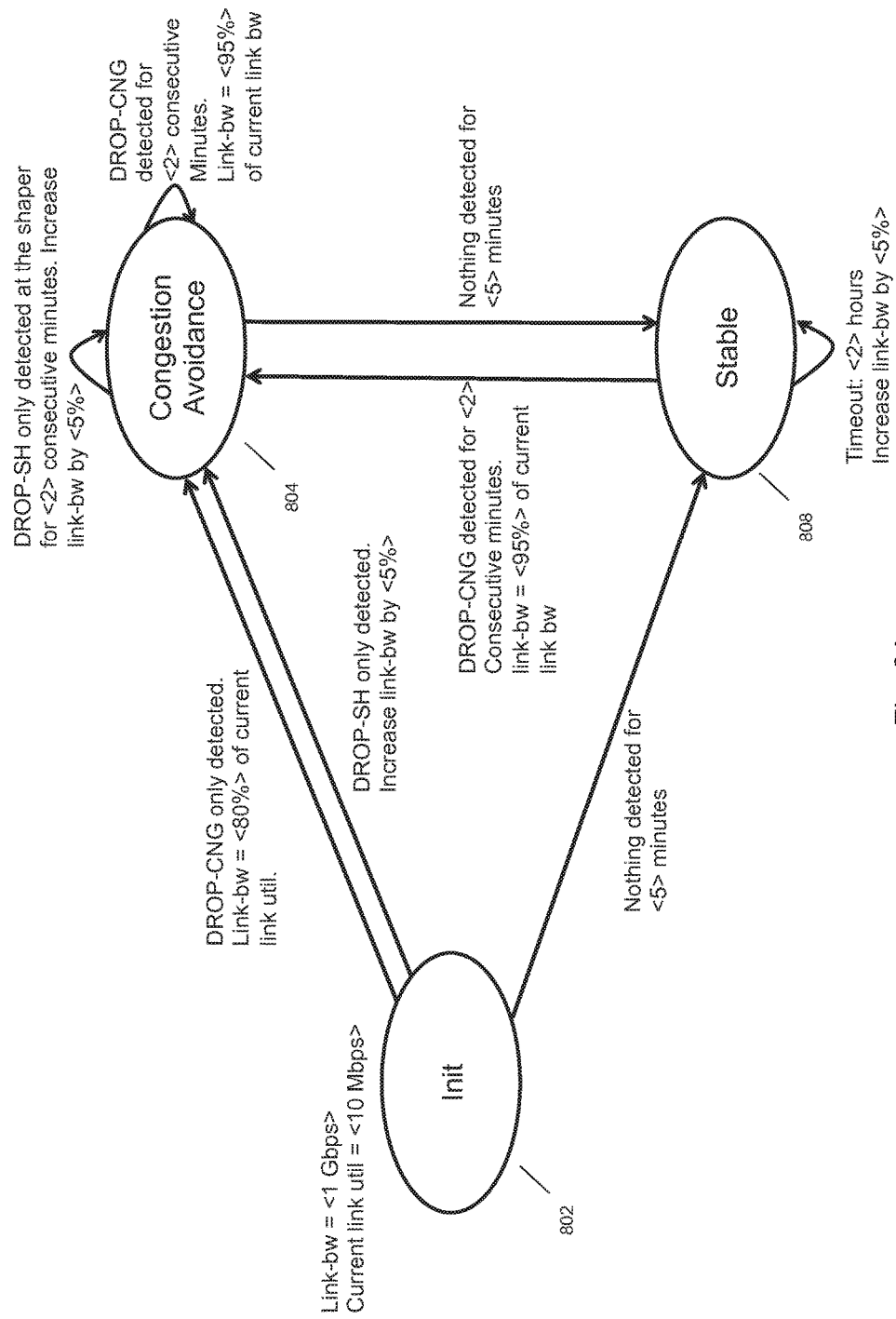
FIG. 8A illustrates the usage of a shaper to detect and respond to data congestion within a network and actions that may be taken.

Referring to FIG. 7, a configured device located within a network branch 152 may employ a shaper 154 on every link connecting to a network 705 in each direction (to and from). A shaper as the term is used herein may be a component of a configurable device or a component that is independent of a configurable device. A shaper 154 is a network artifact that limits the amount of data to a prescribed value. For example, if a shaper 154 is set to 10 Mbps in one direction, it will not allow more than 10 Mbps in that direction irrespective of how much is being attempted in that direction. If more than 10 Mbps is attempted to be sent, the shaper 154 will drop packets to keep the rate at 10 Mbps. Congestion control algorithms (e.g., Reno and binary increase congestion control (BIC)) may be used for bandwidth estimation. For idle links the estimation may be performed in a manner that is similar to an Internet speed test. For active links, link capacity may be determined through continuous monitoring and correction. In an example, links may have an ingress and egress shaper 154, as described herein, that controls how much traffic can be put on the link or received from the link. Any traffic exceeding the shaper's 154 limits may be dropped. A shaper's limit may be set by bandwidth estimation logic. At the start, this limit may be set to 'unlimited' or a very large value. Bandwidth estimation may periodically consider two inputs for every shaper 154: (a) count of dropped packets at the shaper 154 [DROP-SH] (b) count of dropped packets due to congestion on the collection of flows on the link [DROP-CNG]. Bandwidth estimation logic may "hunt" for proper link capacity as depicted in FIG. 8A. If no DROP-CNG, but DROP-SH is detected at the shaper 154 for two consecutive minutes, the result, in one example, may be to increase link-bandwidth by 5%. In another example, if DROP-CNG is detected for 2 consecutive minutes, the link-bandwidth may be set at 95% of current link bandwidth (one exception to this may be in a startup/initialization phase, where the link-bandwidth=80% of the current link-bandwidth to allow for faster convergence). In another example, if nothing is detected for more than two hours, the link-bandwidth may be increased by 5%.

According the methods and systems, as described herein, these drops may be detected and if these drops are present over a period of time (e.g., 120 seconds) the system may declare that it has detected actionable drops at the shaper 154 (DROP-SH). The configured device at the branch 152 may also monitor packet retransmits that might occur on TCP connections. Packet retransmits may indicate packet loss (hence it is getting retransmitted). However, packet loss may happen due to many conditions, some of which are not due to general network congestion. For example, TCP connections to a specific server 160 in Kansas might see packet retransmits but others do not. This very likely is due to a server 160 or network issue close to the server 160 in Kansas. To avoid false positives, the system and methods described herein may monitor packet retransmits across all connections holistically, assess the number of applications seeing packet retransmits, and perform such operations over a moving time window of, in one hypothetical example, 180 seconds, processed every 10 seconds. Thus, the time window of 180 seconds moves to the "right" every 10 seconds by 10 seconds. In another example, if twelve such consecutive measurements indicate that, for example, more than two-thirds of currently active applications at that device are seeing packet retransmits, then the system may declare that it has detected actionable congestion in the network 528 on that link. Such congestion caused packet loss (DROP-CNG) may cause packet retransmits. With DROP-SH and DROP-CNG, the system may, for example, perform the following:

| Hunting State | DROP-SH | DROP-CNG | Inference | Action |
|---|---|---|---|---|
| Init 802 | Present | Absent | Shaper 154 is too restrictive and there could be more capacity on the link | Increase shaper 154 limit by 5%. Go to Hunting state |
| | Don't care | Present | Network is seeing congestion | Decrease shaper 154 limit to 80% of current value. Go to Hunting state |
| Hunting | Absent | Absent | If this combination persists for 5 minutes, we have achieved STABLE 808 condition | Go to Stable 808 state |
| | Present | Absent | Shaper 154 is too restrictive and there could be more capacity on the link | Increase shaper 154 limit by 5% |
| | Absent | Present | Network is seeing congestion | Decrease shaper 154 limit to 95% of current value |
| | Present | Present | Network is seeing congestion | Decrease shaper 154 limit to 95% of current value |
| | Absent | Absent | If this combination persists for 5 minutes, after having adjusted shaper 154 limit, we have achieved STABLE 808 condition | Go to Stable state |
| Stable 808 | Absent | Absent | If this combination persists for 2 hours in the presence of near capacity link usage, time to see if more capacity is available in network | Increase shaper 154 limit by 5% Go to Hunting state |
| | Present | Absent | Shaper 154 is too restrictive and there could be more capacity on the link | Increase shaper 154 limit by 5%. Go to Hunting state |
| | Don't care | Present | Network is seeing congestion | Decrease shaper 154 limit to 95% of current value. Go to Hunting state |

If there is no congestion in the network and there is demand for more utilization as seen by the drops at the shaper 154, then an attempt to increase link capacity may be performed by easing the shaper 154 limit. If there is congestion in the network, then a decrease in the rate of data pushed on the link may be implemented by decreasing the shaper 154 limit. The result may be for each TCP connection to adjust to the new settings and, after a set period of time, settle on the new available capacity at the shaper 154.

According to the methods and systems of the present invention described herein, shapers 154 may be added or deleted based on the level of business priority associated with the traffic. This may be performed dynamically, for example, based on application demand, where the dynamic performance is carried out in compliance with a policy maintained at a multi-tenant controller 122. Performance-based routing may be accomplished by estimating link capacity automatically and dynamically, in near-real-time.

Network traffic may be classified based at least in part on a business priority, and bandwidth allocation to a plurality of applications running on a network may be determined based at least in part on assigned business priorities. A network administrator may create multiple business priority classes and assign each a priority order and/or ranking. In an example, a lower number for priority order may be considered a higher priority. For example, an administrator may create 4 classes "Platinum", "Gold", "Silver" and "Bronze" and give them priority order 10, 20, 30 and 40. Important applications like Office365 may get a Platinum, high-priority ranking, whereas recreational applications, such as YouTube, may be ranked lowest priority. An administrator may also provide a percent-allocation of bandwidth between the priority classes (e.g., 50% to Platinum, 30% to Gold, and so forth). A configured device may first detect the network type of each application data flow, for example, real-time, bulk or transactional. The configured device may create multiple queues for each business priority (e.g., strict priority 814, fair 818 and anomaly 820). A strict priority queue 814, for example, may be a queue for sending latency sensitive real time traffic (e.g. voice). If traffic is present in the queue it may be serviced before other queues (e.g., fair 818 or anomaly 820) are serviced. Fair priority 818 queue examples include, but are not limited to, queues that carry transactional or bulk traffic, such as web applications, or file download. These queues may be found in round robin fashion along with the anomaly queues 820. Anomaly 820 queues are queues that carry traffic for applications showing anomalous bandwidth consumption behavior (e.g., a chat application that rarely consumes more than 10 Kbps starts consuming 5× its regular consumption). An anomalous queue 820 may be used for those flows that are to exceed their traffic profile based bandwidth by a large margin. A shaper 154 may be used in front of the anomaly queues 820 to ensure that the anomaly flows do not impact bandwidth available for other flows. Anomaly queues may have a shaper 154 that restricts maximum bandwidth allowed to such anomalous behaving applications. The number of queues and the amount of buffering for each may be based on a formula that uses the current number of data flows and their network types. Fair queues 818 may be split into fair queues 818 for transactional traffic v. bulk traffic.

In embodiments, real-time traffic flows may be assigned to real-time queues, transaction flows to transactional fair queues and bulk flows to bulk fair queues 818 and directed by a multi-tenant controller 122, as described herein. A flow that changes from transaction to bulk and vice versa may be dynamically moved to the right queue. A configured device may use a shaper 154 per business priority class. This configured shaper 154 may be set to the sum of the total estimated bandwidth across application flows that are currently queues against the strict 814, fair 818 and anomaly 820 queues. This configured shaper 154 may be used if the administrator has given a percentage bandwidth allocation across the business priority classes. The administrator can add or delete a business priority class dynamically. This, in turn, may be used to dynamically add or delete business priority shapers 154 and queues. A business priority scheduler may "drain" traffic. As used in this context, "drain" refers to removing a packet sitting in a queue and sending it out of an interface from the queues across queues of a plurality of business priorities classes. The scheduler may use an algorithm that uses a combination of business priority and network type of the queues to decide how to drain them. This algorithm may ensure that if the interface has sufficient bandwidth then a lower business priority traffic having real time network type will continue to have satisfactory performance while not impacting the performance of real-time, bulk or transaction application flows belonging to a higher business priority class. If sufficient bandwidth is not available for both business classes, then the business priority scheduler algorithm may give preference to flows of higher business priority. The algorithm may use a similar method when there is more than one business priority class.

Figure 8B:
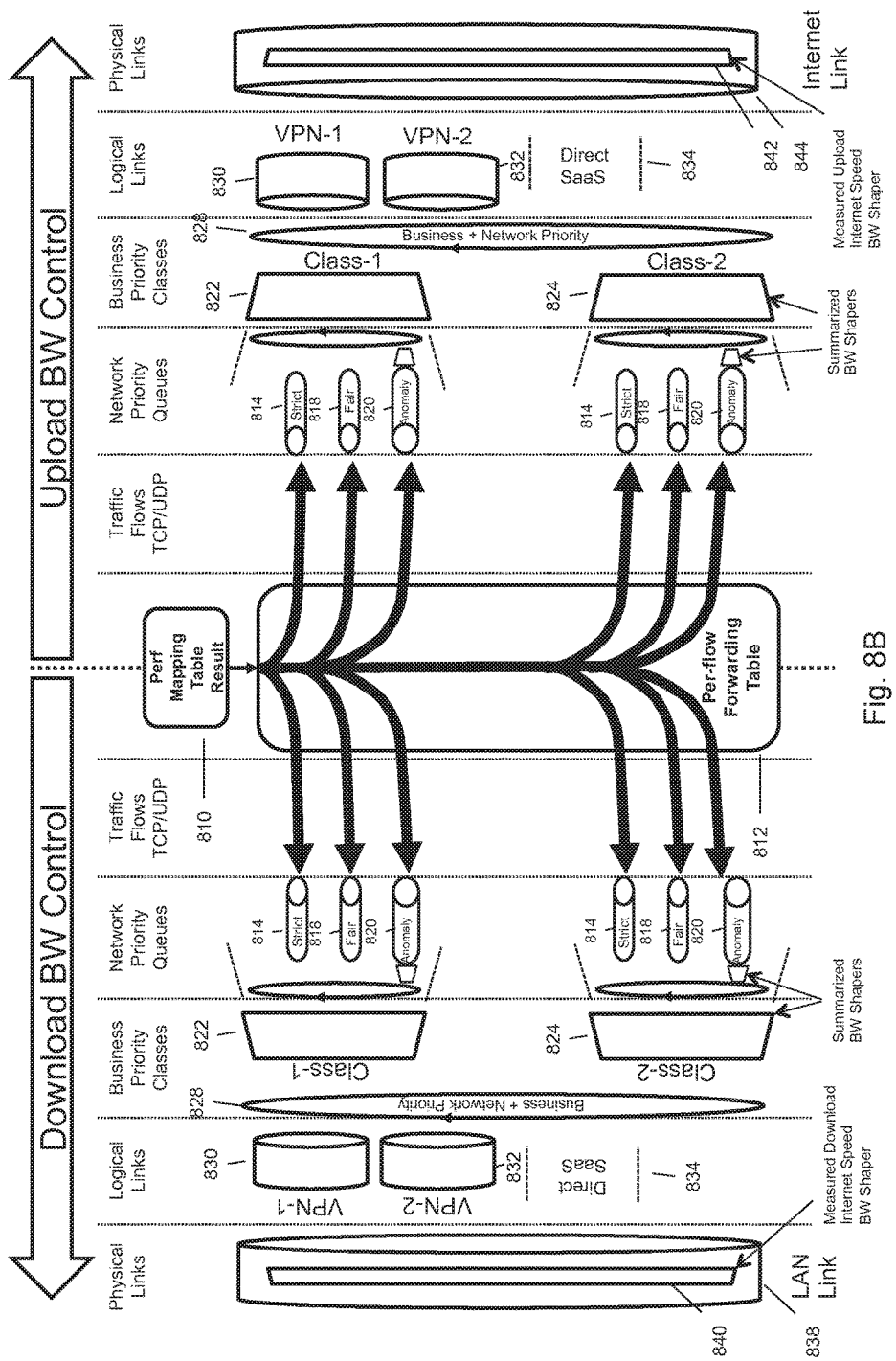
FIG. 8B illustrates a simplified view of network components comprising dynamic bandwidth control.
Figure 9:
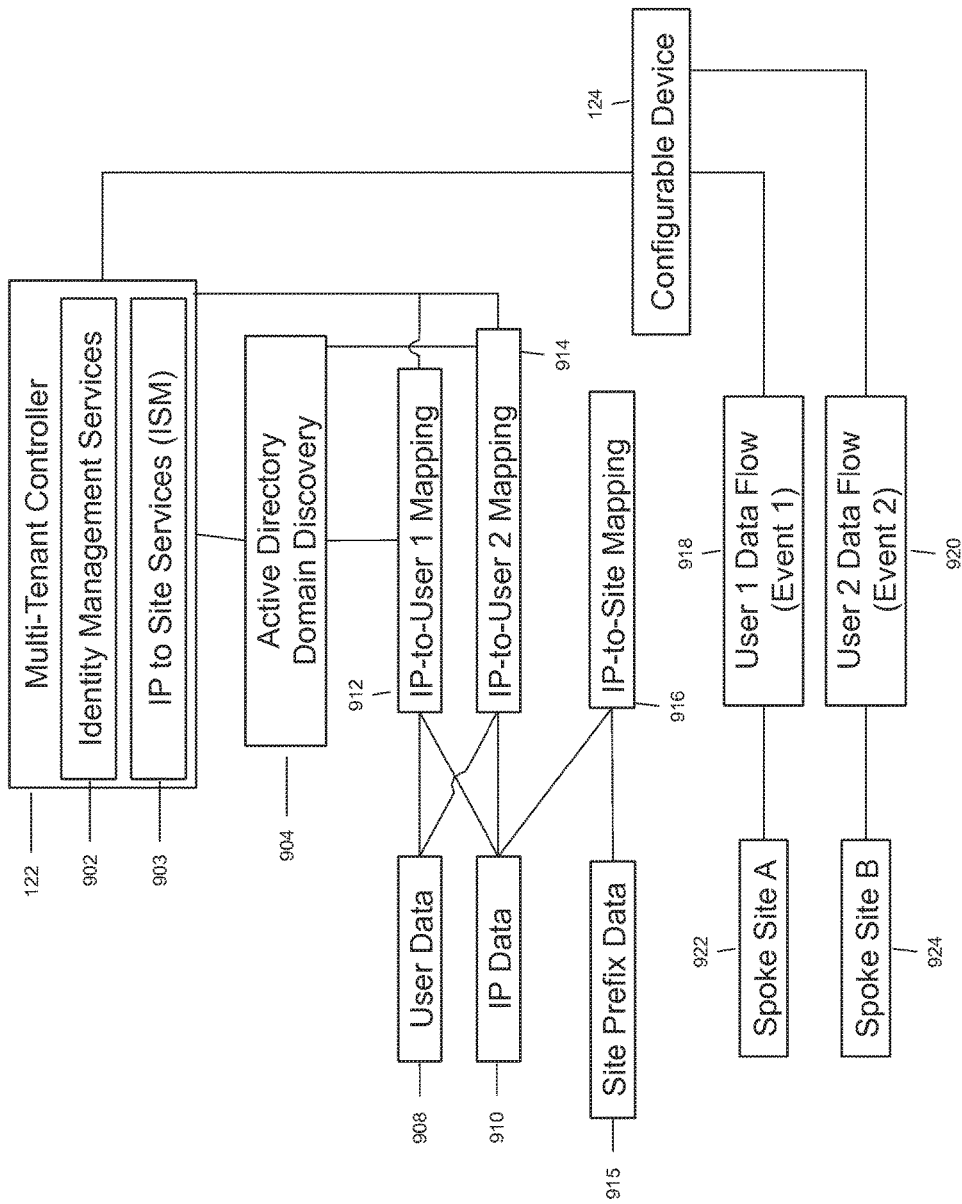
FIG. 9 Illustrates one embodiment of the multi-tenant controller within a network used to monitor, record and store IP-to-user data mappings and using such mappings to direct data flows over a network based at least in part on user identity.
Figure 10:
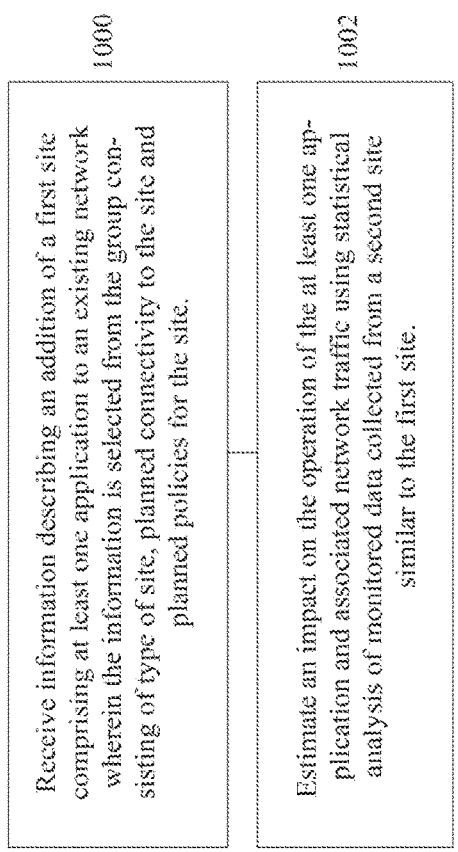
FIG. 10 illustrates a simplified embodiment for using statistical analysis to approximate and evaluate application performance on a network site.

In embodiments, and referring to FIG. 8B, the bandwidth that is considered sufficient for a business priority class may be the sum of real-time flow bandwidth amounts, sustained peak bandwidth for transactional flows and minimal sustained bandwidth of bulk flows. This information may be presented in the traffic profile of an application. Within a business priority class, real-time flows may be given a higher priority, followed by transactional flows, followed by bulk flows. The priority between transactional and bulk may not be strict 814 but may instead be weight-based with a higher weight provided for transaction flows but non-zero weight for bulk flows. Real-time flows however may have strict 814 priority and get drained first. An algorithm may take into consideration the dynamically changing link bandwidth of Internet links and also the percentage allocation specification set by an administrator between business classes. The dynamic, algorithmic monitoring may be used bi-directionally for each WAN interface. It may be applied against the egress direction on WAN interface for WAN traffic going towards WAN. It may also be applied against egress direction towards LAN for WAN traffic that is coming from WAN, and the configured device may be able to monitor the bandwidth usage in a passive manner and without introducing additional data traffic in order to test the bandwidth (i.e., the configured device is not adding to congestion).

In embodiments, configured spoke devices may adjust the bandwidth queues at reasonable or set time periods to ensure that the bandwidth offered to all sessions of an application matches the need of the application sessions, while honoring the business priorities. For example, if there are 10 sessions of a P1 application, and each session needs 10 Kbps, then the bandwidth queues may be adjusted such that 100 Kbps is offered to that application, assuming bandwidth is available for the rest of the P1 applications, and the total share of bandwidth used by all P1 applications doesn't exceed a certain percentage. If the number of sessions of the same application increased to 50, then the bandwidth queues may be adjusted such that 500 Kbps is offered to that application, while still meeting the other constraints. Configured devices may detect anomalous application sessions depending on the amount of bandwidth consumed, and may move those sessions to an anomalous queue 820, where the bandwidth offered to such applications sessions is restricted.

In accordance with exemplary embodiments, such methods and systems for anomalous application session identification, quarantine and restriction described herein may be applied to application sessions as described above. Further, such methods and systems may utilize dynamic automated QoS definitions as described herein. The methods and systems described herein may employ modeling and analytics and use QoS standardized controls as described herein. Other exemplary embodiments may utilize parameters for categorizing data flows as described herein.

The following are illustrative clauses demonstrating non-limiting embodiments of the inventions described herein:

A method comprising:
issuing a tuned request on a specified active link having an ingress shaper and an egress shaper to a server utilizing a link capacity to an extent in both a forward path and a return path;
determining a link capacity for the active link;
monitoring the active link; and
dropping any traffic traveling via the active link when a limit of at least one of the ingress shaper and the egress shaper is exceeded.

A method comprising:
issuing a request on a specified active link having an ingress shaper and an egress shaper to a server utilizing a link capacity to an extent in both a forward path and a return path;
determining a link capacity for the active link;
monitoring the active link;
determining a limit of the ingress shaper and the egress shaper based, at least in part, using bandwidth estimation logic; and
dropping any traffic traveling via the active link when the limit is exceeded.

A method comprising:
receiving a plurality of business priority classes;
detecting a network type associated with each of a plurality of application data flows in a network wherein the network data flow types are selected form the group consisting of real-time, bulk and transactional;
creating a plurality of strict priority queues, fair queues and anomaly queues for each of the plurality of business priority classes; and
assigning real-time network data flows to real-time queues, transactional flows to fair queues and bulk flows to bulk fair queues.

A method comprising:
monitoring a bandwidth of an application comprising an application session at a configured spoke device at a predetermined time interval; and
adjusting the bandwidth such that the bandwidth matches a requirement of the application session while meeting the requirements of one or more defined business priorities.

Any of the clauses above further employing a multi-tenant controller based mapping of a user or device identity to a network level identity.

Any of the clauses above wherein the application analysis is performed on a per session basis.

Any of the clauses above wherein routing is based, at least in part, on a dynamic and automated QoS definition.

Any of the clauses above further comprising employing modeling and analytics selected from the group consisting of Pareto and Weibull.

Any of the clauses above further comprising employing QoS standardized controls selected from the group consisting of shaping, policing, random early discard, tail drop, low latency queues, fair queues, anomaly queues and buffers.

Any of the clauses above further utilizing parameters to categorize data flows.

Traditionally network traffic engineering is based on destination IP addresses and/or a source IP address, but not on higher-level user or device identity. The creation of usage-based policy may allow an enterprise to enforce network policy using the identity of a user 168 that is accessing an application. For example, Active Directory (AD) 904 may be used as a source of user 168 and group identity information. What is needed are methods and systems for enforcing a user 168 or user-based policy by mapping IP-to-user-events 912, 914 to a spoke site, where such events derive from multiple elements which may be present in multiple other sites, and enforcing policy at the network level using higher-level identity an administrator needs to map higher-level user 168 and/or device identity to network level identity. Network level identity as used herein may be terms of L2 (MAC Address, VLAN Tag) and/or L3 identity (IP Address) and/or L4 Identity (e.g. TCP port number, UDP port number).

According to the methods and systems of the present invention described herein, a central multi-tenant controller 122 may be used to collect the identity information relating to users 168 of an application running on a network, and use a horizontally scalable algorithm to keep track of changing identity information so that the multi-tenant controller 122 can keep a policy updated so that it can enforce user 168 based network policy and provide accurate user 168 based networking and application monitoring data. In embodiments, a multi-tenant controller 122 may be used to collect the IP-to-user mapping events 912, 914 and may use a horizontally scalable algorithm within the multi-tenant controller 122 to decide which spoke site needs an event. Based on this information, the multi-tenant controller 122 may then distribute the mapping to the spoke device in the correct spoke site. A spoke device may use the IP-to-user mappings 912, 914 to identify which user 168 or user group a particular application flow belongs. It may then enforce a user-, or user group-based policy on that data flow. Spoke devices and hub devices support roles, including but not limited to discovery of AD using DNS [DNS ROLE], and tracking changes in user 168 and group identities using lightweight directory access protocol (LDAP) communication with AD [LDAP ROLE].

In embodiments, a multi-tenant controller 122 may run horizontally scalable services called Identity Management (IDM) Services 902. For a given tenant, the multi-tenant controller 122 IDM service may select a set of elements and instruct them to run DNS ROLE and discover all AD domains and list the AD servers in the enterprise. The DNS ROLE may continuously monitor additions and deletions of AD domains, addition/deletions of AD server, and changes in IP address of AD servers. The DNS ROLE may keep the multi-tenant controller 122 IDM service informed of these changes and the IDM service 902. The multi-tenant controller 122 may present the list of AD domains and AD servers to the tenant administrator and request credentials to communicate with the AD servers using LDAP and Windows Management Instrumentation (WMI). WMI is a communication protocol supported by Microsoft AD Servers. Devices external to Windows AD servers can use this protocol to communicate with Windows AD server and obtain information on events (including login and logout events) on the Windows AD server. For each AD domain, the multi-tenant controller 122 IDM service may select an element at a hub site that will run LDAP ROLE to communicate using LDAP with one or more AD servers for the AD domain. The multi-tenant controller 122 may use a specific algorithm to decide which hub site is the optimal hub site whose elements should run the LDAP ROLE and also determine if there are multiple elements in the hub site elements communicating with the AD servers and which AD servers are involved. The algorithm may minimize load on the AD servers, achieve fair load distribution across hub device elements, and contain LDAP communication to LAN rather than WAN. The element running LDAP ROLE may derive basic information such as full name, AD numerical ID, AD string ID for users 168 and groups, or some other type of identifying information. It may do this for those users 168 and user groups that the multi-tenant controller 122 wants to track for the purpose of enforcing a policy (e.g., the user 168 or user group is used in a policy's identity field) and for the purpose of monitoring and troubleshooting (e.g., the user 168 is present in a spoke site with a configurable element).

In embodiments, a multi-tenant controller 122 may make available an existing user 168 or user group identity to an IT administrator so that the administrator can use them in a policy. The multi-tenant controller 122 may generate a separate controller-based ID for each AD identity and further keep a mapping of its ID in AD. The multi-tenant controller 122 may send a policy to each element and, in lieu of the AD identity, send down the ID it has locally generated. This ID may then be used by each element to enforce policy. The multi-tenant controller 122 IDM service 902 may also make available the information of the AD to a statistics and analytics service so that it can display full user name and AD information about the user 168 for the purpose of reporting and monitoring. The benefits of these methods and systems of identity-based policy may include, but are not limited to, 1) the use of user identity in policy may improve WAN traffic engineering for performance and compliance, 2) the multi-tenant controller 122 may optimize mapping of element-to-AD preferred communication paths for the purpose of monitoring user/group identity additions, deletions and changes (the multi-tenant controller 122 may accomplish this at scale across hundreds of AD sources and hundreds of elements per enterprise and across thousands such enterprises), and 3) the multi-tenant controller 122's use of algorithms may allow for a horizontally scalable controller service and that specifically minimizes LDAP traffic on WAN. Each configurable element may support a role for tracking of security login events using Windows management instrumentation (WMI) communication with AD [WMI ROLE]. The security login events may include information relating to user name and IP address.

In embodiments, a multi-tenant controller 122 may run a horizontally scalable service IP to Site Mapping (ISM) Service 903. For a given tenant, the multi-tenant controller 122 IDM Service may select a set of elements and instruct them to run DNS ROLE and discover all AD domains and list of AD servers in the enterprise. The DNS ROLE may continuously monitor additions and deletions of AD domains, addition/deletions of AD servers and changes in IP address of AD servers, and keep the controller IDM service 902 informed of these changes and the IDM service 902. The multi-tenant controller 122 may present the list of AD domains and AD servers to the tenant administrator and request credentials to communicate with the AD server's WMI. The multi-tenant controller 122 may run an algorithm to decide which element (from all the spoke and hub elements) will run the WMI ROLE that will contact specific AD instances. The algorithm may use information about subnets/prefix served by each AD, the local and discovered prefix sites of a site, and select a spoke or hub element to run WMI role so that it can get the necessary security login events. The algorithm may identify the correct AD, contain WMI communication to LAN and minimize it over WAN and take care of failures of the AD.

In embodiments, the configurable elements running WMI roles using WMI with AD may receive specific AD login security events indicating the IP and AD user string ID and AD user numerical ID, and send a IP-to-user mapping events 912, 914 to the multi-tenant controller 122's IP-to-Site Mapping (ISM) service 903. In an example, a WMI Role on a configurable element may receive an AD security event (login event) from AD using WMI. This event may include the IP address and AD ID and name of the user 168 who has logged into AD. The WMI Role may then form a message using this information, and this message may be called as an IP-to-user mapping, and send the message to the multi-tenant controller 122's ISM service 903. The ISM service 903 may run an algorithm that builds a data-based lookup method that uses the local and discovered prefix sets 915 of sites and the IP address in the IP-to-user mapping event 912, 914 to find to generate a IP-to-Site mapping 916. It uses this IP-to-Site mapping 916 to decide which spoke site a given IP-to-user mapping event 912, 914 should be sent. The ISM 903 may change the AD user ID to a multi-tenant controller 122 user ID (which matches the user ID in a policy of interest) in the IP-to-user mapping event 912, 914. It may also add group ID's to the event for all groups to which the user belongs. The ISM 903 may send the enriched IP-to-user mapping event 912, 914 to the correct spoke site and also record this IP as belonging to the user in the multi-tenant controller 122 database. Each database entry may have a validity period of 30 days (or some other timeframe) after which the entry is purged.

In embodiments, spoke elements may use the IP-to-user event 912,914 obtained from the ISM 903 service to build an IP-to-userID and IP-to-groupID cache. For each incoming application flow, this cache may be used to determine the user 168 and group ID for the flow and use this ID to lookup policy and enforce policy. When the spoke elements generate flow statistics for the flow they may include the user 168 and group ID's as part of the flow statistic record and send it to a multi-tenant controller statistics service. The multi-tenant controller statistics and analytics service may store the statistical records with the user 168 and group ID information, and provide monitoring and troubleshooting information for a particular user 168 or group. The multi-tenant controller 122 may collect all the IP-to-user events 912, 914 from multiple elements and map them to the final site having an element that needs to consume that event for enforcing policy on the data path. The multi-tenant controller 122 may map which element should communicate with which AD as IP-to-user event source. The multi-tenant controller 122 may scale across hundreds of AD sources and hundreds of elements per enterprise and across thousands such enterprises. The use of algorithms may allow for a horizontally scalable multi-tenant controller service that eliminates WMI traffic on WAN and reduces the amount of IP-to-user mapping traffic on WAN.

The following are illustrative clauses demonstrating non-limiting embodiments of the inventions described herein:
A method comprising:
  executing at a controller a horizontally scalable service Identity Definitions Manager (IDM) Service;
  mapping active directory (AD) domains to WAN network elements DNS ROLE and LDAP ROLE;
  instructing a plurality of network elements associated with a tenant to discover a plurality of AD domains and AD servers in an enterprise using the DNS ROLE;
  receiving from the plurality of network elements running DNS ROLE information indicative of changes to network attributes selected from the group consisting of AD domains, additions and subtractions of AD servers and changes in an IP address of AD servers;

transmitting the received AD domains and AD servers to a tenant administrator and requesting credentials to communicate with added AD servers using LDAP; and executing an algorithm to determine which element will contact specific AD instances to minimize lightweight directory access protocol (LDAP) traffic volume occurring on the WAN and to ensure AD instances can still be reached in case of failure of any one network element;

monitoring in Active Directory servers changes in at least one identity (user or group) of a network user by using the LDAP ROLE on the network elements; and updating a policy, based at least in part on the mapping of user identity in AD domains, at a multi-tenant controller, wherein the tracking of changing identity information is implemented as a horizontally scalable service the Identity Definitions Manager Service A centrally controllable multi-tenant controller for controlling a plurality of assets across a plurality of distributed computing environments wherein the controller is configured to:

running at a controller a horizontally scalable service Identity Definitions Manager (IDM) Service;

mapping active directory (AD) domains to WAN network elements DNS ROLE and LDAP ROLE;

instructing a plurality of network elements associated with a tenant to discover a plurality of AD domains and AD servers in an enterprise using the DNS ROLE;

receiving from the plurality of network elements running DNS ROLE information indicative of changes to network attributes selected from the group consisting of AD domains, additions and subtractions of AD servers and changes in an IP address of AD servers;

transmitting the received AD domains and AD servers to a tenant administrator and requesting credentials to communicate with added AD servers using LDAP; and executing an algorithm to determine which element will contact specific AD instances to minimize lightweight directory access protocol (LDAP) traffic volume occurring on the WAN and to ensure AD instances can still be reached in case of failure of any one network element;

receiving from the LDAP ROLE of network element changes in Active Directory servers in at least one identity (user or group) of a network; and updating a policy, based at least in part on the mapping of user identity in AD domains, at a multi-tenant controller, wherein the tracking of changing identity information is implemented as a horizontally scalable service the Identity Definitions Manager Service A network element executing DNS ROLE and LDAP ROLE configured to:

obtain instructions from a central multi-tenant controller IDM server on which domains to discover AD servers in using DNS role Discovering using DNS ROLE information indicative of changes to network attributes selected from the group consisting of AD domains, additions and subtractions of AD servers and changes in an IP address of AD servers, and transmitting this information to the multi-tenant controller IDM service;

receiving from the multi-tenant controller IDM service the credentials to communicate with discovered AD servers using LDAP; and monitoring in Active Directory servers changes in at least one identity (user or group) of a network user by using the LDAP ROLE on the network elements and transmitting these changes to the multi-tenant controller IDM service.

A method comprising:

executing at a controller a horizontally scalable service IP to Site Mapping (ISM) Service;

instructing a plurality of network elements associated with a tenant to discover a plurality of AD domains and AD servers in an enterprise;

receiving from the plurality of network elements information indicative of changes to network attributes selected from the group consisting of AD domains, additions and subtractions of AD servers and changes in an IP address of AD servers;

transmitting the received AD domains and AD servers to a tenant administrator and requesting credentials to communicate with added AD servers using WMI;

executing an algorithm to determine which element will contact specific AD instances in order to contain WMI communication over LAN and minimize WMI communication over WAN;

monitoring, using the WMI role on the network elements, the AD servers security login events comprising an IP address, a user AD ID and a user name;

converting the login events to IP-to-user events and transmitting these to the ISM service in the controller;

using the ISM service to map these IP-to-user events to the right spoke site;

sending the events with enriched information comprising one or more group IDs for the user to the element in the spoke site; and using the enriched IP to user event at the spoke site to enforce policy based on user and group IDs and to enrich flow and application statistics with user and group information.

A centrally controllable multi-tenant controller for controlling a plurality of assets across a plurality of distributed computing environments wherein the controller is configured to:

execute at a controller a horizontally scalable service IP to Site Mapping (ISM) Service;

instruct a plurality of network elements associated with a tenant to discover a plurality of AD domains and AD servers in an enterprise;

transmitting the received AD domains and AD servers to a tenant administrator and requesting credentials to communicate with added AD servers using WMI;

transmitting the credentials to the network elements running WMI ROLE;

executing an algorithm to determine which element will contact specific AD instances in order to contain WMI communication over LAN and minimize WMI communication over WAN;

receiving from the elements a plurality of AD server login events which contain user IP address, user AD ID and user name;

converting these login events to IP-to-user events and transmitting these to the ISM service in the controller.

using the ISM service to map these IP-to-user events to the right spoke site;

sending these events with enriched information comprising a group ID for the user to the element in the spoke site; and using the enriched IP to user event at the spoke site to enforce policy based on user and group IDs and to enrich flow and application statistics with user and group information.

A method comprising:

obtaining instructions from a central multi-tenant controller's IDM service to discover a plurality of AD domains and AD servers in an enterprise using DNS ROLE;

transmitting information to a multi-tenant controller IDM indicative of changes to network attributes selected from the group consisting of AD domains, additions and subtractions of AD servers and changes in an IP address of AD servers;

receiving credentials from the multi-tenant controller to communicate with added AD servers using WMI;

monitoring, using the WMI role, the AD servers security login events comprising an IP address, a user AD ID and a user name; and converting the login events to IP-to-user events and transmitting the login events to an ISM service in a controller.

A method comprising:

receiving enriched IP to user event at a spoke site from a multi-tenant controller's IP to Site Mapping Service to enforce policy based, at least in part, on a user and a group ID; and enriching flow statistics and application statistic with user and group information.

Any of the clauses above further utilizing a network identity type.

With traditional networks, changes to the network may comprise a major event. Typically, effort is made to implement planned changes during planned "outage" windows. Further, changes are often made blindly wherein personnel 'pray' for things to be acceptable. Regardless, such changes are necessary. For example, a new application needs to be rolled out and the network has to be adjusted to allow, accommodate, control and route the application's traffic.

Change planning and execution in a network is more art than science due to (1) the complexity of the network, (2) the lack of end-end view and control of the network and (3) the lack of understanding of the application's needs and demands.

Such network planning is not new. However, such planning is typically beyond the capabilities of the network management tools that manage the devices in the network. Such planning is typically performed in isolation from the real network and is complex, works with stale data and requires translation from a planned view to effecting the changes in the network.

In accordance with exemplary and non-limiting embodiments, there is provided a multi-tenant controller 122 to centrally view and control the network topology, configurable device 124 in the topology and the application of policies to solve the operational needs of network administration. A multi-tenant controller 122 may be used to identify and map the topology of a network and use the network view to determine optimal policy and device usage of network assets.

As described more fully herein, there is implemented a three part solution. First, the network 528 is simplified from a user interaction perspective and there are no routing protocols and routing translations to configure. Second, an end-end view of the controlled network 528 is always available. Lastly, the described solution is built, in part, on an understanding of the applications and thus enabling the network for an application is a native capability.

In accordance with exemplary embodiments, the multi-tenant controller records data indicative of where all devices and applications are located. As described more fully below, this provides for global knowledge and allows for the provision of what-if scenarios. As a result, a customer may query the multi-tenant controller 122 directly to see which devices and applications are resident on the network 704.

For example, a network 528 supports 450 sites and wishes to add a $451^{st}$ site. How will this change affect routing topology and flow of traffic packages? In accordance with exemplary embodiments, when a new site is added, the changes to the network topology are updated at the multi-tenant controller 122. Because the multi-tenant controller 122 has access to the HTTP flow, the multi-tenant controller 122 may be queried to, for example, show all paths between sites and simulate network function. The multi-tenant controller 122 may have access to bandwidth and links in its topology graph of the network. Utilization of each link can also be gathered and stored for access by the multi-tenant controller 122.

In accordance with exemplary and non-limiting embodiments, the multi-tenant controller 122 may simulate the effects of changes to a network 528. The multi-tenant controller 122 may keep track of all configurations (devices, interfaces, capacities, policies and more) for all the devices in the network 528. Configuration management may be in real or near-real time to ensure minimal data latency.

The multi-tenant controller 122 may also keep large amounts of monitoring data on traffic types, traffic load and application statistics. The multi-tenant controller 122 may also allow for the creation of 'empty' or hypothetical sites, specifically, ones that are not real but are, for example, being planned.

In an exemplary embodiment, the effect of adding a new 'site' or device to the network 528 may be simulated through the multi-tenant controller 122 with the ability to view projected traffic flow, capacity needs on links and DC devices, and business impact through traffic offload from traditional high cost network connectivity.

In accordance with such embodiments, the network administrator may provide (a) the type of site, (b) planned connectivity to the site, (c) planned policies for the site, and (d) an anticipated number of end users 168 at the site. As used herein, the type of site refers, generally, to a spoke (remote branch 152), hub (data center 128) or service (where certain network services exist but these sites are unlike a traditional DC or branch 152).

Using these inputs and the additional data to which the multi-tenant controller 122 has access from the network 528, the multi-tenant controller 122 may provide an integrated view of the new planned site plus all the existing sites already in the network 528 as well as assess the routing effects, traffic flow effects and the policy effects of the new planned site as if it were already in the network 528.

To estimate an impact on applications and their traffic, the multi-tenant controller 122 may use any available existing statistics and monitoring data collected from similar sites in the customer's network already controlled and managed.

Examples of such data include, but are not limited to, (1) the type and nature of applications, (2) the number of users 168 or other data instead of users 168 such as, for example, the number of flows/sec, total simultaneous application sessions and flows, (3) the peak and average amount of data entering and exiting such a site and periodicity of such metric, (4) the measured application performance, network connectivity latencies and packet losses seen by applications from a site with geographical and connectivity similarity and (5) the configured and measured available bandwidth on links/connectivity, diurnal or other periodic variables on available bandwidth on such links from similar providers (since a customer typically involves the same provider across many sites).

As described more fully below, application profiles are accessible based on information collected from various types of sites. Application profile includes bandwidth, latency and jitter requirements. In addition, there may be stored and accessible user (group) profiles based on information collected from various sites. User profiles may include information such as (a) which applications does a typical user 168 belonging to a group consume and (b) what are the typical times at which a user 168 accesses which applications. Using this information, one may estimate what the connectivity needs will be for a new site if the administrator can tell what type of user (groups) are going to be at the site, and how many of them there are likely to be and the like.

The effect of adding or changing a policy in the network can be simulated using the multi-tenant controller 122 with the ability to view projected traffic flow, capacity needs on links and DC devices, and business impact through traffic offload from traditional high cost network connectivity. When a policy is planned to be added or changed, the network administrator provides (a) the policy to be added/changed and (b) the sites that he/she intends to apply the change to. With these inputs and the additional data the multi-tenant controller 122 has from the network 528, the multi-tenant controller 122 may provide an integrated view of the new policy plus all the existing policies and the sites they apply to and assess the routing effects and traffic flow effects as if it were already in the network 528.

To estimate the impact on applications and their traffic, the multi-tenant controller 122 may use any available existing statistics and monitoring data collected from similar sites in the customer's network already controlled and managed. In addition to the statistics described above, the multi-tenant controller 122 may further consider an estimate of how moving flows away from or to a link or destination frees up, congests the links and removes or adds to the load at a site. For example, if traffic to office365.com is going through a DC and then to the Internet 142, adding a site with a policy to directly send such traffic to office365.com without sending it via the DC may illustrate how load and congestion on the links at the DC can be altered.

In accordance with other exemplary embodiments, the effect of adding new bandwidth/capacity with additional network connectivity (like a new Internet link) can be simulated through the multi-tenant controller 122 with the ability to view projected traffic flow, capacity needs at DC devices, and business impact through traffic offload from traditional high cost network connectivity. When a new link or network capacity is planned to be added to a site or set of sites, the network admin provides (a) the site and (b) the network links that will be added to the site. With these inputs and the additional data it has from the network 528, the multi-tenant controller 122 may provide an integrated view of the new planned network connectivity plus all the existing links already available at the site and assess the routing effects, traffic flow effects and the policy effects of the new planned network connectivity as if it were already at the site.

To estimate impact on applications and their traffic, the multi-tenant controller 122 may use any available existing statistics and monitoring data collected from similar sites in the customer's network already controlled and managed.

As described herein with reference to various exemplary embodiments, estimation may be performed to predict the impact of network changes on applications and related network traffic. In all of these embodiments, various inputs may be utilized. For example, a first input that may be utilized includes the topology of a network. As described elsewhere herein, the topology may be synthesized at the multi-tenant controller 122. The topology of a network may provide a tree-graph representation of configurable devices 124, connectivity through MPLS 144 (Private WAN), Internet 142 (Public WAN) and IPSEC based VPN methods over Private WAN and Public WAN. The multi-tenant controller 122 may also discern reachability to other parts of network (where configurable devices 124 may not exist) based on information exported from the configurable device 124 at the branch.

A second input may comprise a type of network, e.g., Private WAN, Public WAN, Internet VPN and Private VPN.

A third input may comprise application definitions—both system-provided and customer-defined—maintained at the multi-tenant controller 122. Identity/User definitions described elsewhere herein may be part of definitions used in policies. User/Identity definitions may be received and processed and interpreted at the multi-tenant controller 122 as specified elsewhere herein.

A fourth input may comprise policies that prescribe which application is allowed to use which type of connectivity at a specific site.

A fifth input may comprise monitoring data (telemetry) from existing active sites or sites in monitor mode on some or all applications. The telemetry from each site for every application may include the following: (a) bandwidth consumed over time over every network type including average and peak data, (b) data transferred over time over every network type, (c) number of simultaneous flows over time and (d) maximum flows/sec at the site and application level.

A sixth input may comprise monitoring data (telemetry) from existing active sites or sites in monitor mode on media applications. The telemetry from each site for any media application present include the following additional items: (a) jitter seen over time for audio and/or video including average and peak values, (b) packet loss seen over time for audio and/or video including average and peak values and (c) an MOS Score over time for audio and/or video.

A seventh input may comprise site parameters such as: (a) a type of site, e.g., branch 152 or DC, (b) network types and number of such connectivity, (c) a list of applications or pointer to another site that is similar, (d) a policy choice of pointer to another site that has the needed policy and (e) a number of users 168 or pointer to another site that is similar.

In accordance with the exemplary embodiments described herein, what-if use cases and processing may be performed. When determining which paths a specific application should take from a site, one may take the topology of the network, apply the policy for the application, and reduce the topology to allowed connectivity based, at least in part, on a policy. The result is a set of network links that can carry the proposed application traffic.

When seeking to determine which paths traffic from a specific user 168 and/or application take from a site, one may take the topology of the network and apply the policy for the application and user 168 and reduce the topology to allowed connectivity based, at least in part, on a policy. The result is a set of network links that can carry the application traffic for a specific user 168 or user group When seeking to determine what a new branch 152 may look like in terms of device and network capacity, one may proceed as follows. First, the multi-tenant controller 122 may calculate normalized average and peak bandwidth utilization and maximum flows/sec at a site for every application on a per site-size basis, categorized appropriately. Site-size may be decided by simultaneous flows at existing sites.

Then, the multi-tenant controller 122 may derive applications and policies at the new site from user input or by reference to another site. The multi-tenant controller 122 may derive simultaneous flows at the new site by reference to another site or by taking the number of users 168 and multiplying by, for example, 20 with a floor value of 200.

The multi-tenant controller 122 may then build a sample "site model" that is a mix of estimated bandwidth (BW) utilization and estimated maximum flows/sec as follows:

Average-$BW_{est}$=Average of sum of every app's average BW scaled to new site's size Peak-$BW_{est}$=Peak of every app's peak BW scale to new site's size Max-FLOW/$SEC_{est}$=Maximum flows/sec at site scale to new site's size Simul-$FLOWS_{est}$=Direct value as described above.

The resulting Simul-$FLOWS_{est}$ and Max-FLOW/$SEC_{est}$ may be used to recommend a device type and capacity while Average and Peak-BWest may be used to suggest network type changes to accommodate the average and peak bandwidth needs.

When seeking to determine how an application's traffic may change in a network due to a new proposed site, one may proceed as follows. First, a multi-tenant controller 122 may derive applications and policies at the proposed site from user input or by reference to another site. Next, one may take the topology of the network and add the proposed site along with its network connectivity and types. Next, one may apply the policy for the application and reduce the topology to allowed connectivity based on policy. For every DC site, the multi-tenant controller 122 may estimate the contribution of traffic (BW-$INCR_{est}$) from sites similar to the proposed site. Similarity may be estimated by site-size and policy similarity to account for the amount and type of application traffic that comes in to the DC from the proposed site.

The result is a set of network links that can carry the traffic for every application from and to the proposed site with a bandwidth increase of BW-$INCR_{est}$ at each DC site due to the addition of the proposed site.

In accordance with exemplary embodiments, data center 128 applications may include an array of applications including, but not limited to, Exchange, SFDC and SAP. Such methods and systems as described herein may be utilize and be utilized by all manner of data center applications.

In accordance with exemplary embodiments, such methods and systems for controller-based network topology identification may be applied to application sessions as described above. Further, such methods and systems may be applied to various branch 152 types as described herein.

The following are illustrative clauses demonstrating non-limiting embodiments of the inventions described herein:

A method comprising:
receiving information describing an addition of a first site comprising at least one application to an existing network wherein the information is selected from the group consisting of type of site, planned connectivity to the site and planned policies for the site; and
estimating an impact on the operation of the at least one application and associated network traffic using statistical analysis of monitored data collected from a second site similar to the first site.

A method comprising:
receiving information describing a change to a policy for an existing network wherein the information is selected from the group consisting of the policy to be changed and the network sites to which the policy is to apply; and
estimating an impact on the operation of the at least one application and associated network traffic using statistical analysis of monitored data collected from a second site similar to the first site.

A method comprising:
receiving information describing a new network link to be added to an existing network site wherein the information is selected from the group consisting of the site and the network link to be added; and
estimating an impact on the operation of the at least one application and associated network traffic using statistical analysis of monitored data collected from a second site similar to the first site.

Any of the clauses above wherein the application analysis is performed on a per session basis.

Any of the clauses above wherein a branch type is selected from the group consisting of retail store bank, POS device, and distributed computing site.

Any of the clauses above wherein at least one application comprises a data center application.

Any of the clauses above wherein applications are selected from the group consisting of transactional applications and file transfer applications.

Any of the clauses above further comprising performing modeling and analytics selected from the group consisting of Pareto and Weibull.

Any of the clauses above wherein a network type is selected from the group consisting of wired and wireless.

Any of the clauses above further utilizing parameters to categorize data flows.

In traditional networking, SKUs are often used to account for product features, scale and capacity. For example, a 100-node network might be handled by one SKU while a 1000 node network might need a "bigger" SKU. The availability of network may be provided by deployment of redundant units. For example, a reliable network may have key points in the network protected by two units of the same SKU so that if one should fail the other one takes over. This is referred to as "vertical scaling."

In a web services architecture, every server 160 or a unit of system component is equally capable and can handle a certain number of load or transactions. A load balancer, typically sitting in front of these components, distributes the load to the one or more instances of the system component, called a cluster. This model may provide both redundancy and scale: A single instance failure means that instance is out of the cluster and the other instances take on the load. As the load on the system increases, adding more instances may increase the capacity of the cluster. This is referred to as "horizontal scaling."

There is a need for methods and systems enabling high network availability by running an assignment algorithm at a multi-tenant controller 122 in order to assign branch sites 152 (and associated branch devices 152) to at least two configurable devices 124 at each data center 128 within a network, with branch sites 152 mapped to hub pairs. At each data center 128 between the hub pair assigned to a branch device 152, a configurable branch device 152 may select one hub device as primary and one hub device as secondary. Traffic may be preferentially sent to the primary hub device. Upon failure of the primary hub device, the configurable branch device 152 may switch data flows to the second of the devices in the hub device pairing and stop traffic over the failed primary hub device. There may be several hub devices in a given data center 128. This hub array in the data center 128 may be horizontally-scaled and the mapping of a pair of hub devices to a branch site 152 may be dynamically changed by a multi-tenant controller 122. This change may be fully automated depending on dynamically increasing or decreasing number of branch sites 152 and/or based on the dynamic addition or reduction of capacity in terms of hub devices in the data center 128.

According to the methods and systems of the present invention described herein, a horizontal scaling solution may be used to reduce or eliminate the network scaling problem. In embodiments, each device used at the data center 128 (the "hub device") may handle a certain network traffic load coming from remote offices/branches. Hub devices may be clustered together and the data load may be balanced/distributed across the elements of the cluster through the multi-tenant controller 122. In this network architecture a stateless hub device is enabled, and if one hub device fails, another hub device is able to take over without requiring any state exchange between the devices. Any hub device designated by the controller may be able to serve the traffic load needs of the remote offices/branches 152 network up to the hub device's load limits. The multi-tenant controller 122 may compute and estimate the load from devices at each of a network's remote offices or branches 152 that send traffic to a hub device cluster. In embodiments, the multi-tenant controller 122 can assign hub devices to serve the load coming from remote offices/branches 152, and dynamically add or delete hub devices from the cluster. A network employing a multi-tenant controller 122, as described herein, may include one or more of remote offices or branches 152 that have one or two branch devices 152 each. The network may also have one or more data centers 128 that have one or more hub devices in a cluster, and a multi-tenant controller 122 either in the data center 128 or in the cloud that controls and orchestrates the network.

Figure 11:
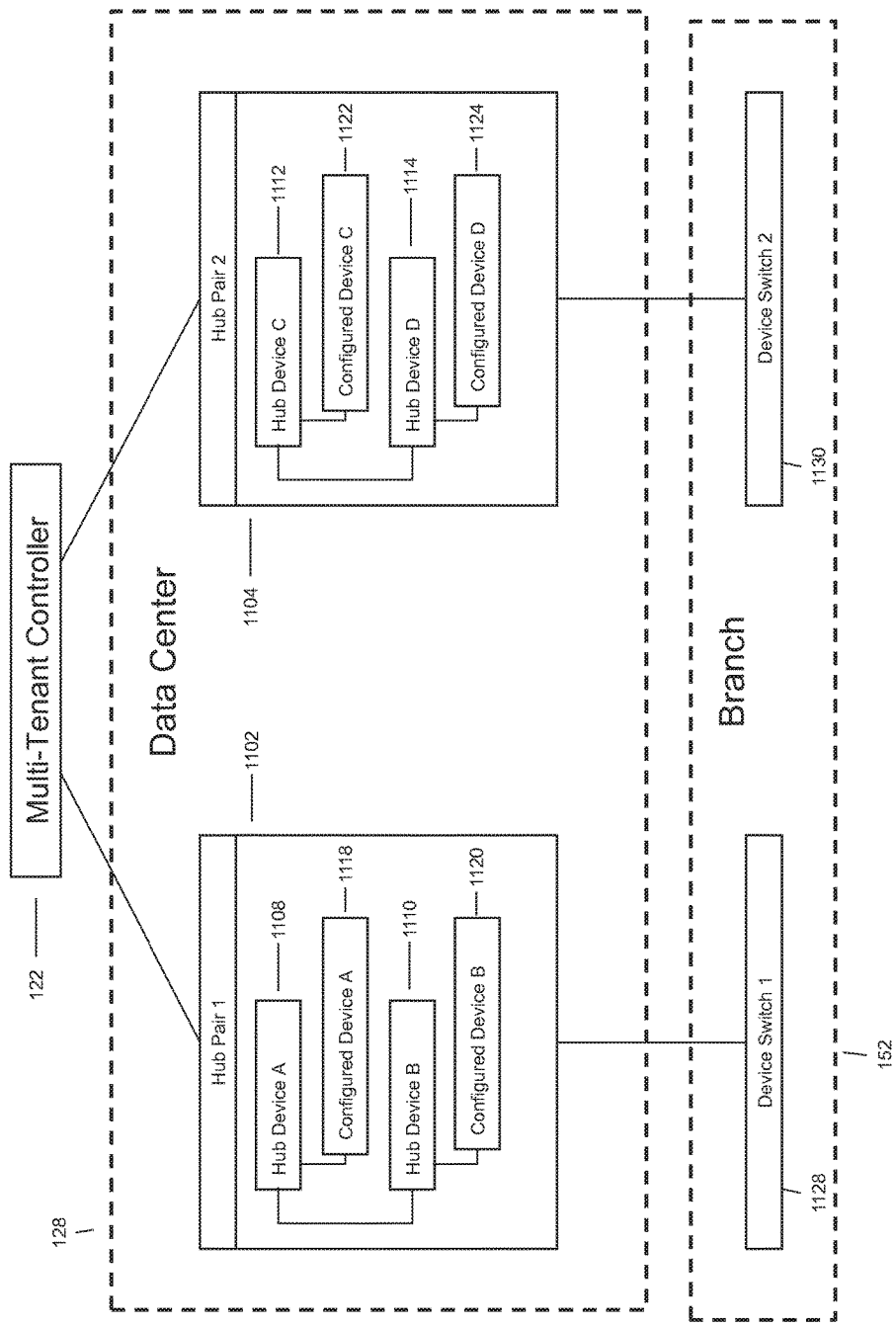
FIG. 11 illustrates a simplified embodiment for using hub pairs and configurable devices to create network scaling and redundancy.

Referring to FIG. 11, when a new remote office is created and branch devices 152 are added to the network by configuring them at the multi-tenant controller 122, the multi-tenant controller 122 may run an "assignment algorithm" and assign the remote office devices to two specific hub devices at every data center 128. The algorithm may consider in its derivation of load and assignment if a remote office device was ever used in monitor mode. Monitor mode refers to a special mode for a branch device 152 where the device is able to see all flows moving in and out of the branch 152 but doesn't alter anything on the flows. Data transfer statistics information collected from the branch 152 may be used as an input to estimate traffic load. Internet link bandwidth estimation conducted on each branch device 152 may be used as input to estimate traffic load. The algorithm may further consider the current known capacity limits of each hub device the current allocated branches 152 to each hub device in the cluster and the sum of their estimated load on the hub device, the current allocated branches 152 to each hub device in the cluster and the actual load on the hub device, the availability of total capacity of the hub cluster, the network reachability of the new branch 152 to the all the elements of the hub cluster, or some other factor.

In embodiments, the branch devices 152 may establish Secure IPSec/VPN Tunnels to each of its assigned hub devices at the data center 128. A branch device 152 may choose one of the hub devices at the data center 128 (of the two that were allocated to the device) as the primary. If the Secure IPSec/VPN Tunnel to the primary hub device fails, the branch device 152 may switch its traffic destined towards the data center 128 to the secondary hub device at that data center 128. In an embodiment, the branch device 152 may perform a seamless transfer from a primary hub device to a secondary hub device in the following manner: In the IPSec/VPN control plane communication, a branch device 152 may issue, as an example, a "START" command to the secondary hub device. The secondary hub device may acknowledge the START command and update the local routing information at the data center 128. On receiving the acknowledgement, the branch device 152 may start sending the traffic to the secondary hub device on its IPSec/VPN tunnels. The branch device 152 may stop sending traffic over the IPSec/VPN tunnels to the primary hub device and attempt to send a "STOP" command to the primary hub device. The primary hub device, if alive, may stop advertising routes at the data center 128 for the branch 152 on one or more of the following i) on receiving the "STOP" command, ii) after a certain time of non-receipt of any traffic from a branch 152, and/or iii) if bidirectional forwarding detection (BFD) detects loss of communication to the branch 152. If the primary hub is not alive, routes advertised by the primary hub device may be automatically aged out at the data center 128.

Since a hub device's handling of traffic from a branch device 152 is decided by the branch device 152 and its view of the IPSec/VPN Tunnel states to the hub device, there is no need for hub devices to keep any state and exchange states between them. As capacity needs on the hub cluster increase (e.g., due to more and more branches 152 coming online), new hub devices may be introduced to the cluster and the multi-tenant controller 122 may start using them for the new branches 152. If a hub device is permanently removed from the cluster (e.g., due to permanent failure), the multi-tenant controller 122 may allocate a new or replacement hub device to the affected branch devices 152 that were previously using the failed hub device. If the load generated by a branch device 152 starts increasing and is no longer safely within the parameters originally used (e.g., in the "assignment algorithm") for allocating the branch 152 to a specific pair of hub devices in the cluster, the multi-tenant controller 122 may re-allocate a new pair of hub devices that can handle the revised load from the branch 152. In such re-assignments, the controller may i) allocate a new pair of hub devices, ii) update the branch device 152 of a new secondary hub device (while keeping the current active hub device unchanged; hub devices may be connected in a series), iii) force the branch device 152 to "failover" or "switchover" to the new secondary hub device that has more capacity, and iv) update the branch device 152 of a new primary hub device. The result may be to successfully move the branch 152 from an older pair of hub devices to new pair of hub devices that can handle higher loads.

In accordance with exemplary and non-limiting embodiments, methods and systems for hub high availability and network load and scaling may utilize various hub device types and spoke devices as described herein and may be enabled, at least in part, by one or more data center 128 types as described herein.

The following are illustrative clauses demonstrating non-limiting embodiments of the inventions described herein:

A method comprising:
receiving at a branch device an assigned first hub device and an assigned second hub device associated with a data center;
establishing a VPN data tunnel to the assigned first and second hub devices;
designating the first hub device as a primary device;
designating the second hub device as a secondary device; and
switching traffic destined for the primary device to the secondary device based, at least in part, on a cost of a link.

A method comprising:
receiving at a branch device an assigned first hub device and an assigned second hub device associated with a data center;
establishing a VPN data tunnel to the assigned first and second hub devices;
designating the first hub device as a primary device;
designating the second hub device as a secondary device;
switching traffic destined for the primary device to the secondary device if a failure of the VPN data tunnel to the primary device is detected; and
switching traffic to the primary device and the secondary device in a revertive mode and non-revertive mode.

A networked branch device configured to:
receive at a branch device an assigned first hub device and an assigned second hub device associated with a data center;
establish a VPN data tunnel to the assigned first and second hub devices;
designate the first hub device as a primary device;
designate the second hub device as a secondary device; and
switch traffic destined for the primary device to the secondary device if a failure of the VPN data tunnel to the primary device is detected.

Any of the clauses above further comprising switching traffic destined for the primary device to the secondary device based, at least in part, on a cost of a link.

Any of the clauses above wherein the first hub device and second hub device are assigned via an algorithm based, at least in part, on:
data transfer statistics information collected from the branch device used as an input to estimate traffic load.
internet link bandwidth estimation performed at the branch device used as input to estimate traffic load.
the current known capacity limits of each hub device.
the current allocated branch devices to each hub device in a cluster and the sum of their estimated load on the hub device.
the current allocated branch devices to each hub device in a cluster and the actual load on the hub device.
availability of total capacity of a hub cluster.
network reachability of the new branch device to the all the elements of the hub cluster.
ability to use all branch circuits when communicating with hub device.
ability to use lower cost circuits when communicating with hub device.

Any of the clauses above wherein configurable devices comprise spoke devices.

Any of the clauses above wherein a data center type is selected from the group consisting of private cloud, scientific communities and co-location centers.

In traditional branch routing architectures, typically multiple branch routers 162 are deployed in parallel to provide high availability towards both LAN and WAN side. On the WAN side, private WAN links or internet links are distributed on the multiple branch routers. On the LAN side, the switches 158 are connected to the multiple branch routers 162 involving complex cabling schemes. On top of the complex cabling, various L2 (HSRP/VRRP) and L3 (OSPF/EIGRP) protocols are used to realize high availability with the parallel deployment. Further, complex traffic flows also happen where the packets first go to one of the routers, and then get routed back on the LAN side to another router, which is both inefficient and hard to troubleshoot when problems happen.

In accordance with various exemplary and non-limiting embodiments, there is disclosed a branch routing architecture in which configurable devices 124 are serially-placed in order to enable the bypass of data flows around a failed device to maintain access to all the available WAN circuits that terminate at a branch 152 of interest.

Figure 12:
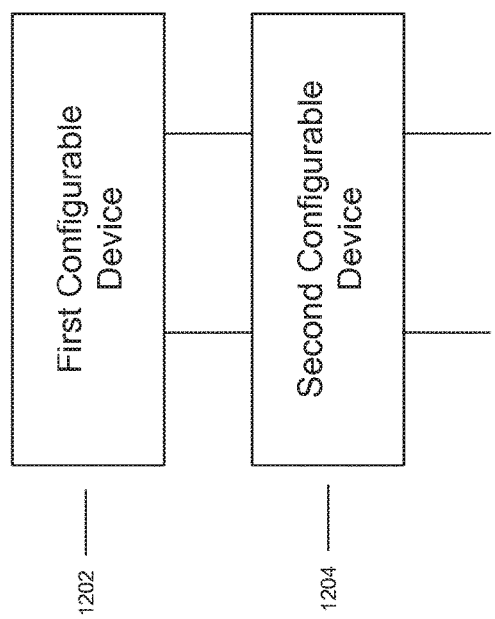
FIG. 12 illustrates a simplified embodiment of a configurable device pairing.

As illustrated with reference to FIG. 12, two or more devices 124 are deployed in series. Both switches connect to a single configurable device 1202 which connects to a second configurable device 1204 in series. Private WAN and internet circuits terminate on the second configurable device 1204. As a result, cabling and L2/L3 topologies remain the same and simple whether there are one configurable device 124 or two. This allows the customers to switch between one (simple topologies) or two configurable devices 124 (highly available topologies) with out making any change to the switch 158 or to the WAN connectivity, while at the same time being able to use the capacity on all the available WAN links. As illustrated, deploying two configurable devices 1202, 1204 in series protects against a failure of a single configurable device 124 at a branch 152 and provides high availability.

In accordance with various exemplary and non-limiting embodiments, configurable devices 124 deployed in series communicate with each other using a redundancy protocol to exchange state information comprising (1) who is active and who is in a standby mode of operation and (2) characteristics of various paths sent by active an active configurable device 124 to a standby configurable device 124 using a redundancy protocol. This protocol is automatically employed by the configurable devices 124 with out any action needed from the customers.

When an active configurable device fails, the standby configurable device may recognize the failure via one or more protocol keepalives and switch to an active state. A keepalive (KA) is a message sent by one device to another device to check that the link between the two is operating.

When the configurable device 124 fails or becomes inactive, the configurable device 124 automatically short circuits (called 'bypass') the interface connections such that the other (active) configurable device 124 has direct physical connection 148 to the circuits. In accordance with exemplary embodiments, when both devices are operating in a healthy manner, they may self select which one will be active (based on an algorithm, e.g., lower serial number or controller given initial directive). If the self selected active device now has a failure and goes into bypass mode, then the backup device will become the new active device as it will detect loss of heartbeat.

As a result, the current active configurable device may directly handle the private WAN and Internet connections without any routing protocols and other complexities. Further, in accordance with the state syncing described above, the standby configurable device is already primed to become active and therefore is able to continue traffic forwarding functions within a short amount of time. Note that, unlike traditional networks, the links are available to both configurable devices 124. With the hardware 'bypass' feature described above, the configurable device 124 that became active after the failure of the other can direct access to all the circuits.

In accordance with various exemplary embodiments, the described bypass functionality may be implemented in either software or hardware or a combination thereof.

In accordance with various exemplary embodiments, both the active and standby configurable devices 124 may exhibit physical connectivity 148 as described elsewhere herein. Further, such methods and systems as described herein may be applied to various branch types as described herein as well as various branch components 152 including, for example, switches and routers 162. The configurable devices 124 may further comprise spoke devices as described herein. The methods and systems described herein may further employ various switch types as described herein.

The following are illustrative clauses demonstrating non-limiting embodiments of the inventions described herein:

A method comprising:
deploying in series a plurality of configurable devices configured to communicate with one another via a protocol for exchanging state information wherein at least one of the plurality of configurable devices is in an active state and at least one of the plurality of devices is in a standby state;
detecting, by the at least one of the plurality of configurable devices in a standby state, a failure of a configurable device in an active state via a protocol; and
switching the at least one configurable device in a standby state to an active state.

A system comprising:
a plurality of configurable devices deployed in series and configured to communicate with one another via a protocol for exchanging state information wherein at least one of the plurality of configurable devices is in an active state and at least one of the plurality of devices is in a standby state;
wherein the at least one of the plurality of configurable devices in a standby state is adapted to detect a failure of a configurable device in an active state via a protocol and in response thereto switch the at least one configurable device in a standby state to an active state.

A method comprising:
deploying in series a plurality of configurable devices configured to communicate with one another via a protocol for exchanging state information wherein at least one of the plurality of configurable devices is self-selected to be in an active state and at least one of the plurality of devices is in a standby state;
detecting, by the at least one of the plurality of configurable devices in a standby state, a failure of a configurable device in an active state via a protocol; and
switching the at least one configurable device in a standby state to an active state.

Any of the clauses above wherein connectivity is physical

Any of the clauses above wherein branch components are selected from the group consisting of switches and routers.

Any of the clauses above wherein configurable devices comprise spoke devices.

Any of the clauses above wherein switch types are selected from the group consisting of managed switch, unmanaged switch and stackable switch.

Internet Protocol Security (IPSEC) is a protocol suite for securing Internet Protocol (IP) communications by authenticating and encrypting each IP packet of a communication session. Enterprise Site to Site IPSEC Virtual Private Network (VPN) over Wide Area Networks (WAN) uses a suite of encapsulation, data encryption and data authentication for data path tunnels (e.g. encapsulating security payload (ESP) and Authentication Header (AH)) and a separate control channel protocol such as, for example, internet key exchange (IKE) and IKEv2 for the derivation of key exchange and for decisions related to what traffic to encrypt between the two gateways in each site.

Existing control methods typically bring in significant complexity for Information Technology (IT) with regards to the management of and the configuration for key exchange. For example, for a set of N sites there can be potentially on the order of $N^2$ IPSEC tunnels between the N number of sites. In order to provide for the strongest levels of security, IT generally is required to manually configure rules for key generation on a per peer basis, which substantially increases configuration overhead. In instances where N is in the thousands, as when a networked environment comprises thousands of nodes, this may become a prohibitive task. As a result, IT typically will not deploy full mesh networks even though such is required to enable branch-to-branch communication.

For the strongest level of security, each gateway at each site has N−1 tunnels to each peer site and is required to perform extremely CPU intensive and expensive key exchange computations so that both gateways can derive a common shared secret, which is then used to derive cryptographic session keys to secure the tunnel. In order to maintain perfect forward secrecy, this key exchange is typically repeated periodically for each tunnel resulting in thousands of key exchange operations. In several scenarios, multiple tunnels are needed between the same pair of sites (e.g. VPN transport high availability, e.g. multiple WAN and Internet circuits, e.g. secure segmentation on the WAN using Virtual Wan (VxWAN)) 204.

In such instances, the number of key exchanges may be increased by a factor of 2 to 10 times. However, using software only methods, the number of such key exchange operations is limited and may not be able to meet the required scale. The results often times in limited mesh configurations wherein IT cannot build fully meshed networks with thousands to tens of thousands tunnels per site. Even the utilization of existing hardware based solutions may be unable to scale to the number of tunnels that are needed for full mesh and for full meshes per VxWAN based WAN segment.

Existing methods such as GROUP VPN offer scalable implementations that address some of these concerns but compromise security as they use the same session keys for communication between all devices across all encrypted data channels. In such instances, even a single compromise may expose the entire network.

In accordance with exemplary and non-limiting embodiments, there is provided a method to replace traditional key exchange for Internet Protocol Security (IPSEC) data encryption by using a multi-tenant controller 122 to create multiple time-limited shared secrets, where the multi-tenant controller 122 generates the shared secrets for each IPSEC encrypted channel and sends them over a bi-directional certificate authenticated channel to the two IPSEC data channel end points. The end points then use the shared secret and nonces to derive session keys. The shared secret and session key may be refreshed at an interval specified by a policy. The multiple shared secret mechanism ensures that even when faced with loss of communication with the multi-tenant controller 122 the IPSEC end points can continue to refresh the time limited shared secrets and ensure perfect forward secrecy.

In accordance with exemplary and non-limiting embodiments, there is disclosed a multi-tenant controller 122 driven key exchange model that is a highly scalable and a granular Kerberos-like model for per pair scalable key generation and distribution over unsecure networks. Such a model provides a zero configuration model for key exchange requiring little or no manual configuration by IT. In addition, there is provided a multi-tenant controller 122 generated separate shared secret per tunnel whereby granularity may be increased up to and including a separate shared secret for each encrypted VXWAN segment. There is further provided the ability to horizontally scale in order to generate hundreds of millions of shared secrets needed for fully meshed branch networks. In addition, embodiments disclose a software only solution that does not require the use of custom hardware to achieve necessary scale.

Further, there is provided a solution that utilizes several sources of entropy for random number generation, which increases the strength of the shared secret key material generated by the multi-tenant controller 122. Methods for random number generation may be selected and employed based, at least in part, on available processing power. As described more fully below, such a solution utilizes a shared secret from the multi-tenant controller 122 along with random information from each communicating element for a given data tunnel to generate session keys for encryption and authentication of the data tunnel.

Figure 13:
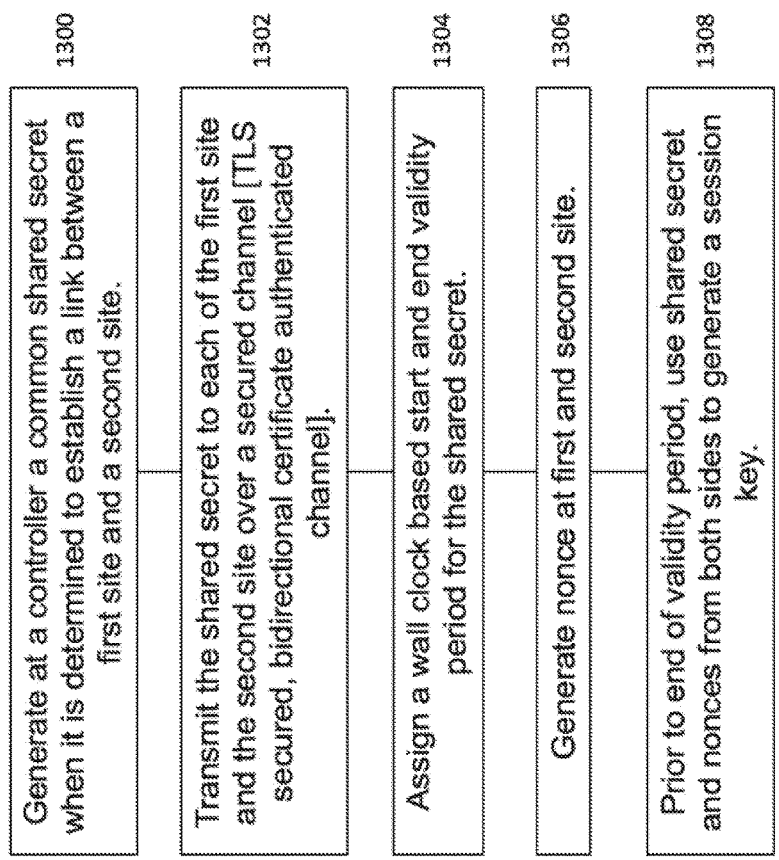
FIG. 13 illustrates a simplified embodiment of a method for utilizing a shared secret to generate an application session key.

With regard to FIG. 13, there is illustrated a flowchart according to an exemplary and non-limiting embodiment. First, at step 1300, when the multi-tenant controller 122 makes a determination that a link should be established between two sites, the multi-tenant controller 122 generates a common shared secret using following algorithm. First, the multi-tenant controller 122 generates X bits using, for example, a National Institute of Standards and Technology (NIST) approved cryptographically secure pseudo-random number generator (PRNG). The value of X may vary depending on the type of NIST PRNG that is used. The random number generator may be seeded with a high level of entropy using one or more of following mechanisms, (1) using operating system /dev/random, which relies on several entropy pools, (2) using FIPS approved Intel RDRAND instructions and (3) by harvesting element generated random numbers.

In accordance with various exemplary embodiments, continuous invocations of the PRNG are used to derive multiples of X bits which are concatenated to generate a shared secret from 512 to 8192 bits in length.

Next, at step 1302, the multi-tenant controller 122 sends the shared secret to each of the elements, such as, for example, IPSEC data channel end points, over a transport layer 112 security (TLS) secured (with data encryption and data authentication), bi-directional certificate authenticated channel that it has with each channel end points.

Next, at step 1304, for each shared secret, the multi-tenant controller 122 assigns a wall clock based start and end validity period. The multi-tenant controller 122 generates multiple (N) shared secrets at the same time and assigns to each of them consecutive wall lock validity periods. The multi-tenant controller 122 sends these N shared secrets at the same time to the channel end points.

Next, at step 1306, each channel end point may then generate 32-bytes of "nonce" comprising additional random data. The channel end points may exchange these nonce values and may then use, for example, a RFC 5996 specified key material generation method to generate four session keys per channel in order to (1) encrypt data to send to other element, (2) authenticate and attach a cryptographically secure message digest for data send to other channel end points, (3) decrypt data received from other channel end points and (4) validate that the message digest attached in the received data is correct.

In accordance with various embodiments, the channel end points encrypt data using ciphers that are specified by the multi-tenant controller 122. At a regular interval determined by the multi-tenant controller 122 the channel end points refresh the four session keys in a rekey operation using the given shared secret using the four steps described above.

Next, at step 1308, prior to expiration of the shared secret validity period, the channel end points may use the next shared secret (from the set of N shared secrets sent by the multi-tenant controller 122) and follow the four steps described above to generate a new session key. Even if the multi-tenant controller 122 is not reachable for the entire duration of the N shared secrets validity period, the freshness of the shared secret is maintained. Once a single shared secret has expired, the channel end points continuously receive new shared secrets from the multi-tenant controller 122 and the multi-tenant controller 122 issues up N total fresh secrets to the two channel end points.

In accordance with the preceding exemplary embodiments, perfect forward secrecy may be achieved by making the rekey interval the same as the shared secret validity period. Doing so helps to ensure that a fresh shared-secret is used in each rekey. In various embodiments, stored shared secrets are sufficient to ensure network operation for a default period of time without refresh of new ones from the controller 122. A typical default period of such a time is, for example, three days. In exemplary embodiments, customers or users 168 of the network may set the default time period. In accordance with one exemplary embodiment, session keys may be rotated to configurable devices 124, such as channel end points, on an hourly basis using the same shared secret but new nonces for added security.

In accordance with an exemplary embodiment, the multi-tenant controller 122 may operate as a certificate authority. When a configurable device 124 is manufactured, it may connect to the multi-tenant controller 122 for issuance of a manufacturing certificate. The configurable devices 124 may use this certificate for a bidirectional authenticated TLS channel for secure communication with the multi-tenant controller 122. When a configurable device 124 is shipped to a customer and the customer manually authorizes the configurable device 124, an additional claim certificate may be installed by the multi-tenant controller 122 on the configurable device 124. Post authorization, the configurable device 124 may use this certificate for bidirectionally authenticated TLS based communication with the multi-tenant controller 122. The shared secrets may be sent securely over this channel from the multi-tenant controller 122 to the two channel end points.

In accordance with various embodiments, encryption algorithms may be changed or updated at the multi-tenant controller 122 without impacting the end points. In addition, the multi-tenant controller 122 may revoke a device's certificate and tell other configurable devices 124 and entities not to trust it.

In accordance with various exemplary embodiments, the generation of shared secrets need not be either entirely software or hardware based. Rather, a hybrid software/hardware process may perform the generation of shared secrets.

The following are illustrative clauses demonstrating non-limiting embodiments of the inventions described herein:

A method comprising:
generating at a multi-tenant controller a common shared secret for establishing a link between a first site and a second site;
transmitting the shared secret to each of the first site and the second site over a secured channel;
assigning a wall clock based start and end validity period for the shared secret;
sending the shared secret with a future validity to allow secure link communication to continue if one or more elements in both sites cannot communicate with the multi-tenant controller; and
using a separate shared secret per link per VXWAN A method comprising:
receiving at a first channel end point a shared secret;
generating a plurality of nonce values;
exchanging the nonce values with a second channel end point;
generating a plurality of session keys; and
refreshing the plurality of session keys at a predetermined time interval using the shared secret.

A system comprising:
a first site;
a second site in communication with the first site via a network; and
a multi-tenant controller configured to generate a common shared secret for establishing a link between the first site and the second site and to transmit the shared secret to each of the first site and the second site over a secured channel wherein the multi-tenant controller is configured to assign a wall clock based start and end validity period for the shared secret.

Any of the clauses above wherein shared secret generation is performed by software, hardware and/or a software and hardware hybrid.

In accordance with exemplary and non-limiting embodiments, there is provided a method by which the WAN may adjust to yield to the needs of applications in order to provide an optimal or near optimal experience to the users 168. Such optimization may be based at least in part on a policy. A policy may be based at least in part on an application operating on the network, such as a policy relating to the handling of data flows to ensure proper functioning of the application, the routing of application flows on the most suitable link present at a branch office 152, or some other criteria. Once an application flow is placed on an appropriate link, sufficient network resources may be guaranteed in accordance to a policy specification for the application flow.

A policy string 202 may allow a specific application or identity to be specified that provides control over data flows occurring over the network. Control may be per-application, per-identity, a combination of application and identity, or based on some other parameter. In an embodiment, as part of a policy string 202, a virtual extensible WAN (VXWAN) 204 may be specified that causes a device to encapsulate a specific set of flows identified by that policy in a unique VXWAN 204. A VXWAN 204 may comprise an identifier or label that may be put on the wire as data/packets belonging to the flows captured by the policy are forwarded between devices. A VXWAN 204 may comprise an optional unique encryption afforded only to packets belonging to the flows captured by the policy. A VXWAN 204 may comprise a way to insert a VXWAN label at an entry point in the network and remove the label at the exit in the network for the flow in a specific direction. A VXWAN 204 may be bidirectional in that the same VXWAN label can be used for both directions of the traffic. A VXWAN name space may be global and allocated and managed by a multi-tenant controller 122, as described herein.

In an example, configurable spoke devices may perform traffic forwarding decisions, and be provided information, including but not limited to: application identification details and/or application traffic profiles. Configurable devices 124, as described herein, may maintain path characterization information. Path characterization may include information on bandwidth availability on a link, latency profiles, traffic volume caps on a link and the like. The configurable device 124 may then choose a link meeting all the constraints that is most optimal or most nearly optimal for an application at that time instant. Rating of the links may be by the lowest network latency, or considering application level transaction latencies, or some other criterion.

According to the methods and systems of the present invention described herein, a multi-tenant controller 122 may maintain a network topology at least in the form of a network topology database in which the entry and exit points for each device in a network are maintained. A multi-tenant controller 122 may also receive data from configurable devices 124 indicating which domains are associated with an anchor domain, and assign these domains to a SaaS application 604 so that a fuller set of entry points to the SaaS application 604 are known and stored by the multi-tenant controller 122. A configured device may collect monitoring data, such as information relating to data flows that are associated with an application and/or domain that is associated with an application, such as an application in use at a network branch 152. Such data flow records may carry important information relating to the entry and exit points on a device. Millions of these data flow records may be exported from devices throughout the network to the multi-tenant controller 122. The multi-tenant controller 122 may store information, including, but not limited to, a network topology database that includes information on the entry and exit points of data flows occurring on each network device and how the data flows are interconnected, data flow records on a single data flow from multiple devices in the network, and anchor domains and other domains as described herein that are associated with the usage of an application on the network.

In embodiments, the multi-tenant controller 122 may use the stored network topology 508, domain and related data flow information to periodically run an "asymmetric detection" algorithm 504 that in essence identifies the existence of a plurality of data flows that exited a device through one path and return data flows that re-entered the device on a different path (i.e., asymmetry). Analytic techniques may also be used to characterize Layer 4 data flows that are associated with application usage. Configured spoke devices may collect and send to the multi-tenant controller 122 such Layer 4 level data flow. Data flow asymmetries that are associated with specific applications and/or anchor domains or other domains that are associated with an application may be detected and corrected, as described herein. This correction may be made on demand, and outside of the multi-tenant controller 122. The change may be reported, for example by a spoke device, to the multi-tenant controller 122. The multi-tenant controller 122 may identify asymmetric flows associated with application usage on the network, and see which data center 128 devices participated in the transmission of the flow and reports this. The multi-tenant controller 122 may identify the IP address ranges on which this asymmetry is happening, aggregate them and report them to a user 168 or administrator, so that the IP prefix configuration may be corrected on the sites. To prevent false positives, the algorithm may use additional weighting factors including other devices and different applications and their data flows, before declaring existence of asymmetry in the network. The multi-tenant controller 122 may read data flow tables in order to allow the multi-tenant controller 122 to determine how the data traffic egresses (e.g., data deriving from an anchor domain or other domain). The asymmetry may be detected, and the multi-tenant controller 122 may then notify configured devices and the configured devices may take routing actions to ameliorate the data flow asymmetry for a given application's usage.

In accordance with exemplary and non-limiting embodiments, a multi-tenant controller 122 may be used to centrally view and control the network topology, configurable devices 124 in the topology and the application of policies to solve the operational needs of network administration. A multi-tenant controller 122 may record data indicative of where all devices and applications are located, and identify and map the topology of a network and use the network view to determine optimal policy and device usage of network assets. The multi-tenant controller 122 may, for example, monitor and record when a new site is added, the changes to the network topology may then be updated. Because the multi-tenant controller 122 has access to the HTTP flow, the multi-tenant controller 122 may be queried to, for example, show all paths between sites and simulate network function. The multi-tenant controller 122 may have access to bandwidth and links in its topology graph of the network. Utilization of each link can also be gathered and stored for access by the multi-tenant controller 122. The multi-tenant controller 122 may simulate the effects of changes to a network. The multi-tenant controller 122 may keep track of all configurations (devices, interfaces, capacities, policies and more) for all the devices in the network. Configuration management may be in real or near-real time to ensure minimal data latency. The multi-tenant controller 122 may also keep large amounts of monitoring data on traffic types, traffic load and application statistics, and may also allow for the creation of 'empty' or hypothetical sites, specifically, ones that are not real but are, for example, being planned.

A multi-tenant controller 122 may be utilized to algorithmically determine and establish a loop-free data-forwarding model that may include the creation and management of forwarding tables 812. This algorithm may account for network failures and adjust the loop-free data-forwarding model to account for asset loss within the network. A multi-tenant controller 122 may maintain a network topology at least in the form of a network topology database in which the entry and exit points for each device in a network are maintained, and periodically running an algorithm using this network data to determine asymmetric data flows and the devices associated with such asymmetric data flows. As described herein, a centrally configured multi-tenant controller 122 may be both the creator and the source of (1) network segments and addresses and (2) information indicative of how the network segments are connected. The central multi-tenant controller 122 may then discover what external network segments are not controlled by the routing instance via a data center 128 or hub device and directly set up forwarding tables 812 on configured devices so that traffic is forwarded on to the correct interface, resulting in a loop-free forwarding model wherein various rules are enforced.

In accordance with exemplary and non-limiting embodiments, a configured device may further collect monitoring data, such as information relating to data flows transmitting through a device. Such data flow records may carry important information relating to the entry and exit points on a device. The multi-tenant controller 122 may store information, including, but not limited to, a network topology database that includes information on the entry and exit points of data flows occurring on each network device and how the data flows are interconnected, and data flow records on a single data flow from multiple devices in the network. The multi-tenant controller 122 may identify asymmetric flows, including asymmetric flows that are associated with an application or anchor domain, as described herein, and see which data center devices participated in the transmission of the flow, and deduce that the flow is incorrectly going to, for example a hub device, and report this. The multi-tenant controller 122 may identify the IP address ranges on which this asymmetry is happening, aggregate them and report to them to a user 168 or administrator, so that the IP prefix configuration may be corrected on the sites.

According to the methods and systems of the present invention described herein, a multi-tenant controller 122 may receive data from configurable devices 124 indicating which domains are associated with an anchor domain, and assign these domains to a SaaS application 604 so that a fuller set of entry points to the SaaS application 604 are known and stored by the multi-tenant controller 122. This may have advantages in measuring, monitoring and routing the true data flows associated with a SaaS application 604, whereas traditional techniques may underestimate the traffic associated with a SaaS application 604 by not recognizing the full set of domains that are actually generating traffic in association with an application. Domain types may include, but are not limited to, top-level domains 608 (e.g., ".com"), geographic domains (e.g., country domains), and infrastructure domains (e.g., ".arpa"). The domains identified to be associated with the anchor domain may be sent to the multi-tenant controller 122, and at the multi-tenant controller 122, further processing may be performed to eliminate the false positives and distill them to a corrected set of domains. A configurable device 124 within the network may detect an application's anchor domain and mark the source of the data and the time of detection. Following this time of detection, ongoing data flows from the same traffic source may be marked as belonging to the application that is associated with the anchor domain. The multi-tenant controller 122 may continue to receive data regarding the traffic source from the configurable devices 124 and classify the data flows.

In accordance with exemplary and non-limiting embodiments, anchor domain and other domain data may be analyzed using statistical and data mining techniques, as described herein, for the characterization of application usage, by session, for performance and predictive planning purposes to improve network performance. Data mining techniques like centrality and classification may be applied to fine-tune models describing data flows deriving from an anchor domain and/or the usage of an application. The resulting models may be better able to predict the size and frequency of transactions for a typical application session, as well as the frequency of application sessions. The modeling and analytic methods used to characterize network activity associated with an anchor domain and/or an application session, and the corresponding network and bandwidth requirements, may be used to monitor a network in real time for bandwidth requirements at the sub-channel level (transactional and bulk application types) and identify and predict trends in bandwidth requirements. Based on anchor domain and application type detection, using real-time data flows, a multi-tenant controller 122 may analyze application session data that it receives from configurable devices 124 at the branch level to determine what amount of bandwidth is necessary for proper application performance. Application performance scores may be used to record and adjust the bandwidth profile for an application, where the profile states performance and bandwidth criteria needed (i.e., a rule) for the type(s) of data flows detected during application sessions.

In embodiments, a shaper 154, as described herein, may be used to limit data that is associated with, for example, a given anchor domain and/or application to a prescribed value. Shapers 154 may be added or deleted based on the level of business priority associated with the traffic, such as traffic that is associated with anchor domain and/or application session. This may be performed dynamically, for example, based on application demand, where the dynamic performance is carried out in compliance with a policy maintained at a multi-tenant controller 122. Performance-based routing may be accomplished by estimating link capacity automatically and dynamically, in real-time or near-real-time. Congestion control algorithms, as described herein, may be used for bandwidth estimation. For idle links the estimation may be performed in a manner that is similar to an Internet speed test. For active links, link capacity may be determined through continuous monitoring and correction. In an example, links may have an ingress and egress shaper 154, as described herein, that controls how much traffic can be put on the link or received from the link. Any traffic exceeding the shaper's 154 limits may be dropped. A shaper's 154 limit may be set by bandwidth estimation logic.

In embodiments, network traffic may be classified based at least in part on a business priority, and bandwidth allocation to a plurality of applications running on a network may be determined based at least in part on assigned business priorities. A network administrator may create multiple business priority classes and assign each a priority order and/or ranking A configured device may first detect the network type of each application data flow, for example, media, bulk or transactional, and create multiple queues for each business priority, for example strict priority 814, fair 818 and anomaly 820, as described herein. A shaper 154 may be used in front of the anomaly queues to ensure that the anomaly flows do not impact bandwidth available for other flows.

A multi-tenant controller 122 may be used for automated prefix discovery and propagation. A typical network may be made of many network segments, with each segment represented by a range of Internet Protocol (IP) addresses typically represented by a network address mask like so: 10.10.10.0/24 where the "/24" is the mask. This range may represent about 254 IP addresses. When such network segments are presented by a summarizing router device 162, these ranges may be aggregated to a higher "mask"—for example two segments 10.10.10.0/24 and 10.10.10.1/24 can be aggregated to 10.10.10.0/23. Sometimes a router device 162 will do this automatically by configuration. In embodiments, a multi-tenant controller 122 may gather network segment information and thus be able to programmatically find the most aggregated higher-level network address and mask. This process may be called supernetting and may be instrumental to scale in one disclosed non-limiting embodiment, and improve the automatic learning and control of the network.

For example, in case of data plane learning, once a flow arrives at configurable device 124, source IP information may be extracted from the packet header and sent to the multi-tenant controller 122 along with interface Virtual Local Area Network (VLAN) information on which the packet was received by the device. Data packets, however, may not carry subnet mask information. Therefore, a multi-tenant controller 122 may not be able to immediately identify exact length of the prefix if it receives information about a single or a handful of flows from clients 512 on branch local segments. In this case, the multi-tenant controller 122 may try to find the best-fit length of the prefix. For example: if the multi-tenant controller 122 receives information about two flows with source IP addresses, let's say 192.168.1.1 and 192.168.1.2 belonging to VLAN 10, it may generate a prefix 192.168.1.0/30 to start with and advertise to other sites. Over time, if it receives information about another packet with source address of, 192.168.1.29, for example, on the same segment; it may refine the prefix length to be 192.168.1.0/27.

Note that in data plane learning method, the configurable device 124 may choose to aggregate the source IPs and partly perform what the multi-tenant controller 122 does, to aid the multi-controller 122 in converging quickly.

The refinement process may continue until a multi-tenant controller 122 determines the exact length of the prefix as it learns information about rest of the prefixes. Note that there may be no traffic loss during the learning process. Also, if the local segment goes down and is detected by the device, it may notify the multi-tenant controller 122 so that routes may be withdrawn from all the remote sites. The process of what should be the minimum length of the prefix or how frequently the multi-tenant controller 122 should generate the prefix and the like may be user 168 configurable. Data plane learning may be referred to as slow learning as the multi-tenant controller 122 may have to wait until it has enough information to determine the exact prefix. Unlike data plane learning, device may learn the exact prefix length much faster if there are routing devices behind the configurable device 124, whereby exact prefix information may be extracted from the control plane traffic before sending the info to the multi-tenant controller 122. Automated learning of the network prefixes without routing protocols and complex configurations for zero touch deployment of devices may be advantageous. Automatic removal of prefixes and withdrawal of routes with those prefixes when local segment is down may be advantageous.

Configurable devices may be used for the automated routing protocol-less network prefixes discovery. In traditional networks, routing protocols may be used to exchange routing information between devices. Local networks, however, may be required to be manually configured via network statements or redistribution for each routing protocol so that prefixes can be advertised to other routing peers. Configurable devices 124 in the branch 152 may not run any routing protocols. Prefix discovery instead may be automated via data path learning at each branch site 152. Each branch device 152 may send the prefix information to a multi-tenant controller 122 which systematically may find the most aggregated higher level network address and mask via supernetting algorithm as mentioned in herein. A configurable device 124 may be configured to learn prefix information passively for the local network segments. A prefix may be learned via multiple ways such as Dynamic Host Configuration Protocol (DHCP), Address Resolution Protocol (ARP), snooping routing protocol traffic, actual data plane traffic and the like.

In traditional networks, typically routing protocols are used to exchange reachable prefixes between routing peer devices. Source of the reachable prefixes is either through manual configuration via network statements or through redistribution from one routing protocol to another.

For seamless deployment of configurable devices 124 in the data centers 128, a multi-tenant controller 122 may learn about the local data center prefixes automatically without requiring an administrator to manually configuring the prefixes and distribute those prefixes through out the network for use in traffic forwarding.

In the data center 128, configurable hub devices may border gateway protocol (BGP) peer with the WAN-E router 178 and may learn all the prefixes including local data center prefixes as well as remote branch routes learned via private WAN.

Configurable devices 124 may send all the prefixes learned from the private WAN to multi-tenant controller 122. A multi-tenant controller 122 may run a local algorithm to identify and separate the local prefixes from the remote.

BGP-learned prefixes carry AS-PATH information, which is an ordered list of ASes and tell the receiving BGP peer about the ASes a given prefix has traversed. The multi-tenant controller 122 knows the BGP AS numbers configured for a local configurable device 124 and the traditional router 178 within the data center 128 that it is peered with. In one embodiment, the multi-tenant controller 122 may identify the prefixes that contain the only the AS numbers present in the data center 128, and mark those as prefixes as local to the data center 128. Multi-tenant controller 122 may employ other methods like BGP Autonomous System (AS) filtering to further refine the identified local prefixes in the data center.

Note that, if routes are withdrawn or any changes are made, a local device may detect these withdrawn routes via BGP updates and update the multi-tenant controller 122 accordingly. Multi-tenant controller 122 may apply the algorithms on the updated information and adjust the local prefixes in the data center as necessary, allowing the network to correct and react to any changes automatically.

This may simplify the deployment of configurable device 124 in the data center and may save network administrators time to configure and remove prefixes any time any change is made within the data center 128.

Figure 14:
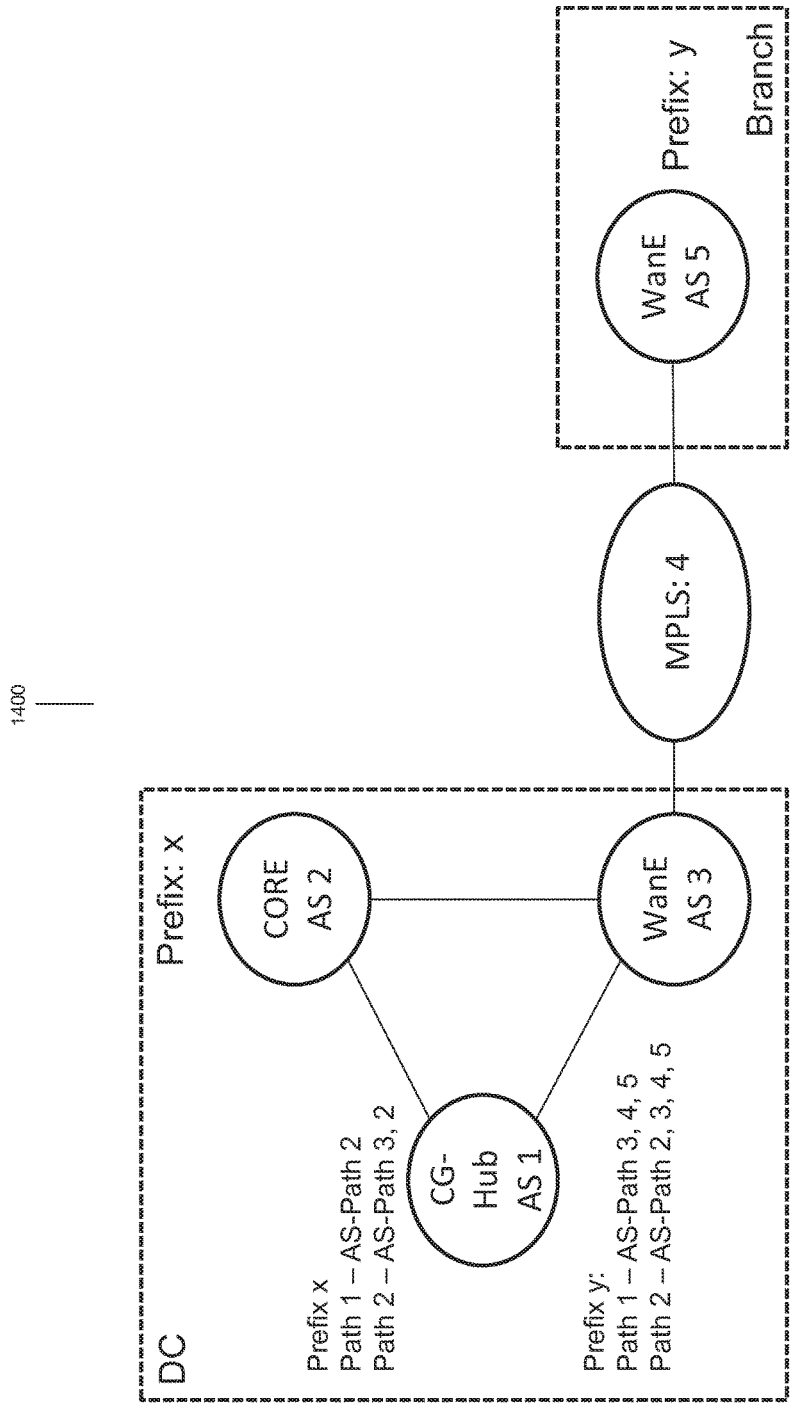
FIGS. 14 and 15 illustrate a simplified embodiment of the use of prefixes and associated automated learning.
Figure 15:
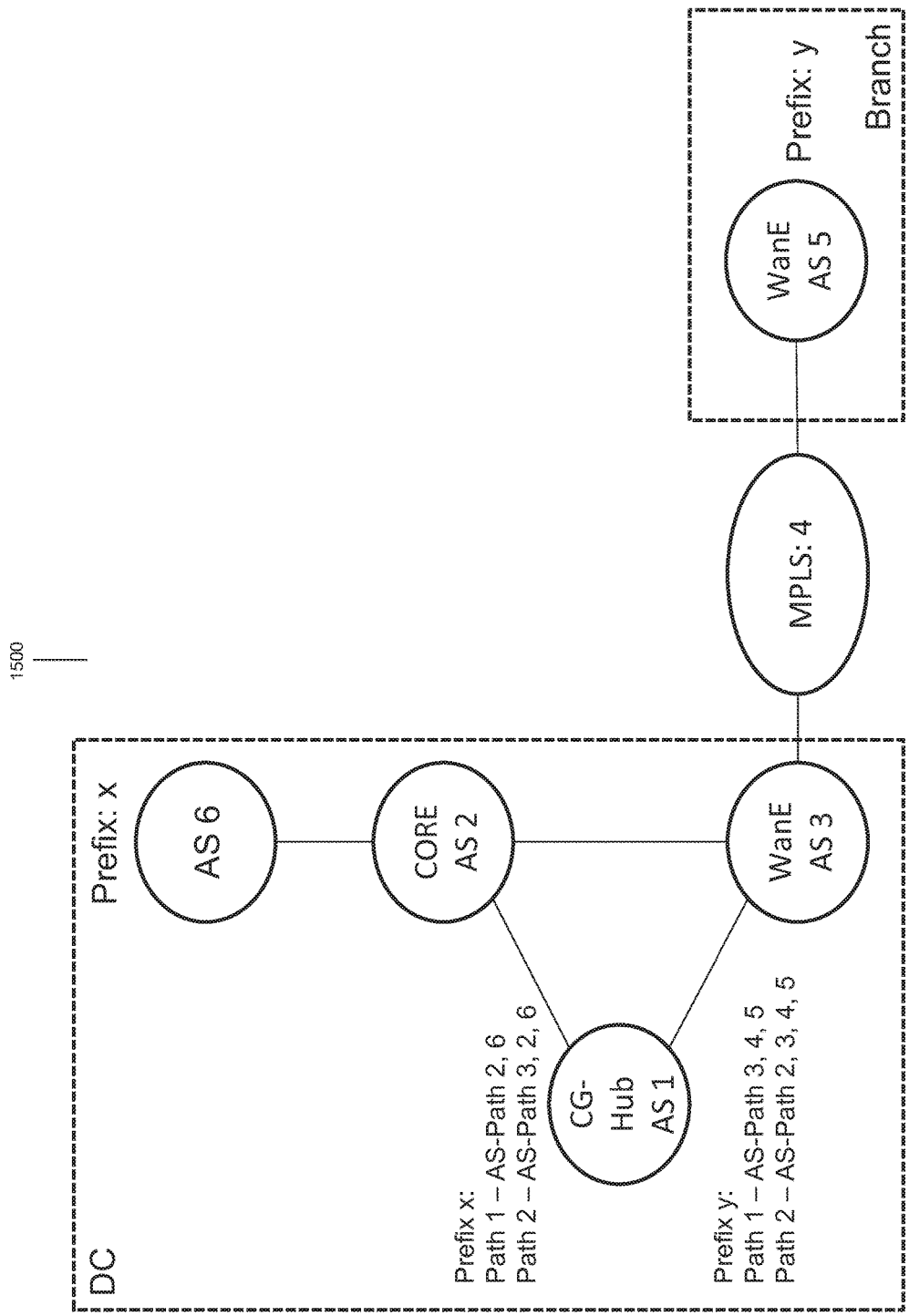

The following examples in FIGS. 14 and 15 illustrate how prefix x (local) and prefix y (remote) may be learned with AS-PATH information. Note that even when there are multiple ASes within data center 128, the order of AS numbers in the AS path list that hub device is peering with (AS 2 and AS 3 in the examples) may provide direction and may appropriately identify whether the prefix is local or remote. Automated learning and withdrawal of the network prefixes for zero touch deployment of devices in the data center 128 may be advantageous.

Multi-tenant controller 122-associated overlay networks may be integrated with legacy systems. Using private MPLS 144 WAN, enterprise network sites may be connected to the MPLS Service provider network in a point to cloud type of model. Using the L3VPN service provider terminology, a customer edge (CE) router 180 may be connected to a provider edge (PE) router 176. All the remote site routers 162 may access the applications located in the data center 128 via the CE device 180 in the data center 128. It may therefore be critical that there is no interruption to existing network especially the data center core 178 and the CE (aka WAN-E or WAN Edge) device 180 in the data center 128 for seamless integration.

Figure 16:
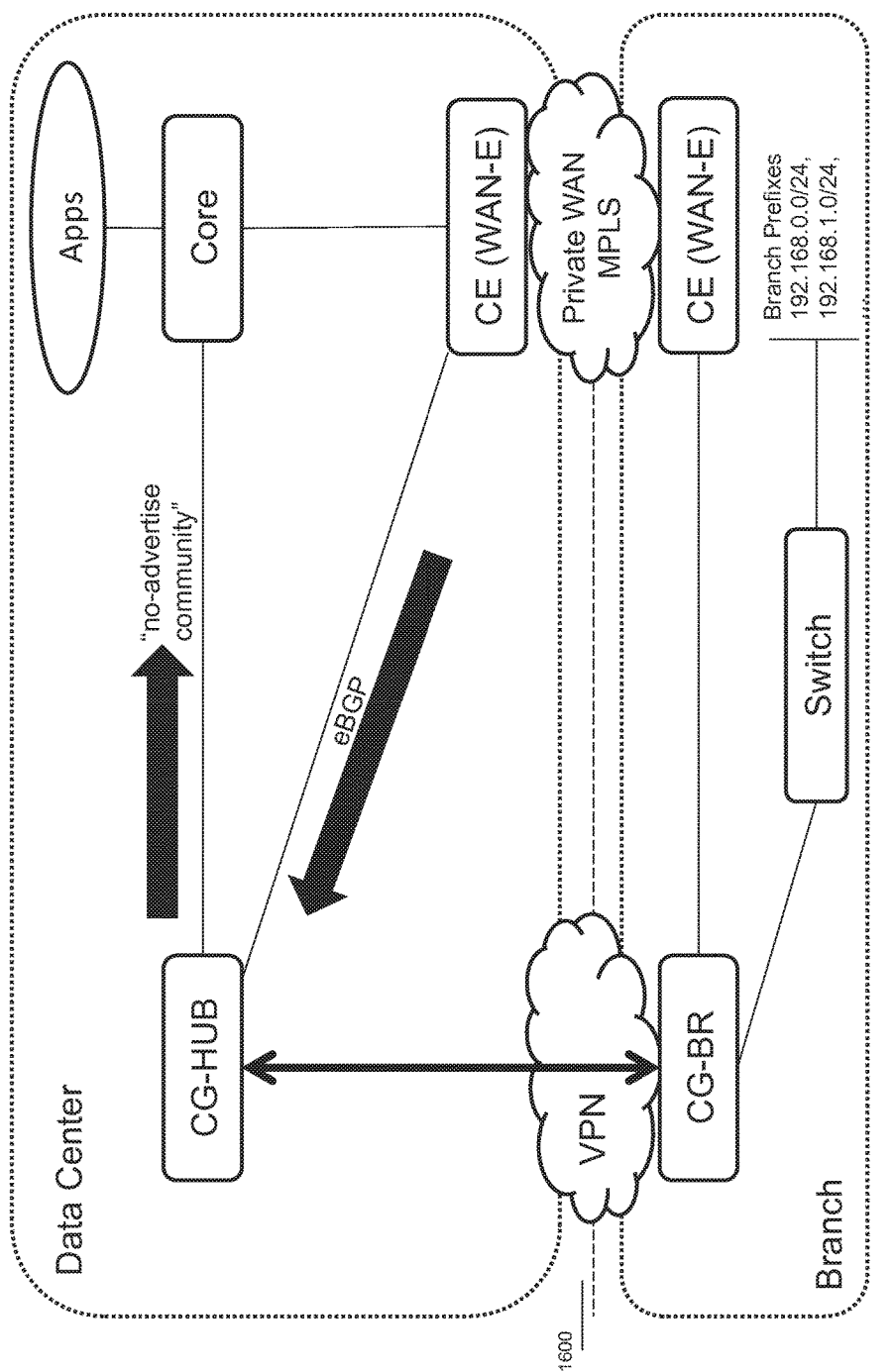
FIG. 16 illustrates a simplified seamless deployment model within a data center.

Referring to FIG. 16, a configurable device 124 may be deployed off path in the data center 128 without interrupting the physically connectivity of the existing network as illustrated herein. A configurable device 124 may be physically or logically connected to the CE device 180 in the data center 128 via separate interfaces. A configurable device 124 may BGP peer with Core 178 and CE 180 routers 162 and the like. Peering with CE 180 may be done in such a way that a configurable device 124 may only receive the routes but may not send any routes to CE. This may ensure no disruption to the existing operation of CE device. Peering with core routers 178 may be done in such a way that, configurable hub device may selectively advertise only those remote branch routes. Route advertisement to core routers 178 may be done by attaching a "no-advertise", well-known community value. A well-known community value may instruct the core router 178 not to advertise configurable hub-injected routes to any other peers thereby requiring no special filters to prevent accidental advertisement of routes to any other peers within the network. This may ensure that a configurable device 124 attracts only select traffic destined to branches 152. This may also ensure that there is no impact on the traffic destined to non-controller associated sites improving the deployment and integration with an existing network. Seamless integration without any sort of disruption to CE router 180 is advantageous. No disruption to non-controller associated sites is advantageous. Controlled traffic handling for non-controller associated sites is advantageous. No filtering requirements are advantageous.

A multi-tenant controller 122-associated environment may include zero touch multicast. In the traditional network, enterprise customers may buy multicast VPN service at a premium from MPLS providers so that they may send multicast service between different sites in the network. In addition, a customer may have back up VPN via Internet 142. Typically, enterprises either choose not to send multicast traffic across Public VPN due to performance issues and configuration complexity or deploy proprietary solutions, investing in expensive equipment. However, such customers are not able to use both the private and public VPN based on performance criterion.

Figure 17:
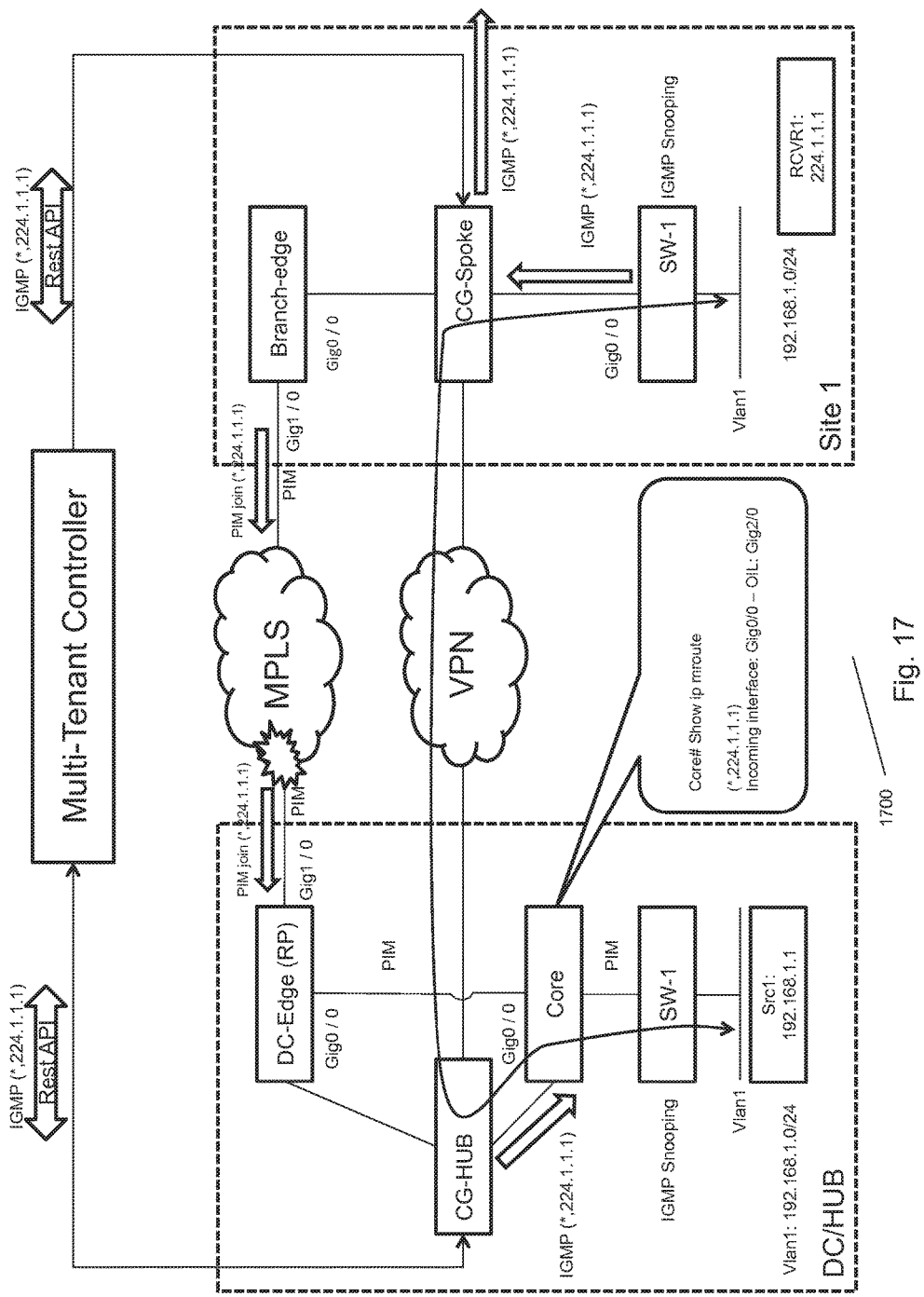
FIG. 17 illustrates a simplified embodiment of a multicast deployment that includes a multi-tenant controller.

As illustrated in FIG. 17, configurable devices 124 may intercept multicast traffic, specifically Internet Group Management Protocol (IGMP) traffic, passing through the branch device 152 while simultaneously forwarding the traffic to private WAN towards the next hop routers 162, e.g. CE. A configurable device 124 in the branch 152 may forward the IGMP report information to the multi-tenant controller 122. A multi-tenant controller 122 may maintain a multicast group database based on the received IGMP protocol traffic, and may distribute the group member information to the configurable hub device located in the data center 128. Upon receiving the multicast group member info from the multi-tenant controller 122, it may create a multicast state and place the VPN links to the branches 152 that are members of the group. A hub device may then reconstruct the IGMP join and send it to the core router 178, which may add the interface to the configurable hub in its forwarding table 812. When a source located in the DC starts sending packets, a configurable hub device may receive a copy of the packet but replicate the packet on the VPN links to the various remote branches 152 that are members of the multicast group, as shown in FIG. 17.

Note that the source of multicast traffic may also be present at a branch 152, and in such cases, the multi-tenant controller 122 sends the multicast group information to the configurable device 124 present at the branch 152, and this device performs the packet replication to the various member configurable device 124 over the VPN links. The configurable device 124 may also choose to use the private WAN for multicast traffic if multicast is supported in the private WAN instead of replicating traffic on the individual VPN links based on performance.

Zero configuration multicast traffic delivery may be advantageous. Performance based path selection for multicast traffic may be advantageous.

A configurable hub device may provide a bridge/transit point between legacy and hybrid WAN. In the traditional enterprise using private IP/MPLS WAN, remote branches 152 and data centers 128 may be connected to each other via a service provider MPLS 144 network. For redundancy, enterprise customers may choose two service providers and dual home their critical sites to two providers. In case of failure in one MPLS provider, the sites may continue to reach each other via the $2^{nd}$ provider network. However, dual-homing all the sites may not be cost effective. Therefore, enterprises may choose to dual home only critical sites and leave the other sites as single homed when possible. This, however, may create operational challenges for network administrator to manage the routing and related policies to ensure traffic from single homed sites is allowed to transit through the appropriate dual homed site(s) in steady state as well as upon failure conditions.

Figure 18:
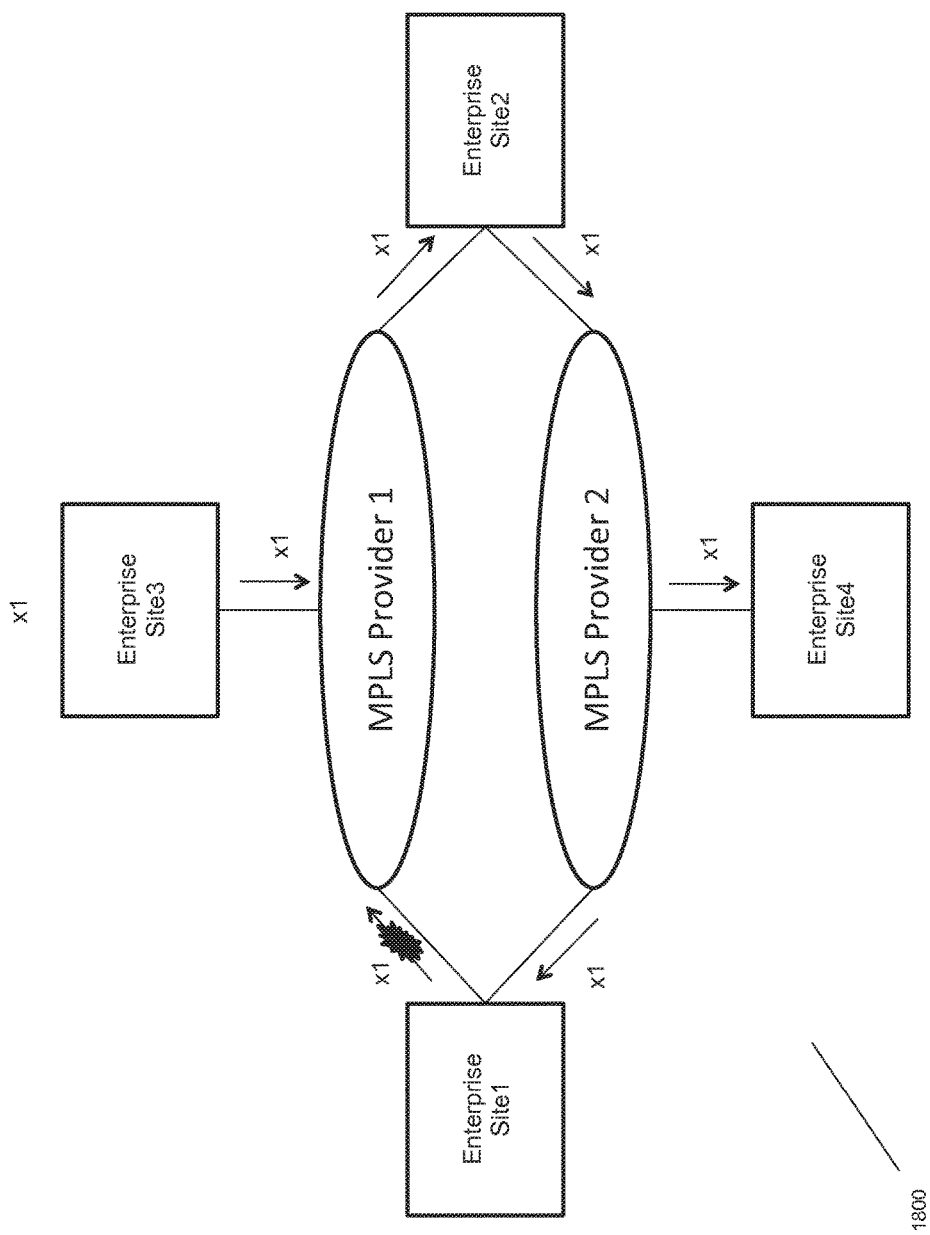
FIGS. 18 and 19 illustrate a simplified embodiment of data traffic occurring over two MPLS providers.

Routing policies related to making any given site a transit point in the traditional networks may not be trivial and may require careful planning and complex configuration to avoid routing loops. For example, in FIG. 18, Site 3 may be single homed and advertise a prefix which may be propagated to all the sites connected to MPLS provider 1. Site 1 and Site 2 may be dual homed to both providers. Site 2 may advertise prefix to MPLS provider 2 and the prefix may arrive at Site 1. Site 1 may have appropriate filters not to advertise prefix back to MPLS provider 1, which otherwise may create loops especially if the AS path information was lost due to route redistribution at any transit site. Similarly, Site 2 may not advertise the prefix if received from MPLS provider 2 back to MPLS provider 1.

Additionally, appropriate configuration may need to be in place to allow the traffic transit through site 2, when site 1 loses the connectivity to provider 1 when traffic from Site 3 is destined to Site 1.

Figure 19:
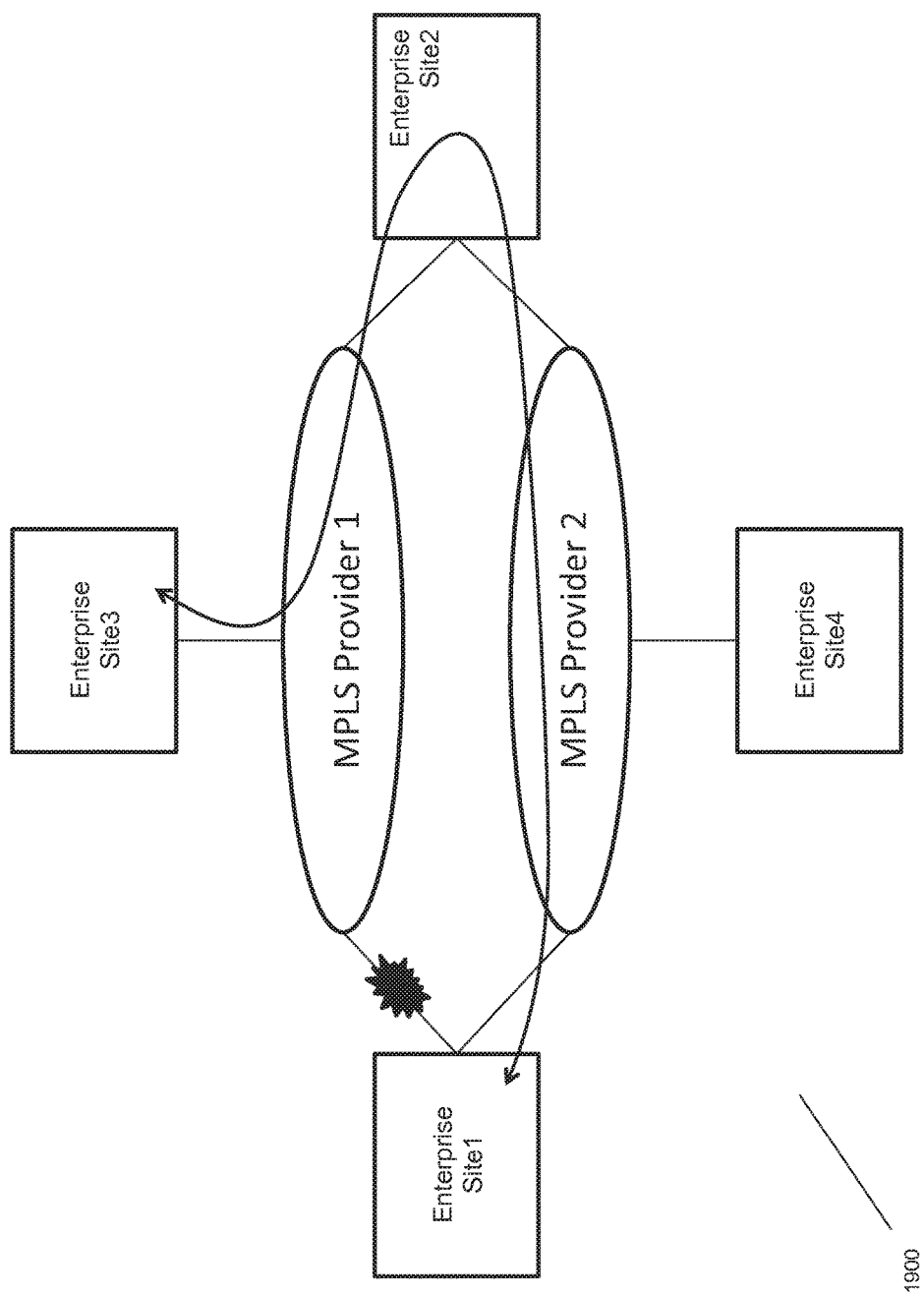

A multi-tenant controller 122 based approach may provide seamless integration with the enterprise's existing network infrastructure. Enterprise customers may not need any complex configuration or routing policies to ensure proper traffic flow between sites during steady state or failure conditions. Upon failure of MPLS WAN 144, a configurable hub may be used as a transit point to seamlessly repair the part of a broken WAN. Similarly, during the initial deployment phase, when not all of the sites may have been migrated to the multi-tenant controller 122 associated environment, a configurable hub may provide a transit point to facilitate seamless deployment in the rest of the network as illustrated in FIG. 19.

Figure 20:
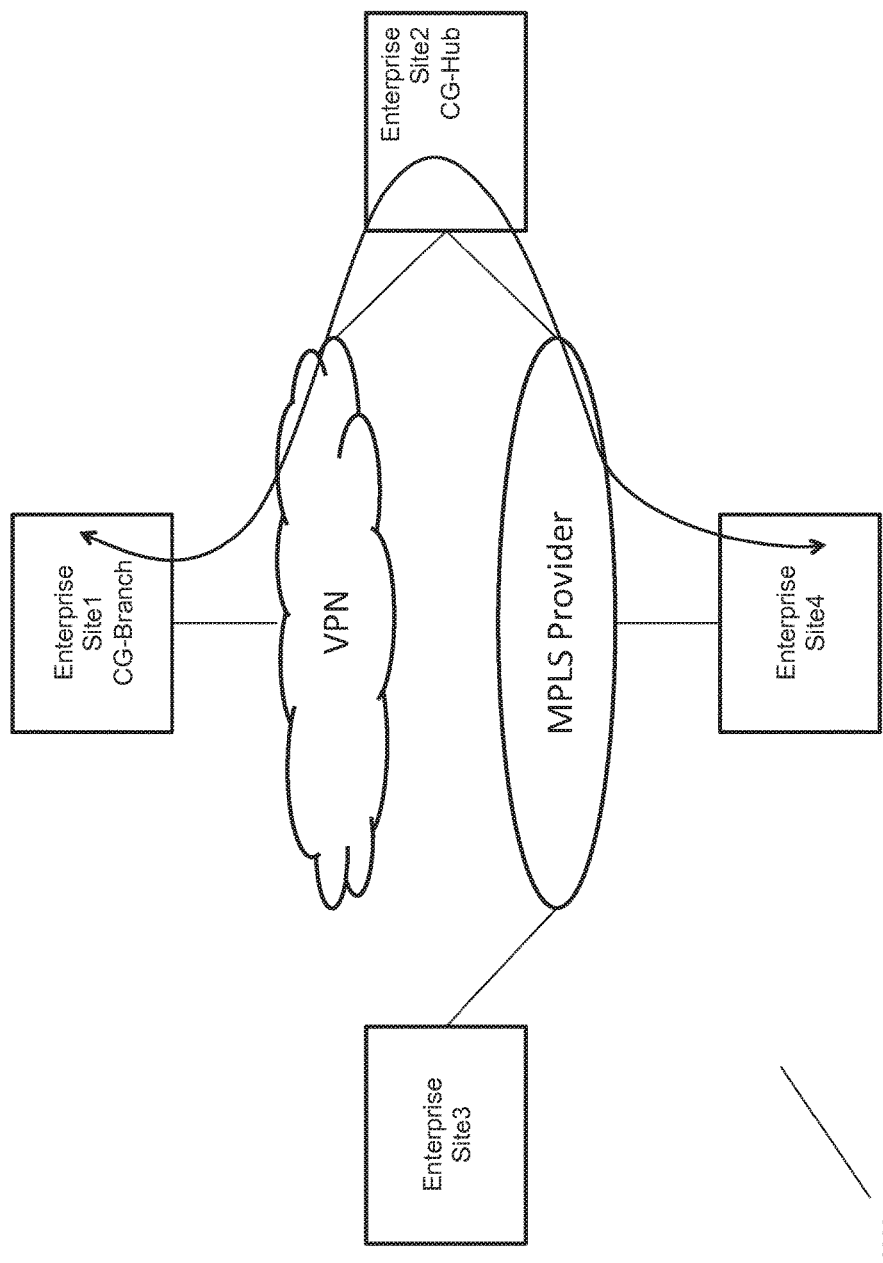
FIG. 20 illustrates a simplified embodiment of data traffic occurring over an MPLS provider and a VPN.

With the deployment model, configurable hub and branch devices 152 may build a secure and full-mesh overlay across a broadband Internet connection 142. Configurable hub BGP may peer with core and wan-edge router 178 in the enterprise data center 128 and may receive the entire network routes, including the routes from non-controller associated sites. For example, as shown in FIG. 20, site 1 may reach site 2 only via VPN due to losing connectivity to an MPLS provider 144. When site 1 tries to send traffic to site 3, where the multi-tenant controller 122 may not be deployed yet, traffic may be sent to a configurable hub at site 2 first. Since a configurable hub has the knowledge of the entire network, it may do an IP lookup and determine the site is not reachable via the multi-tenant controller 122, hence it may forward the traffic towards a WAN-edge router 178, which then routes the traffic to the appropriate destination. A configurable hub may provide an easy point of transition between VPN and a legacy network without requiring complex routing policies. Seamless routing between VPN and legacy networks without explicit and complex routing may be advantageous. High availability for single homed sites upon failure may be advantageous.

A multi-tenant controller 122 may build an end-to-end topology map combining MPLS WAN 144 topology using various BGP attributes including but not limited to BGP community and provide a complete private WAN topology view to network administration via a Graphical User interface.

In a traditional network, a common choice of protocol between Enterprise and MPLS Service provider, a.k.a PE-CE routing protocol, may be BGP. Enterprises typically may run a different BGP Autonomous System number (AS number) per site. As a result, when routes are exchanged from one site to another via MPLS service provider network, an AS path attribute containing all the ASes transited during the route propagation may be carried along with the prefix. In the central hub location, a configurable device 124 may peer with the enterprise WAN router 178 via BGP and may receive the remote site routes with BGP path information intact. A hub site may forward this information to a multi-tenant controller 122. The topology builder component of the multi-tenant controller 122 may leverage this information to identify local hub site (e.g. data center) routes and remote site routes and may build a graphical topological map. In addition, the multi-tenant controller 122 may also have full knowledge of the VPN topology. Combining the two, the topology builder may produce a complete end-to-end view of the entire enterprise WAN network.

The multi-tenant controller 122 associated approach may provide a dynamic and complete view of the enterprise network combining all the possible WAN in the network as well as ability to identify local vs. remote routes and the like. State transitions that may result from a failure in the MPLS WAN 144 and/or BGP route withdrawal on the private network may be reflected in real time.

Bidirectional forwarding may be used for the detection of private and public link failures. Using private MPLS WAN 144, enterprise network sites may be connected to the MPLS Service provider network in a point-to-cloud type of model. Using the L3VPN service provider terminology, a customer edge (CE) router 180 may be connected to a provider edge (PE) router 176. To meet customer Service Level Agreements (SLAs) for faster convergence upon failure, BFD may be used between PE-CE link along with a routing protocol. However, using BFD in this manner may allow failure detection only for the local link or node between a customer site and a provider edge router 176. Hence, a BFD session may be configured at every PE-CE link in the enterprise network. Due to the fact that BFD may be running only on the local segment, it may not be sufficient to detect end-to-end failures. An enterprise network may not detect any soft or hard failures within a service provider network, which could take hours and in some cases days to troubleshoot and pin point the root cause of the problem, possibly increasing the Mean Time To Repair (MTTR) and reducing the availability of the enterprise network. In addition, Provider Edge (PE) routers typically may support only a limited number of BFD sessions and may not necessarily be capable of supporting BFD on each and every PE-CE link. As a result, BFD may be available either only to high profile customers or may be offered as a premium service to the enterprise customers. Some enterprises may resort to establishing an overlay across the MPLS network 144 and running BFD over the overlay network to detect brown out and other failures within the service provider network. This may add complexity and defeat the purpose of MPLS VPN 144 that may have been meant to outsource the WAN network while simplifying the network operation for enterprise network administrator.

BFD may be leveraged in a novel fashion to monitor the health of the paths end-to-end between any two given sites without requiring complex configuration. As a result, the end-to-end traffic convergence upon failures and especially in case of brownout may be very quick and increase the overall availability and the user experience in the enterprise network.

In traditional networks, enterprise customers may desire to use BFD between PE-CE links along with BGP or one of the Interior Gateway Protocols (IGP) protocols including STATIC, Routing Information Protocol (RIP), Open Shortest Path First (OSPF) and Enhanced Interior Gateway Routing Protocol (EIGRP) and the like for fast failure detection. Failure detection by itself may be only a small part of the problem with an ultimate goal to recover the traffic as soon as possible. Therefore, to accelerate the route convergence and restore traffic on other available paths, routing protocols such as BGP, OSPF and Intermediate System to Intermediate System (ISIS) and the like may register with BFD process. Upon link failure detection, routing protocols may be immediately notified about such failures so that they can recalculate their routing table and find alternative paths to reach the desired destinations. Since routing protocols are the consumers of the BFD, the existence of routing protocols may be a pre-requisite for BFD to be effective.

The multi-tenant controller 122 associated approach leverages BFD to detect end-to-end failures across private IP/MPLS WAN 144 in the enterprise network. Instead of the traditional process of registering BFD with routing protocols, this approach may establish end-to-end BFD session between configurable devices 124 at every enterprise site across private WAN. Each configurable device 124 may actively monitor the reachability to every other site via BFD without explicitly establishing end-to-end BGP or configuring any other routing protocol across private WAN. Upon detecting anomalies along the path, a configurable device 124 dynamically steers the traffic away from the affected path without manual intervention. This may provide the ability to detect not only local PE-CE local link of node failures quickly but also may enable enterprise customers to detect brown out and other failures in the service provider network.

The multi-tenant controller 122 associated approach leverages BFD to detect end-to-end failures across private MPLS WAN 144 in the enterprise network. Instead of the traditional process of registering BFD with routing protocols, this approach may establish an end-to-end BFD session independently between two given enterprise sites across MPLS WAN 144 and upon detecting failures, dynamically re-routes traffic without a need to notify routing protocols to re-compute the alternative paths. Unlike traditional BFD, the effectiveness of this may not be limited to local PE-CE link/node failure but may be much broader in scope. It may enable enterprise customer networks to automatically detect brown out and other failures in the service provider network. Furthermore, this approach may alleviate a need for the service provider to offer PE-CE level BFD there by leveraging the valuable resources on the PE routers 176 for other critical functions.

Hub high availability and switchover may be directed by multi-factor spoke devices. Each spoke site device may be assigned two hub elements in each hub site for the purpose of HA to ensure that the spoke site may continue to have VPN tunnels to the hub site in the failure of a hub device. Using BGP or OSPF primary hub device may inject prefixes belonging to the spoke into the core switch and specify the primary hub device as the preferred next hop for traffic in the hub site to spoke site direction. The determination of which of the hub devices to utilize may be decided by the spoke site device. This invention describes how the spoke site may decide which hub element is its primary hub.

A spoke element may use multiple factors to determine the preferred hub element within the hub element pair that should be primary hub for the spoke site. The spoke may have multiple private and public WAN circuits. These circuits often have differing pricing models—the pricing is bandwidth based or volume based. Volume-based pricing may follow a cell phone plan like pricing model with some amount of allowed volume per month for a fixed monthly cost and for volume exceeding the allowance a cost per megabyte of consumption.

For each private and public WAN circuit, a spoke device may establish an Internet Protocol Security (IPSEC or IPSec) VPN Tunnel to both hub elements in the hub element HA pair assigned to it. The spoke device may use an algorithm to decide which hub element in the pair should be its primary. The algorithm may take as input the bandwidth per private and public WAN circuit, the pricing model per circuit, the health of the individual IPSEC VPN tunnels to both the hub sites over each of the public and private WAN circuits, the routing reachability of the hub devices to the hub core router 178 and the like. The goal of the algorithm may be to optimize application performance while keeping volume-based costs low. The algorithm may allow for a default HA behavior and also may allow for an administrator to specify rules about which of the circuits in branch may be allowed to be default active, which ones are backup except on failure of default active circuits and when backup circuits may not be used. The algorithm may use the notion of protection groups to achieve its results. The spoke device 124 may decide to pick one Hub Device 178 as its primary from the HA hub pair assigned to it as it is able to use a lower cost branch circuit. If the primary hub device is now only reachable over higher cost volume based circuit but the spoke can reach the second device in the HA pair using the lower cost circuit then it may make the second hub device as primary. Spoke driven HA decisions for hub site may be advantageous. Multi-factor determination of primary HA element based on application performance, cost considerations and over-ride rules may be advantageous.

Device authentication for device security may be provided prior to the creation of secure tunnels, where such device authentication is enterprise-specific and/or specific to a configurable network utilizing a multi-tenant controller 122. Enterprise Site to Site IPSEC VPN over WAN networks may require that the two gateways or elements establishing a tunnel are mutually authenticated based on Enterprise requirements. The requirements may ensure that only trusted and authenticated devices may exchange private Enterprise data over private or public networks using IPSEC VPN. Existing authentication methods may follow one of two approaches:

Use of manually configured pre-shared keys. This approach may require IT to provision a separate pre-shared key per peer. For 1000 peers this may mean manually generating 1000 pre-shared keys and configuring them 1 million times for a fully meshed network. The alternate option is to use a single key, but the compromise of even a single router 162 may expose the entire network, leading to weaker security.

In lieu of pre-shared key customers may use PKI (Public Key Infrastructure). This may require them to have a full PKI infrastructure to manage certificates, keys and use the offline CRL (Certificate Revocation List) distribution mechanism to manage certificate revocation. They may have to ensure high security and availability for their CA (Certificate Authority) server(s). They may have to still manually provision each gateway device to use PKI.

A VPN authentication disclosed non-limiting embodiment may use inbuilt PKI with tiered levels of certificate authentication which may eliminate nearly all manual configuration, may provide very high authentication security and may still give administrators control over authentication of the elements. The disclosed non-limiting embodiment may provide for one or more of the following:

Three-tier, PKI-based authentication that may upgrade authentication in stages for higher security.

First tier may be a Manufacturing Installed Certificate (MIC) and private key that may provide for device authenticity when shipped from authorized manufacturing sites.

Manual claim by a customer which may ensure IT is authorizing each device before it is admitted in the network and may participate in establishing VPNs and activating policy Second tier may be a per-tenant Claim Installed Certificate (CIC) which may bind the element to a Tenant following manual authorization Inbuilt and fully automated PKI infrastructure with separate Certificate Authorities for MIC and CIC and which may manage full lifecycle of the certificates Customer-controlled device authorization revocation (de-claim).

A customer may also control whether a given claimed device can or cannot participate in VPN with other devices.

Integration with an existing customer PKI infrastructure by allowing a customer to also install a Tenant Installed Certificate (TIC), which may have been issued by customer's own Certificate Authority.

At manufacturing time, prior to an element leaving a trusted manufacturing site, the device may be installed with a signed certificate and private key. The private key may be kept in a TPM (Trusted Platform Module) module and the like and the certificate may be signed by a proprietary manufacturing only Certificate Authority (termed as MIC CA). During manufacturing, the element may contact the multi-tenant controller 122 using a secure TLS encrypted channel and the like to get its certificate signed. The multi-tenant controller 122 may check to ensure that the request is coming from a manufacturing location and that the hardware ID/serial number is valid. The multi-tenant controller 122 may bind the hardware ID to a default tenant in the certificate and may sign the certificate. An element that has been manufactured but not allocated to any tenant may be marked as "available". The use of the TPM and signed certificate may ensure that when tenant receives element it is a genuine element and can be trusted. The multi-tenant controller 122 may host the MIC CA, which may issue signed certificates. The multi-tenant controller 122 may also maintain the binding of the certificate to the specific hardware element. It also may maintain a revocation list of which hardware elements are no longer trusted and the like. Hardware elements that are reported to have been compromised may be marked as revoked by the CA. The CA may use this information to ensure that a tenant may claim only non-revoked trusted elements. When hardware is shipped to a tenant it may be marked "allocated" to that specific tenant. When an element, which only has a MIC and has been marked as "allocated" contacts the multi-tenant controller 122, the element may be allowed to be only "claimed" by a tenant. The element may not be allowed to setup VPNs. The communication between multi-tenant controller 122 and element may be TLS encrypted and PKI authenticated. The element to multi-tenant controller 122 communication may use bi-directional certificate authentication, with the element using the MIC as client certificate, and both parties may validate that their certificates are signed by the proprietary CA.

When a tenant's administrator logs into the multi-tenant controller 122 they may see all "available" elements allocated to them that are currently online. The administrator may validate that the element hardware ID matches the one that they had ordered and that the element may be installed in the right customer location. They then manually "claim" the element. This provides multi-tenant controller 122 the authorization from the administrator that this element may now fully participate in the network and can establish VPNs.

The multi-tenant controller 122 may issue a new Claim Installed Certificate to the element, an element ID separate from the hardware ID and it may bind the element to the tenant in the Claim Installed Certificate (CIC) and sign the certificate. The multi-tenant controller 122 may use a separate CIC CA for signing this certificate. The multi-tenant controller 122 and element may then break the existing communication channel based on the MIC and the like and establish a new communication channel with the CIC. This may be a TLS encrypted and bi-directional certificate authenticated channel, with the element using the CIC as the client certificate, where both sides may validate that their certificates are signed by a trusted CA.

On validating that the element is in communication with a CIC certificate, the multi-tenant controller 122 may allow the element to establish a VPN with elements at other sites in the customer network. Thus only a manually authorized element with a tenant specific claim certificate may do VPN. This may represent the second PKI tier.

After an element has been claimed, if a tenant has their own PKI infrastructure, then on an administrator's request the multi-tenant controller 122 may use signed certificates from the tenant's CA and it may install them on the element. These signed certificates may be either manually provisioned by the administrator through their login or the multi-tenant controller 122 may use protocols such as SCEP (Simple Certificate Enrollment Protocol) to acquire them. These certificates may be called a "Tenant Installed Certificates" (TIC) and may be signed by a TIC CA and the like which is part of the tenant's own PKI infrastructure.

After installation of TIC the element and multi-tenant controller 122 again may break the existing communication channel established with the CIC communication and then re-establish it with the element again using the CIC or TIC as the client certificate. At this time they both may do certificate validation similar to the CIC-based communication as described herein. In addition, the multi-tenant controller 122 validates that the element (if it connects with a CIC) may also have a signed TIC, which may have been signed by the tenant's TIC CA. This may represent the third PKI tier.

In addition to the MIC, CIC and TIC PKI based authentication and authorization, the tenant administrator also may have controls to temporarily disable a particular claimed element from participating in VPN. This may not revoke the certificates but may only suspend the ability of that element to do VPN. The administrator may enable a suspended element to re-establish VPN at time in the future.

If a MIC or CIC are near expiry or are damaged then the multi-tenant controller 122 may transparently allocate new signed certificates for them without administrator intervention. For TIC certificates the multi-tenant controller 122 may transparently use SCEP or other protocols to get new signed certificates on behalf of the element. Customer may also manually install TIC certificates in lieu of old expiring or damaged ones.

When a customer no longer wants to use an element and wants to dispose it or return it for RMA (Return Merchandise Authorization) reasons, they may "declaim" the element. When an administrator declaims an element the multi-tenant controller 122 may instruct the element to wipe its TIC and CIC and associated private keys. The multi-tenant controller 122 may also mark the element as being declaimed and no longer allocated to the customer. The multi-tenant controller 122 further may mark the CIC as revoked and instruct the Tenant CA to mark the TIC as revoked. The element thus enters "available" state and may no longer be able to participate in establishing VPN, since it does not have CIC and is not in "claimed" state.

This three-tier authentication and authorization may provide in-depth security and a PKI infrastructure for the first two tiers that may be multi-tenant and may manage a full certificate lifecycle for the first two tiers. The third tier may have the ability to integrate with existing PKI infrastructure in a tenant's environment, acquire signed certificates from a tenant's CA and use them for authorization for VPN establishment. This may give administrators full control and ability to manually authorize an element (claim the element) before it is admitted to the network and also de-authorize the element when they want to dispose of it and the like. The conversion of this authorization to a new certificate/key may be bound to tenant or removed if the tenant bound certificate/private key is handled transparently. For a claimed element further granular VPN level authorization may be also provided in an easy to use manner.

Site-to-site networking model and underlying VPN links/tunnels creation may be based on dynamic rules. The multi-tenant controller 122 based networking model may use logical links that may then be realized using IPSEC tunnels (also called as VPNLinks or vpnlinks) over public WAN (same as Internet 142) networks or private WAN (same as MPLS 144) networks for communication between sites. The multi-tenant controller 122 may use a rules-based approach to dynamically bring up and tear down links between sites. The rules based approach may use one or more of the following to decide when to bring up and tear down tunnels:

Knowledge of site type (hub or spoke)
Amount of data volume between spoke sites
Application performance between spoke sites
Tenant administrator given directives When a Site is associated with a WAN Network, the multi-tenant controller 122 may create a logical "Site WAN Interface" and the like.

For every pair of Site-WAN Interfaces belonging to two separate sites (whether hub or spoke) the multi-tenant controller 122 may create a link which may be a logical connection between the two sites. A link may be put into categories such as:

Hub to Spoke (H2S) links
Spoke to Spoke (S2S) links

[DYNAMIC RULE 1—DEFAULT] For every Hub to Spoke (H2S) link the multi-tenant controller 122 may instruct the right elements in both the sites to establish an IPSEC tunnel to activate the link. In the spoke, the right element may be the currently active element in a pair. In the hub the right element may be the designated primary hub element for that spoke site.

[ADMINISTRATOR RULE 1] The multi-tenant controller 122 may provide control to the administrator to disallow a specific H2S link to be established. The multi-tenant controller 122 may use this directive and override the default rule.

[DYNAMIC RULE 2] The multi-tenant controller 122 may monitor total volume of traffic between each pair of spoke sites that is travelling either over MPLS 144 between the sites or via a hub site which is acting as a transit site for traffic between the two spokes over IPSEC tunnels (i.e. traffic goes from Spoke 1 to Hub Site A over a IPSEC tunnel and from Hub Site A to Spoke 2 over a second IPSEC tunnel) and the like. If the traffic volume exceeds a certain threshold over a certain time period based on a formula, the multi-tenant controller 122 may decide that the link between the spokes should be activated. It may instruct the elements in the two spoke sites to directly establish an IPSEC tunnel between them so that the traffic between the spoke sites can use the direct IPSEC tunnel between them.

[DYNAMIC RULE 3] For links activated using v. [DYNAMIC RULE 2], the multi-tenant controller 122 may continue to monitor total volume of traffic between the two spoke sites. If the total volume over a certain time period drops below a particular threshold then the multi-tenant controller 122 may decide to de-activate the link. It may instruct the two elements in the two sites to destroy the IPSEC tunnel.

[DYNAMIC RULE 4] The multi-tenant controller 122 may monitor application performance between each pair of spoke sites for applications whose data is travelling either over MPLS 144 between the sites or via a hub site which is acting as a transit site for traffic between the two spokes over IPSEC tunnels (i.e. traffic goes from Spoke 1 to Hub Site A over a IPSEC tunnel and from Hub Site A to Spoke 2 over a second IPSEC tunnel) and the like. If the application performance is poor, then based on historical latency and bandwidth information of IPSEC VPN directly between the two sites, or based on modeling and predictive analysis and the like, the multi-tenant controller 122 may decide to activate the link between the two spoke sites.

[ADMINISTRATOR RULE 2] The multi-tenant controller 122 may provide control to the tenant administrator to permanently allow a specific Spoke-to-Spoke link to be established. The multi-tenant controller 122 may use this directive as an override to the rules.

[ADMINISTRATOR RULE 3] The multi-tenant controller 122 may provide control to the tenant administrator to disallow a specific Spoke-to-Spoke link to be established. The multi-tenant controller 122 may use this directive as an override to the rules.

Traditional IPSEC VPNs may have one of following approaches:

A manually-configured spoke specified on each router 162 to indicate which other routers 162 it should VPN with; or Specify that the spoke router 162 may contact a hub router 162 for all traffic and if the hub router 162 may decide that if the traffic is meant for another spoke site then it may tell the originating spoke router 162 to establish an IPSEC VPN directly with the destination spoke router 162.

The current disclosed non-limiting embodiment may provide one or more of the following new functionalities:

Provides a multi-tenant controller 122 driven central control for the establishment of IPSEC across all configurable devices Provides dynamic establishment of spoke to hub IPSEC tunnels as the default with zero configuration Provides an application performance driven IPSEC tunnel establishment between sites Provides a data volume driven IPSEC tunnel establishment between sites Provides for tenant administrator given directives approach to permanently allow two sites to always communicate with each using IPSEC tunnel over public WAN or private WAN Provides for tenant administrator given directives approach to permanently disallow two sites from communicating with each using IPSEC tunnel over public WAN or private WAN Existing centralized key generations (Kerberos and GROUP VPN and the like) may require that the multi-tenant controller 122 be available at all times. These may operate within a highly reliable LAN or WAN environment due to which the network reachability of the central key generator may be assured with a very high SLA. However for a centralized multi-tenant controller 122 that may be only reachable over Internet circuits, it may be possible that due to multiple ISPs there may be a disruption in the multi-tenant controller 122 reachability. These outages may happen due to natural disasters, breaking of intercontinental submarine cables, equipment failure at core peering points and the like. These disruptions may last from a period of few hours to a few days and the like. In such a scenario the key generation may not provide high availability and resiliency for the encryption data channels.

According to the methods and systems of the present disclosure, VPN high availability may be provided upon a failure to reach a multi-tenant controller 122. In the multi-tenant controller 122 driven model with centralized generation of shared secrets by a multi-tenant controller 122 for two sites to establish IPSEC tunnels, it may be possible that due to network connectivity issues explained earlier or a customer internal network that the multi-tenant controller 122 may not be reachable for certain extended periods. Since shared secrets may expire, the multi-tenant controller 122 may generate new shared secrets on demand by a set of elements, however if the elements cannot contact the multi-tenant controller 122 then they may not get new shared secrets which will eventually cause the IPSEC tunnel to be brought down, thereby disrupting data path traffic.

This disclosed non-limiting embodiment provides a mechanism to allow the data path to operate in a headless (devices actively functioning while unable to communicate with the multi-tenant controller 122) mode for extended period of time. The multi-tenant controller 122 may allocate a fixed validity period based on wall clock for a shared secret. For each IPSEC data tunnel the multi-tenant controller 122 may issue multiple shared secrets with start and end validity periods in the future. The number of shared secrets issued may cover the full headless period. If two elements that have established an IPSEC tunnel cannot reach the multi-tenant controller 122, they still may have sufficient shared secrets to rekey the IPSEC data tunnel over the headless period.

Based on the security considerations and standardized best practices, a multi-tenant controller 122 may determine a maximum validity period for using a specific shared secret. When the multi-tenant controller 122 decides to activate a link using an IPSEC Data tunnel, the multi-tenant controller 122 may generate a shared secret for the two elements and set the shared secret's start and end validity times based on wall clock.

The start time may be a time before the current wall clock time and the end time may be a time beyond current wall clock. The determination of the start time may be based on a specific distribution algorithm that tries to get a fair distribution of start times. The multi-tenant controller 122 may issue new shared secrets for millions of VPN links and the fair distribution ensures that the multi-tenant controller 122 may be evenly loaded and does not suffer peaks of re-issue load. The multi-tenant controller 122 may have a default headless period value. The value may be changed by a tenant administrator within a multi-tenant controller 122 specified minimum and maximum bound and the like. The multi-tenant controller 122 may use the headless period value and divide it by the maximum shared secret validity period to obtain the maximum number of shared secrets it should generate to cover headless expiry period. The multi-tenant controller 122 may send to both the elements the full list of pre-allocated shared secrets. The elements may use the first shared secret and when a certain period before it is to expire, the elements notify the multi-tenant controller 122 to request a new shared secret to ensure that they continue to have filled pipeline of shared secrets covering headless period. The multi-tenant controller 122 may respond to the first element that contacts it and issue a single new shared secret to both elements that have the IPSEC data tunnel. The multi-tenant controller 122 may generate multiple shared secrets to ensure that the total period from current time to maximum headless period is fully covered with sufficient number of shared secrets. If the element cannot reach the multi-tenant controller 122 to send notification, it may still continue to use the next available shared secret from the pre-allocated list. If the element's peer element can notify the multi-tenant controller 122 then the multi-tenant controller 122 may generate a new shared secret. If both elements cannot reach multi-tenant controller 122 then the multi-tenant controller 122 may not issue a new shared secret.

If both elements cannot reach multi-tenant controller 122 and multiple shared secrets have expired and one or both of them are able to reach the multi-tenant controller 122 after that, then the multi-tenant controller 122 may follow the same method and may issues multiple shared secrets to cover headless period from current time. If only one element can reach multi-tenant controller 122, it may continue to request new shared secrets from the multi-tenant controller 122. If one (or both elements) cannot reach multi-tenant controller 122 and it has (or they have) consumed all shared secrets, it means that the element (or both elements) may be operating beyond the allowed maximum headless period. In this condition the element may bring down the IPSEC tunnel. The element's peer if it is able to talk with the multi-tenant controller 122 may continue to request new shared secrets from the multi-tenant controller 122 even though it is not able to use them. Thus the shared secrets refresh mechanism may operate as long as any one element can reach the multi-tenant controller 122.

This disclosed non-limiting embodiment may allow for the use of a Cloud based multi-tenant controller 122 only reachable via Internet 142 that issues centralized keys but still ensures that in cases of temporary disruption that in reaching the multi-tenant controller 122 that there is zero impact to existing encrypted data channels (IPSEC), while ensuring that the security of the encryption is preserved.

Centrally managed shim IP address may be used to optimize IPSEC security policy. A spoke with multiple IPSEC VPN Tunnels over multiple public WAN or private WAN interfaces may need to decide which egress VPN tunnel it should use based on policy and the like. The spoke may maintain a database of currently active IPSEC VPN tunnel Security Associations (SA) and the like. A tunnel may consist of a pair of SAs one in inbound and another in outbound direction. Each tunnel may be identified in the kernel using one or more of the following parameters—a 32-bit index called as Security Parameter Index (SPI), and the destination IPv4 or IPv6 address of the IPSEC peer and the like. Each application flow may be mapped to the pair IPSEC SAs and this mapping may be achieved in the kernel using a Security Policy Database (SPD). This database may consist of classification rules which may have fields based on header fields of the application flow. For each packet of an application flow the fields may be extracted to form a key and a lookup done against the classification rules in the SPD.

The number of entries in the SPD may become very large. As an example for a spoke with 1000 users each with two devices each having 20 to 30 application flows may result in 40,000 to 60,000 entries in the SPD. This may slow down the SPD lookup and may add latency to packet processing.

Furthermore, each time there is a new application flow or when an existing application flow dies, the SPD may have to be modified, and while it is being modified it may not be used for packet processing which may further delay packet processing. Addition or deletion of application flows may be a frequent activity. This may be a problem even for smaller branches 152 with a few thousand SPD entries. The disclosed non-limiting embodiment may provide the use of an additional shim IP header which may use a shim IP address per IPSEC tunnel. This shim IP header may be attached to the application flow before the SPD lookup is done. The use of the shim IP header may considerably reduce the number of entries in the SPD. Since the shim IP are tied to the IPSEC tunnel and the creation/deletion of tunnels may happen at a significantly lower speed compared to application flow creation/deletion the SPD may be updated at a very low rate. Both these factors may improve packet processing performance.

Each IPSEC tunnel may be given a Path-ID which is a 64-bit number and, for each such Path-ID, the multi-tenant controller 122 may assign a pair of shim IP addresses for each side of the IPSEC tunnel.

The data path after doing a policy lookup may determine a Path-ID and then may attach a shim IP header including the pair of shim IP addresses for the Path-ID. The security policy data base may then be looked up using only the Shim IP address. For a spoke with 1000 IPSEC tunnels this may result in a SPD which has only 1000 entries compared to 40,000 to 60,000 for a branch 152 with 1000 users. For smaller branches 152 with 50 users and 2000 to 3000 flows the rate of change IPSEC tunnels may be lower by factor X compared to the rate of change of application flows. This may result in a very low rate of update of the SPD compared to what will happen with SPD based on application flow header fields. The multi-tenant controller 122 may use a database driven algorithm to manage the IP address space. The algorithm may be highly scalable and may manage the shim IPs for hundreds of millions of flows across tens of thousands of tenants. The use of a shim IP header to improve SPD lookup performance may be advantageous. The use of a multi-tenant controller 122 driven highly scalable multi-tenant shim IP address management may be advantageous.

Inline BFD may be used for IPSEC VPN tunnel health management and control negotiation. Traditional IPSEC control protocol may use a method called "Dead Peer Detection" (DPD) which may be a control channel method of detecting if a peer is down. Since traditional IPSEC control channel may be out of band, the control channel may be healthy but the data channel may still be down. For example, the control channel may run on UDP port 500 which may be allowed by a firewall but the data channel IPSEC ESP may be blocked.

If dead peer detection detects that the control channel is down it may tear down the data channel and the peers may use IKE or IKEv2 and the like to establish a new data channel. Thus control channel signaling may be used to determine the health of a data channel. However, it may be possible that the data channel is working well and the issue is only control channel related. This may cause unnecessary disruption in data channel traffic. Instead of using DPD, the current disclosed non-limiting embodiment may use in-band signaling within the data channel by sending Bidirectional Forwarding Detection (BFD) messages between two ends of the IPSEC VPN tunnel. This may ensure that data tunnel failures are quickly detected. If BFD indicates a data tunnel is down it then may trigger the control channel to begin negotiation to determine the cause of failure. The control channel may not immediately destroy the IPSEC SAs but instead keeps them up until hard expiry. This may ensure that if the disruption in data tunnel is temporary the tunnel may not be destroyed but may be used as soon as the disruption goes away. The multi-tenant controller 122 associated approach may treat each IPSEC data tunnel over public WAN or private WAN as a direct path between two elements. BFD may be used to ensure that this path is healthy and available. This may be similar to how routing would use BFD to detect health of a physical circuit that directly connects to adjacent routers 162 and the like.

The two sides use BFD as an application that may send BFD messages on both sides using the Shim IP addresses as the source and destination IP addresses. When the IPSEC VPN control daemon establishes an IPSEC data tunnel, it may signal the BFD daemon to create a BFD session. It may provide the source and destination IPs for the BFD packets and also the Path-ID for that session. The BFD daemon may send BFD packets per RFC 5880. The BFD message interval may be kept as 750 ms. This may result in a 2.25 second failure detection period. If the BFD daemon detects that the tunnel is down, it may signal the IPSEC VPN control daemon and provide it the Path-ID of the tunnel. The IPSEC control daemon may then start control channel negotiation with a relevant peer to find the reason for the failure and to take corrective action. The BFD daemon may continue to send echo packets and if it finds that the data tunnel is up then it may again signals the VPN control daemon using the Path-ID to indicate that the IPSEC tunnel is up. The use of BFD as in band signaling to indicate health of IPSEC data tunnel may be advantageous. The use of data tunnel health failure to drive IPSEC control channel negotiation instead of other way round may be advantageous.

According the method and systems of the present disclosure, VPN tunnel health management may be optimized for bandwidth. As explained herein the configurable device 124 may use BFD for monitoring the health of IPSEC data tunnels. In order to support fast failover from an active to a backup IPSEC data tunnel and minimize traffic disruption, in one disclosed non-limiting embodiment, the configurable device 124 may send BFD echo packets as frequently as 750 ms. When there is a large number of IPSEC tunnels (such as in thousands) from a branch 152 to other data center 128 and branches 124, the amount of BFD traffic can be large. In order to reduce the bandwidth consumption of BFD traffic but still do quick failure detection, this invention may use the encrypted application traffic received on a tunnel as an indication of the tunnel being up and suppress the BFD echo packets. In the absence of application traffic, BFD packets may be used to check the health of the tunnel. In a variant of this approach, application traffic packets may also be used to carry the BFD signaling information.

NAT may be integrated for VPN tunnels and IP address change management for VPN tunnels with and without NAT. The devices in two sites that need to establish a VPN link may be behind a Network Address Translator (NAT). The NAT can be a destination IP NAT or a source NAT with PAT (Port Address Translation) type of NAT and the like. The NAT devices could restart and, under reboot, they may also undergo an IP address change of their WAN facing interfaces. Only one side of the IPSEC tunnel may be behind a NAT. The configurable devices 124 themselves may have Static IP addresses or DHCP IP addresses that may undergo change. The NAT devices may be a Firewall NAT with rules which can move from allowing IPSEC to disallowing IPSEC traffic and vice versa. If they disallow traffic then they may keep a cached deny entry which needs to timeout, otherwise even if the policy is moved to allow, IPSEC sessions may still get denied due to a cached deny IPSEC entry.

The disclosed non-limiting embodiment described herein may ensure that the IPSEC data tunnel is kept up in most of the aforementioned scenarios and is required only as long as if there is a NAT device before one of the configurable devices 124. If there is a NAT device in front of both configurable devices 124 then one of them should be a Destination NAT device.

This disclosed non-limiting embodiment may use the notion of Initiator and Responder and the use of multi-tenant controller 122 to tell each side the IP address of the peer. If there is Destination NAT in front of one of the parties then it may require the multi-tenant controller 122 to specify the IP address of only that NAT as the peer destination IP. The disclosed non-limiting embodiment described herein may use NAT Traversal. For example it may send IPSEC packets over UDP. Both parties may send request messages in which they may carry specific payloads about the original IP address and port number of the originating device and the IP address and port to which it may be sending the packet to. The receiving device may compare this information with the outermost NAT Traversal UDP/IP header's IP and port. Using this each party finds out whether it may be behind a static or dynamic NAT or whether the peer may be behind a static or dynamic NAT and the like. Based on this they both may derive their role as initiator or responder. Once this role is established they may complete their control channel communication to establish an IPSEC data tunnel. The two parties may also track dynamic changes of IP addresses of either side and transparently update their remote addresses while minimizing traffic disruption. If due to change of IP or NAT role, NAT reboots, NAT policy changes and the like the data tunnel may come down then the control tunnel may try to re-establish the notion of initiator and responder and may allow for the roles changing in order if necessary to keep the control channel up. If there is Firewall NAT device which denies the control channel communication due to a cached denial entry whose timeout does not expire because of continuous control channel negotiation packets then the control channel on configurable devices 124 may use an exponential back off timeout method to decide when to transmit next control channel packet. Using this they may wait for few seconds to few minutes before sending next control channel packet. This may allow the firewall NAT to expire their cached denial entry. Updated policy on the firewall NAT may allow the control channel communication and once the cached denial entry is deleted due to expiry a new allow entry may be inserted by the Firewall NAT. Due to this control channel communication between configurable devices 124 may eventually succeed. The ability to track change of IP Address of the configurable devices 124 with and without NAT for site to site IPSEC VPN may be advantageous. The ability to track change of IP address of source NAT devices may be advantageous. The ability to use exponential back-off times to send next control packet may be advantageous.

Applications may be detected across tenants and across sites within a single tenant. As described in the other embodiments above, the methods and systems described herein may bring innovative approaches to detecting applications dynamically. The application identification information that is dynamically learned from one or more sites may also be learned by the multi-tenant controller 122 and be pushed to other sites of the same tenant.

Further, since the multi-tenant controller 122 is delivered as a cloud-delivered, multi-tenant service, the information learned at the multi-tenant controller 122 may be aggregated and sanitized, and this aggregated information may be distributed to the sites of other tenants as well. Both of the above may allow for the collective betterment of the application identification across sites and tenants. Without this, the information learned at one site may remain localized at the same site, and every site may have to go through the learning process independently. This collection and dissemination may allow for very quick convergence of the application definition. For example, if a device at site learned that srv1.lync-int.com is associated with office365, all the other sites come to know about this very quickly.

Spoke devices may detect applications, more specifically the SaaS applications 604 using anchor domains based approach, described in the embodiments herein. In all the mentioned approaches, the applications definitions may get constantly refined as the traffic starts to flow through the spoke devices. These refinements are pushed to the multi-tenant controller 122, where they may be aggregated and sanitized through analytics platform, and may be distributed to the other sites of the same tenant and those of other tenants. This is another example of a slow feedback loop that involves the devices and the multi-tenant controller 122.

Currently available solutions for WANs involve appliances and routers 162 that may be either manually provisioned or provisioned through a central mgmt. station which stops at just managing the devices and the like. The disclosed non-limiting embodiment described herein provides for a new multi-tenant controller 122 based approach towards learning and dissemination of application definitions toward the wide area networking space.

The multi-tenant controller 122 associated approach may in one disclosed non-limiting embodiment, involve all the HTTP domain names that the spoke devices were not able to associate with an application and may identify, analyze and categorize them to enhance the application definitions, in order, for example, to determine relevancy and irrelevancy.

Configurable devices 124 may inspect all the traffic going in and out of a branch 152, and collect the set of HTTP domain names that tries to associate them with the known applications dynamically, as stated in the above embodiments. All the domain names that have not been found to be related to a known application may be gathered and sent to the multi-tenant controller 122 for further analysis. At the multi-tenant controller 122, these domain names may be analyzed using data mining techniques and the like, and they may get further categorized into one or more of the following categories:

New applications, leading to new application definitions
Existing applications, resulting in the enhancement of existing applications
Uninteresting, and therefore ignored.

This may help in improving the overall system's effectiveness in identifying applications.

The disclosed non-limiting embodiment herein describes a WAN network that may constantly and automatically evolve and adapt based on the traffic observed on a customer's network.

As described herein, a multi-tenant controller 122 allows for planning and visualizing changes to the network before the changes are actually made (i.e., the versioning). In such a "preview" mode, the network administrator is able to make proposed changes and see its effects in different ways. When such changes and the effects are deemed satisfactory for the administrator user, he/she would want to commit the changes to the network and thus converting the planned changes to committed changes. This may allow the "network" to be treated like a database—collection of assets, configurations, states and statistics. Databases are versioned, which allows tracking changes to the database as a sequence of commit transactions. Just like a Source Code Control & Versioning System that allows its various software components to be versioned and tracked through a series of commits and merges, which may allow the 'network' to be versioned.

The administrator user 'previews' his changes and its effects based on a version of the network, and once satisfied and she is ready to commit the changes, the multi-tenant controller 122 creates a new version of the network. More than one version of the network can be tracked and kept by the multi-tenant controller 122 so that if any change causes harm to the network, the administrator can go back to a previous 'safe' version of the network.

The multi-tenant controller 122 may allow for two different versions to be compared, which will highlight the configuration and asset inventory changes. The multi-tenant controller 122 may keep all the configuration, assets inventory and state information, in addition to statistics collected from the network. A version of the network is a snapshot of configuration, assets inventory and state at the time of creation of the version. For statistics, versioning is a version record added to the time series of statistics data collected from the network. To compare two versions, the multi-tenant controller 122 does a 'cliff' of the two snapshots representing the two versions. Statistics are not compared in the same way. Instead, statistics may be analyzed in the context of the versions and their respective times of existence.

As mentioned in other embodiments, a multi-tenant controller 122 is delivered from the cloud and administrative users get to interact with the system at one central place, and may comprise a semi-distributed control plane cache (with corresponding statistics). However this doesn't mean that all the elements deployed in a customer's network need to come to this single central place to retrieve their provisioning info and perform their functions. Instead the multi-tenant controller 122 functions are dis-aggregated and some of the latency-sensitive functions are distributed across the globe to yield better response times to the elements. Elements in a customer's network may be deployed across wide geographies. These elements may need to fetch their provisioning info and push the fine granular statistics to the multi-tenant controller 122. If all of the multi-tenant controller 122 functions are centralized like the network portal and API gateway, the elements may suffer high latencies in communicating with the multi-tenant controller 122 and effectively performing their functions. To mitigate this, some of the key latency sensitive multi-tenant controller 122 functions are dis-aggregated and distributed across the globe while the rest remain centralized. All this happens in the backend, and the customer is unaware of all of this, and they continue to come to one place to interact with the system. Distribution of these functions across wide geographies, while still functioning as a centralized multi-tenant controller 122 from customer's perspective may be advantageous.

Multi-stage, multi-factor classification and policy enforcement for performance, path selection, SERVICE, and VXWAN selection may be provided at the data path layer. The policy may use higher level constructs related to Application, Identity, Performance, Path, SERVICE and VXWAN based isolation. The information that is available in incoming flow packets, though, is at lower network layer 114. Incoming flows and packets may need to be classified by the data path at both a network layer and at a higher policy layer 112 to find which policy rule they match. This involves use of a two-stage classification.

Following this two-stage classification, the data path may need to select the best path for the application based on VXWAN 204, SERVICE, Performance and Path directives in policy. The data path may use a specific mechanism that ensures that policy is satisfied with the best possible performance 108 for the application and reachability 110 of the application.

A policy set may consist of policy rules. Each policy rule may specify classification columns including an Application and an Identity. An application may be specified using higher-level L7 constructs and potentially multiple L7 regular expression based rules. An application may itself include a group of applications.

Similarly, identity may be specified using a string-based name. Each identity can specify an individual user 168 or device, or can specify a group users 168 or devices and in some cases the groups may identity other groups. Each policy rule may also specify the action to take if the traffic matches the classification columns. The action is in terms of performance, path directive, SERVICE and VXWAN Isolation. There may be multiple policy rules, which form part of a policy set. A policy set may apply to multiple sites. A multi-tenant controller 122 sends all the policy rules of a policy set to the data path of the element in the site.

In each policy rule a multi-tenant controller 122 may convert the application specification into an Application ID or List of Application IDs and the identity specification into a list of Identity IDs. The multi-tenant controller 122 may convert the path directives into a list of Path IDs, SERVICE into SERVICE ID, VXWAN 204 into network-isolation identifier and Performance into a performance ID. It then may form the policy rule using these IDs and send the policy rule to the element data path. It also provides an ID for each policy rule.

A data path may use multi stage classification method to classify traffic. In the first stage it may take application traffic and identify traffic as belonging to a specific application ID or a list of application IDs and as belong to an identity ID or a list of identity IDs. As part of the first stage of classification a data path may use a set of helper modules that map the application and identity IDs to network level constructs such as IP address, TCP and UDP ports, IP DSCP (Differentiated Services Code Point) fields, layer 2 VLAN Tag, layer 2 VLAN priority, etc. In the second stage it may take the IDs coming out of the first stage and does another classification lookup to identify the policy rule that the traffic matches. The data path may use a specific algorithm for dis-ambiguity if multiple policy rules match the incoming traffic. It may use both the application and identity fields as well as Path, SERVICE, VXWAN 204 and Performance fields for dis-ambiguity.

After finding a policy rule match, the data path may use the action fields in the policy in order to enforce policy. For this, it may use helper modules to map the path ID to data path level next hop interfaces or tunnels, to map the performance ID to data path level BW control queue and to map the network-isolation identifier to network path level encapsulation shim. The data path may use a specific algorithm that orders the path selection based on VXWAN directive, SERVICE directive, path directive rules and performance directive needs.

Once a final policy rule has matched, the data path may add a flow entry for the incoming flow and subsequent packets belong to the flow use the flow entry rather using undergoing full multi-stage classification.

While an application and/or identity has been used at data path layer, for the purpose of security the use of both application and identity for path selection for application performance and isolation at data path level may be advantageous and the selection of the best path based on a combination of path directives, isolation needs and performance needs may be advantageous.

The methods and systems described herein may be deployed in part or in whole through a machine that executes computer software, program codes, and/or instructions on a processor. The processor may be part of a server 160, client 512, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server 160, client 512, firewall, gateway, hub, router 162, or other such computer and/or networking hardware. The software program may be associated with a server 160 that may include a file server, print server, domain server, internet server, intranet server and other variants such as secondary server, host server, distributed server and the like. The server 160 may include one or more of memories, processors, computer readable media, storage media, ports (physical and virtual), communication devices, and interfaces capable of accessing other servers 160, clients 512, machines, and devices through a wired or a wireless medium, and the like. The methods, programs or codes as described herein and elsewhere may be executed by the server 160. In addition, other devices required for execution of methods as described in this application may be considered as a part of the infrastructure associated with the server 160.

The server 160 may provide an interface to other devices including, without limitation, clients 512, other servers 160, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server 160 through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client 512 that may include a file client, print client, domain client, internet client, intranet client and other variants such as secondary client, host client, distributed client and the like. The client 512 may include one or more of memories, processors, computer readable media, storage media, ports (physical and virtual), communication devices, and interfaces capable of accessing other clients, servers 160, machines, and devices through a wired or a wireless medium, and the like. The methods, programs or codes as described herein and elsewhere may be executed by the client 512. In addition, other devices required for execution of methods as described in this application may be considered as a part of the infrastructure associated with the client 512.

The client 512 may provide an interface to other devices including, without limitation, servers 160, other clients 512, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client 512 through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers 160, routers 162, hubs, firewalls, clients 512, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers 160 and configured to execute program codes. The mobile devices may communicate on a peer to peer network, mesh network, or other communications network. The program code may be stored on the storage medium associated with the server 160 and executed by a computing device embedded within the server 160. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers 160, routers 162 and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:

1. A method comprising:
    designating, by a networked branch device on a network, a plurality of network data flows as belonging to a selected application if a network data flow is to or from a traffic source that initially accesses the selected application via an anchor domain of the selected application and if the network data flow occurs within a predetermined time period from an identified corresponding time of the initial access by that traffic source;
    monitoring, by the networked branch device, any subsequent designated network data flows of the selected application and an associated originating interface and associated destination;
    determining for each monitored network data flow of the selected application, by the networked branch device, a corresponding first path over which to forward the monitored network data flow to the associated destination, irrespective of a previous path of the monitored network data flow to the associated destination;
    transmitting for each monitored network data flow of the selected application, by the networked branch device, the monitored network data flow over the determined corresponding first path;
    receiving for each monitored network data flow of the selected application, by the networked branch device, a corresponding return data flow from the associated destination to the networked branch device;
    determining for each monitored network data flow of the selected application, a corresponding second path on which the return data flow is received from the associated destination; and
    moving for each monitored network data flow of the selected application, by the networked branch device, a forward direction of the network data flow, wherein the forward direction of the network data flow is from the associated originating interface to the associated destination, to a new path corresponding to the second path if the determined corresponding second path is different than the first path;
    wherein for each monitored network data flow of the selected application, all packets following an initial packet of the network data flow in the forward direction on the corresponding second path are forwarded on the same second path as that initial packet in order to prevent flow asymmetry between the forward and the return network data flows.

2. The method of claim 1, further comprising storing the determined first paths at Layer 4(L4) level in a flow table.

3. The method of claim 1, wherein a network data flow is detected via one of a synchronized packet (SYN) and a detected unknown server-client user datagram protocol (UDP) session.

4. The method of claim 1, wherein determining a first path comprises applying time-based application domain classification.

5. The method of claim 1, wherein determining a first path and a second path comprises network mapping.

6. The method of claim 1, further comprising modeling an application session.

7. The method of claim 1, further comprising predicting bandwidth requirements for the network.

8. The method of claim 1, wherein the network data flows are employed via synchronized packet (SYN).

9. The method of claim 1, further comprising storing a detected anomalous flow at a configurable device.

10. A networked branch device configured to:
    designate a plurality of network data flows as belonging to a selected application if a network data flow is to or from a traffic source that initially accesses the selected application via an anchor domain of the selected application and if the network data flow occurs within a predetermined time period from an identified corresponding time of the initial access by that traffic source;
    monitor any subsequent designated data flow of the selected application and an associated originating interface and associated destination on a network via a processor having a memory storing instructions for performing actions;
    determine, using the processor, for each monitored network data flow of the selected application, a corresponding first path over which to forward the monitored network data flow to the associated destination irrespective of a previous path of the monitored network data flow to the associated destination;

transmit for each monitored network data flow of the selected application, the monitored data flow over the determined corresponding first path;

receive for each monitored network data flow of the selected application, a corresponding return data flow from the associated destination to the networked branch device;

determine for each monitored network data flow of the selected application, using the processor, a corresponding second path on which a return data flow is received from the associated destination; and move for each monitored network data flow of the selected application, a forward direction of the network data flow, wherein the forward direction of the network data flow is from the associated originating interface to the associated destination, to a new path corresponding to the second path if the determined corresponding second path is different than the first path;

wherein for each monitored network data flow of the selected application, all packets following an initial packet of the data flow in the forward direction on the corresponding second path are forwarded on the same second path as that initial packet in order to prevent flow asymmetry between the forward and the return network data flows.

11. The networked branch device of claim 10 further configured to store the determined first paths at Layer 4(L4) level in a flow table.

12. The networked branch device of claim 10, wherein a network data flow is detected via one of a synchronized packet (SYN) and a detected unknown server-client user datagram protocol (UDP).

13. The networked branch device of claim 10, wherein determining the first path comprises applying time-based application domain classification.

14. The networked branch device of claim 10, wherein determining the first path and the second path comprises network mapping.

15. The networked branch device of claim 10, further configured to model an application session.

16. The networked branch device of claim 10, further configured to predict a bandwidth requirement for the network.

17. The networked branch device of claim 10, wherein the data flows are employed via synchronized packet (SYN).

18. The networked branch device of claim 10, further configured to store a detected anomalous flow at a configurable device.

* * * * *

UNITED STATES PATENT AND TRADEMARK OFFICE
CERTIFICATE OF CORRECTION

PATENT NO. : 10,142,164 B2  
APPLICATION NO. : 14/856328  
DATED : November 27, 2018  
INVENTOR(S) : Kumar Ramachandran et al.

Page 1 of 1

It is certified that error appears in the above-identified patent and that said Letters Patent is hereby corrected as shown below:

On Sheet 5 of 26, in Figure 1E, reference numeral 104E, Line 3, delete "sub-optial" and insert -- sub-optimal --, therefor.

In Column 14, Line 46, after "physical" insert -- . --.

In Column 14, Line 65, after "VXWAN" insert -- . --.

In Column 57, Line 20, after "Service" insert -- . --.

In Column 57, Line 53, after "Service" insert -- . --.

In Column 62, Line 67, after "group" insert -- . --.

In Column 73, Line 20, After "VXWAN" insert -- . --.

In Column 96, Line 6, delete "'cliff'" and insert -- 'diff' --, therefor.

Signed and Sealed this  
Twenty-ninth Day of October, 2019

Andrei Iancu  
*Director of the United States Patent and Trademark Office*